United States Patent
Matsui et al.

(10) Patent No.: US 10,956,393 B2
(45) Date of Patent: Mar. 23, 2021

(54) DATA STORAGE SYSTEM AND PROCESS FOR PROVIDING DISTRIBUTED STORAGE IN A SCALABLE CLUSTER SYSTEM AND COMPUTER PROGRAM FOR SUCH DATA STORAGE SYSTEM

(71) Applicant: HITACHI, LTD., Tokyo (JP)

(72) Inventors: Yuko Matsui, Los Gatos, CA (US); Mitsuo Hayasaka, Tokyo (JP); Christopher James Aston, High Wycombe (GB); Jonathan Smith, Bracknell (GB); James Gibbs, Wokingham (GB); Daniel Picken, Sunnyvale, CA (US); Simon Crosland, Woking (GB); Hieu Hanh Le, Tokyo (JP)

(73) Assignee: HITACHI, LTD., Tokyo (JP)

( * ) Notice: Subject to any disclaimer, the term of this patent is extended or adjusted under 35 U.S.C. 154(b) by 121 days.

(21) Appl. No.: 16/304,722

(22) PCT Filed: Oct. 20, 2016

(86) PCT No.: PCT/US2016/057845
§ 371 (c)(1),
(2) Date: Nov. 27, 2018

(87) PCT Pub. No.: WO2018/075041
PCT Pub. Date: Apr. 26, 2018

(65) Prior Publication Data
US 2019/0220454 A1    Jul. 18, 2019

(51) Int. Cl.
*G06F 16/00* (2019.01)
*G06F 16/22* (2019.01)
(Continued)

(52) U.S. Cl.
CPC .......... *G06F 16/2272* (2019.01); *G06F 3/064* (2013.01); *G06F 3/067* (2013.01);
(Continued)

(58) Field of Classification Search
CPC .... G06F 16/215; G06F 3/0641; G06F 3/0608; G06F 3/0659; G06F 3/067
See application file for complete search history.

(56) References Cited

U.S. PATENT DOCUMENTS 7,778,972 B1 *   8/2010   Cormie ............. H04L 29/08135
                                                    707/626
7,805,465 B2 *   9/2010   Dettinger ............. G06F 16/832
                                                    707/810
(Continued)

FOREIGN PATENT DOCUMENTS

WO      2011/020360 A1      2/2011

OTHER PUBLICATIONS

International Search Report of PCT/US2016/057845 dated Dec. 27, 2016.

*Primary Examiner* — Jean M Corrielus
(74) *Attorney, Agent, or Firm* — Mattingly & Malur, PC

(57) ABSTRACT

In a distributed storage of data objects in a cluster system, a data object is distributed across a group of node apparatuses in units of data blocks. For each child object, the metadata structure of the respective child object is stored to one of the node apparatuses of the group of node apparatuses for managing locations of data blocks of the data object and includes a root metadata node and one or more direct metadata nodes, optionally further including one or more indirect metadata nodes; and the metadata structure of the parent object is distributed across the plural node apparatuses of the group of node apparatuses for managing locations of child objects of the data object and includes, on each node apparatus of the group of node apparatuses, a root
(Continued)

metadata node and one or more direct metadata nodes, optionally further including one or more indirect metadata nodes.

16 Claims, 32 Drawing Sheets

(51) Int. Cl.
    *G06F 3/06*     (2006.01)
    *H04L 12/46*     (2006.01)
    *G06F 15/173*     (2006.01)
    *G06F 15/16*     (2006.01)

(52) U.S. Cl.
    CPC .......... *G06F 3/0611* (2013.01); *G06F 3/0689* (2013.01); *G06F 15/16* (2013.01); *G06F 15/173* (2013.01); *G06F 16/2246* (2019.01); *H04L 12/46* (2013.01); *H04L 12/4625* (2013.01)

(56) References Cited

U.S. PATENT DOCUMENTS

| | | | |
|---|---|---|---|
| 8,171,065 B2* | 5/2012 | Slik | G06F 16/164 707/822 |
| 8,582,932 B2* | 11/2013 | Krummrich | H04B 10/2581 385/28 |
| 9,015,150 B2* | 4/2015 | Raghavan | G06F 16/248 707/722 |
| 9,753,848 B2* | 9/2017 | Barrall | G06F 12/0246 |
| 10,296,219 B2* | 5/2019 | Wang | G06F 16/1748 |
| 10,416,928 B2* | 9/2019 | Aston | G06F 3/067 |
| 2002/0133491 A1 | 9/2002 | Sim et al. | |
| 2013/0232152 A1* | 9/2013 | Dhuse | G06F 16/2228 707/741 |
| 2014/0074808 A1* | 3/2014 | Barrall | G06F 16/128 707/695 |
| 2014/0108709 A1 | 4/2014 | Barrall et al. | |
| 2014/0331011 A1* | 11/2014 | Kesavan | G06F 16/17 711/133 |
| 2016/0210054 A1* | 7/2016 | Frank | G06F 12/0877 |
| 2016/0350006 A1* | 12/2016 | Wang | G06F 3/067 |
| 2016/0350325 A1* | 12/2016 | Wang | G06F 3/067 |
| 2018/0267985 A1* | 9/2018 | Badey | G06F 16/184 |
| 2018/0285002 A1* | 10/2018 | Hayasaka | G06F 3/064 |

\* cited by examiner

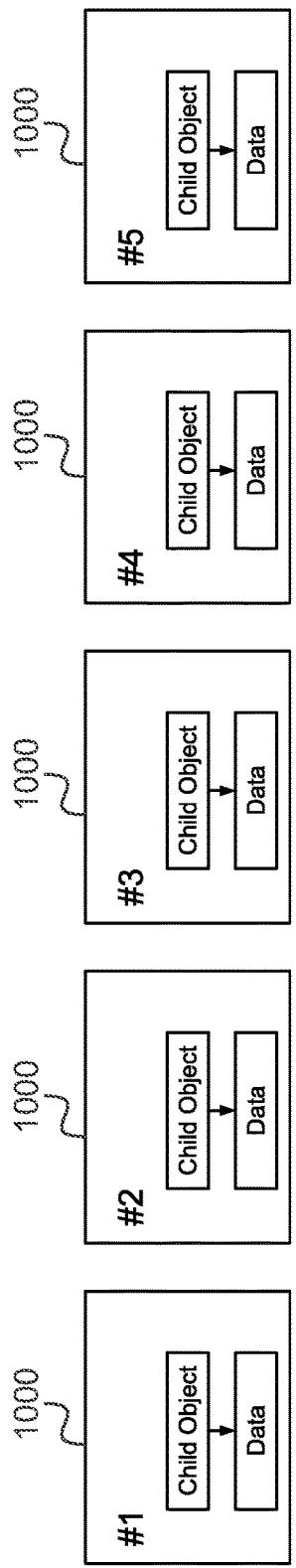
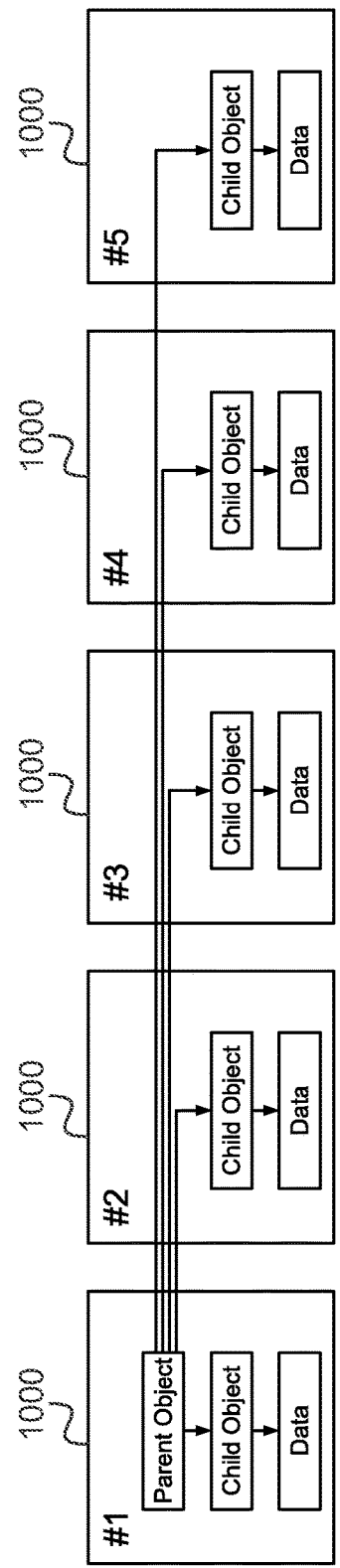
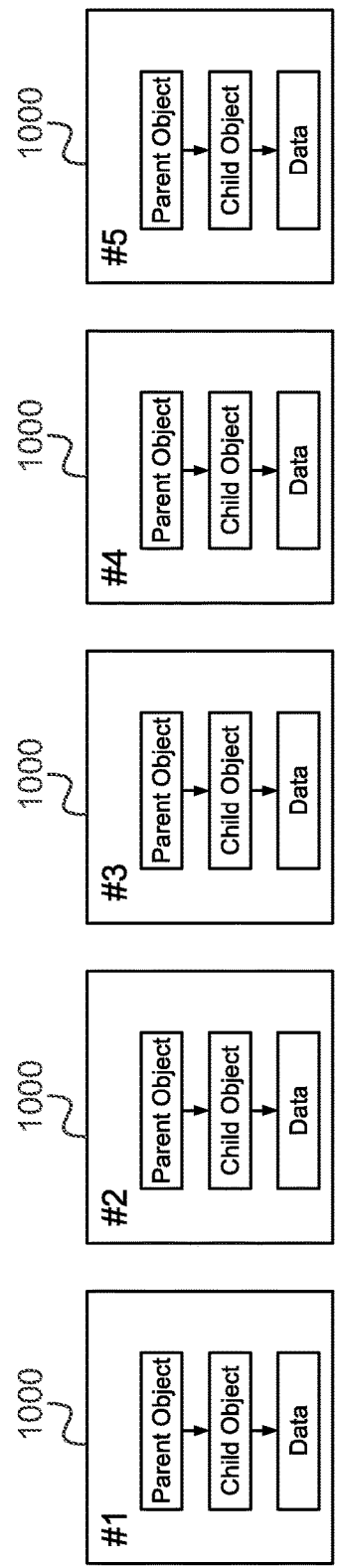

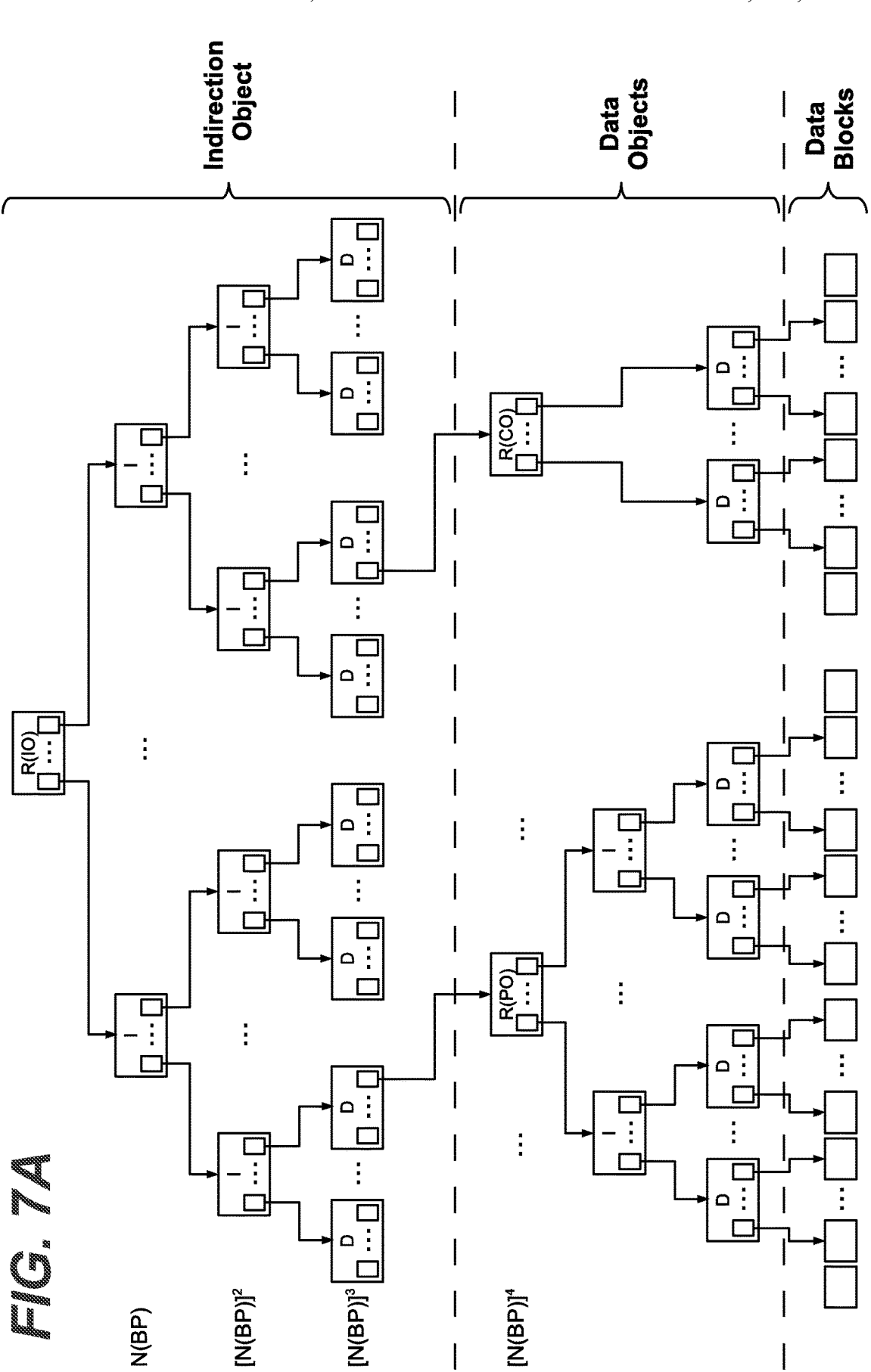

Node #1

Node #2

Node #3

Node #1

Node #2

Node #3

(optional)

DATA STORAGE SYSTEM AND PROCESS FOR PROVIDING DISTRIBUTED STORAGE IN A SCALABLE CLUSTER SYSTEM AND COMPUTER PROGRAM FOR SUCH DATA STORAGE SYSTEM

The present disclosure relates to a data storage system and/or a data storage apparatus connectable to one or more host computers, and in particular a data storage system and/or a data storage apparatus processing I/O requests.

The present invention specifically relates to a data storage system including a cluster system of a plurality of node apparatuses storing data objects in a distributed manner across the node apparatuses of the cluster system and the handling of I/O access requests to the data objects.

Data objects may relate to objects of a file system (such e.g. as files and directories to allow for I/O file access to data objects being file system objects) and/or logical or virtual volumes (such as e.g. LUs to allow for I/O block access to data objects being logical or virtual volumes), or other types of data objects.

Further, the present disclosure relates to methods of control of such data storage system and/or a data storage apparatus. Other aspects may relate to computer programs, computer program products and computer systems to operate software components including executing processing I/O requests at such data storage system and/or a data storage apparatus.

BACKGROUND

In the prior art, it is known to manage I/O requests from clients to data stored in units of blocks on storage devices of a storage apparatus based on a metadata tree structure including a root node directly or indirectly pointing to blocks e.g. via indirect nodes pointing to direct nodes and via direct nodes pointing to blocks of data, e.g. in connection with a log write method which writes modified data to newly allocated blocks.

Below, some potential objects are described. Exemplary embodiments and aspects as described in the following may be proposed to solve one, more or all of the below objects. It is an object of the present invention to provide aspects in a data storage system, which provides an efficient and reliable scale-out approach in which a cluster system of plural node apparatuses is enabled to manage I/O access to one or more data objects distributed across a plurality of node apparatuses and is, at the same time efficiently and reliably scalable.

It is another object of the present invention to provide aspects in a data storage system, which allows to efficiently and reliably manage the I/O access independent of data location in the cluster system and independent of which node apparatus receives the I/O request in a scalable cluster system.

It is yet another object of the present invention to provide aspects in a data storage system, which allows to efficiently and reliably allow for rebalancing and redistributing of data across node apparatuses of the cluster system for purposes of load balancing and/or for the purpose of adding or removing node apparatuses to/from the cluster system.

SUMMARY

According to the invention, for solving one or more of the above objects, there is proposed a computer program, a method and a data storage system according to independent claims. Dependent claims related to preferred embodiments.

According to exemplary aspects, there may be provided a computer program including instructions to cause a computer to execute a method for managing a data storage system.

The method may be comprising: storing a data object distributed across a group of node apparatuses of the data storage system in units of data blocks; and managing I/O access to the data object based on metadata structures including a metadata structure being associated with a parent object of the data object and plural metadata structures being respectively associated with one of a plurality of child objects of the data object.

For each child object, the metadata structure of the respective child object is stored to one of the node apparatuses of the group of node apparatuses for managing locations of data blocks of the data object.

The metadata structure of the respective child object includes a root metadata node and optionally includes one or more direct metadata nodes, optionally further including one or more indirect metadata nodes.

The root metadata node of the respective child object(s) may include references (pointers) to direct and/or indirect metadata nodes of the respective child object(s).

The indirect metadata node of the respective child object(s) may include references (pointers) to direct and/or indirect metadata nodes of the respective child object(s).

The direct metadata nodes of the respective child object(s) may include references (pointers) to data blocks storing data of the data object.

The metadata structure of the parent object associated with the data object is distributed across the plural node apparatuses of the group of node apparatuses for managing locations of child objects of the data object.

In particular, the metadata structure of the parent object or parts thereof may be stored in a distributed manner on different node apparatuses.

For example, each of plural node apparatuses may store the metadata structure of the parent object, or different node apparatuses may store respective parts of the metadata structure of the parent object, preferably such that each of plural parts of the metadata structure of the parent object are stored on at least one node apparatus.

The metadata structure of the parent object includes, on each node apparatus of the group of node apparatuses, a root metadata node and optionally including one or more direct metadata nodes, optionally further including one or more indirect metadata nodes.

The root metadata node of the parent object may include references (pointers) to data blocks, direct and/or indirect metadata nodes of the parent object, and/or to root metadata nodes of child objects (the latter may be realized by pointers to data blocks storing location information of the respective child objects or by pointers to root metadata nodes of child objects on the same or other apparatuses).

The indirect metadata node of the parent object may include references (pointers) to direct and/or indirect metadata nodes of the parent object.

The direct metadata nodes of the parent object may include references (pointers) to root metadata nodes of child objects on the same and/or other node apparatuses. This may be realized by pointers to data blocks storing location information of the respective child objects or by pointers to root metadata nodes of child objects on the same or other apparatuses.

According to some exemplary preferred aspects, the parent object on a certain node apparatus includes object-references indicating locations of one or more child objects of the data object; the parent object in the data storage system includes a respective object-references for each child object of the data object; and/or each child object is referenced by an object reference of the parent object on at least one of the node apparatuses.

According to some exemplary preferred aspects, upon creation of the data object, the parent object on a certain node apparatus includes object-references indicating locations of the one or more child objects of the data object created on the same certain node apparatus; and/or, upon creation of the data object, each child object on a certain node apparatus is referenced by an object reference of the parent object on the same certain node apparatuses.

According to some exemplary preferred aspects, the method further comprises: moving, for I/O access load balancing, one or more child objects from a source node apparatus to a target node apparatus and updating an object reference of the parent object on the source node apparatus, or on another node apparatus, to reflect the new location of the one or more moved child objects.

According to some exemplary preferred aspects, the method further comprises: creating the data object; including: dividing the data of the data object into a plurality of data segments, each data segment having a size smaller than or equal to a pre-determined distribution size, storing the data segments in a distributed manner across the plural node apparatuses of the group of node apparatuses, creating a respective child object for each stored data segment, and/or creating a respective parent object on each node apparatus on which a child object is created.

According to some exemplary preferred aspects, storing the data segments in a distributed manner across the plural node apparatuses of the group of node apparatuses is executed based on a deterministic distribution algorithm and/or based on a distribution map being generated based on a deterministic distribution algorithm.

According to some exemplary preferred aspects, based on the deterministic algorithm, one or more distribution maps and/or mapping information, which may be indicative of a mapping of one or more input values, preferably corresponding to, being indicative of and/or being determined based on at least one of an object identifier and a data segment identifier, onto a respective node apparatus or a respective associated distribution map, may preferably be pre-calculated (e.g. at boot time of the cluster or node apparatuses) and/or pre-stored in a memory, cache memory and/or non-volatile memory and/or a storage device on at least one of the node apparatuses or preferably all node apparatuses.

This has the advantage that such calculations based on the deterministic algorithm would not be needed to be re-calculated at times of input/output access or at times of adding/removing of node apparatuses, but could be efficiently obtained from the memory, cache memory and/or non-volatile memory and/or a storage device when needed.

According to some exemplary preferred aspects, an input value of the deterministic distribution algorithm depends on at least one of: an object identifier of the data object and an offset of a data segment in the data object.

According to some exemplary preferred aspects, object identifiers are grouped into plurality of disjoint groups of object identifiers and each group of object identifiers includes the same number of object identifiers, wherein the number of object identifiers per group may be equal to a number of pointers per metadata node in a metadata structure, or the number of object identifiers per group may be equal to a number of pointers per metadata node in a metadata structure to the power of an integer of two or more.

According to some exemplary preferred aspects, an input value of the deterministic distribution algorithm is determined based on an object identifier of the data object, and object identifiers of a same group of object identifiers result in the same input value and/or object identifiers different groups of object identifiers result in different input values.

According to some exemplary preferred aspects, the method further comprises: receiving an I/O access request to access a target data segment of the data object on a receiving node apparatus, determining a child object node apparatus being the designated location of a child object associated with the target data segment based on a deterministic algorithm, sending an I/O access request to access the target data segment from the receiving node apparatus to the determined child object node apparatus, obtaining an object reference to the child object associated with the target data segment from the parent object on the determined child object node apparatus, and accessing the child object associated with the target data segment based on the object reference obtained from the parent object on the determined child object node apparatus.

According to some exemplary preferred aspects, the method further comprises: accessing the child object associated with the target data segment on the determined child object node apparatus; or determining that the child object associated with the target data segment has been moved to another node apparatus based on the object reference obtained from the parent object on the determined child object node apparatus, and accessing the child object associated with the target data segment on the other node apparatus.

According to some exemplary preferred aspects, the metadata structure of the parent object is distributed across the plural node apparatuses of the group of node apparatuses in that the complete metadata of the parent object is stored on each of the plural node apparatuses of the group of node apparatuses; or the metadata structure of the parent object is distributed across the plural node apparatuses of the group of node apparatuses in that each of the plural node apparatuses of the group of node apparatuses stores a respective part of the metadata structure of the parent object.

According to another aspect, there may be provided a data storage system, comprising: a plurality of node apparatuses communicably connected to each other, the data storage system being configured to store a data object distributed across a group of node apparatuses of the data storage system in units of data blocks; and the data storage system being configured to manage I/O access to the data object based on metadata structures including a metadata structure being associated with a parent object of the data object and plural metadata structures being respectively associated with one of a plurality of child objects of the data object; wherein, for each child object, the metadata structure of the respective child object is stored to one of the node apparatuses of the group of node apparatuses for managing locations of data blocks of the data object and includes a root metadata node and optionally includes one or more direct metadata nodes, optionally further including one or more indirect metadata nodes; and wherein the metadata structure of the parent object is distributed across the plural node apparatuses of the group of node apparatuses for managing locations of child objects of the data object and includes, on each node apparatus of the group of node apparatuses, a root metadata node and optionally one or more direct metadata nodes, optionally further including one or more indirect metadata nodes.

According to another aspect, there may be provided node apparatus for use in a data storage system as discussed above or below, comprising: an interface for establishing a communication connection to one or more other node apparatuses of the data storage system; one or more storage devices for storing data; and a storage controller for controlling a data storage distribution in the data storage system, including: storing a data object distributed across a group of node apparatuses of the data storage system in units of data blocks; and managing I/O access to the data object based on metadata structures including a metadata structure being associated with a parent object of the data object and plural metadata structures being respectively associated with one of a plurality of child objects of the data object; wherein, for each child object, the metadata structure of the respective child object is stored to one of the node apparatuses of the group of node apparatuses for managing locations of data blocks of the data object and includes a root metadata node and optionally includes one or more direct metadata nodes, optionally further including one or more indirect metadata nodes; and wherein the metadata structure of the parent object is distributed across the plural node apparatuses of the group of node apparatuses for managing locations of child objects of the data object and includes, on each node apparatus of the group of node apparatuses, a root metadata node and optionally one or more direct metadata nodes, optionally further including one or more indirect metadata nodes.

According to another aspect, there may be provided method for managing a data storage system, comprising: storing a data object distributed across a group of node apparatuses of the data storage system in units of data blocks; and managing I/O access to the data object based on metadata structures including a metadata structure being associated with a parent object of the data object and plural metadata structures being respectively associated with one of a plurality of child objects of the data object; wherein, for each child object, the metadata structure of the respective child object is stored to one of the node apparatuses of the group of node apparatuses for managing locations of data blocks of the data object and includes a root metadata node and optionally includes one or more direct metadata nodes, optionally further including one or more indirect metadata nodes; and wherein the metadata structure of the parent object is distributed across the plural node apparatuses of the group of node apparatuses for managing locations of child objects of the data object and includes, on each node apparatus of the group of node apparatuses, a root metadata node and optionally one or more direct metadata nodes, optionally further including one or more indirect metadata nodes.

According to further aspects there may be provided data storage system connectable to one or more client computers, comprising a processing unit including a processor and/or a programmable logic device; a cache memory; and one or more storage devices and/or an interface to communicably connect with one or more storage devices; the processing unit being preferably adapted to execute one or more methods according to one or more of the above aspects and/or one or more methods of the present disclosure.

BRIEF DESCRIPTION OF THE DRAWINGS

FIG. 4A exemplarily shows a distribution of a data object across a plurality of node apparatuses of a cluster system according to a stateless scale-out approach;

FIG. 4B exemplarily shows a distribution of a data object across a plurality of node apparatuses of a cluster system according to a stateful scale-out approach;

FIG. 4C exemplarily shows a distribution of a data object across a plurality of node apparatuses of a cluster system according to a hybrid scale-out approach according to some exemplary embodiments;

FIG. 7A exemplarily shows a schematic diagram of an exemplary metadata tree structure on a node apparatus according to some exemplary embodiments;

DETAILED DESCRIPTION OF THE ACCOMPANYING DRAWINGS AND EXEMPLARY EMBODIMENTS

Figure 1A:
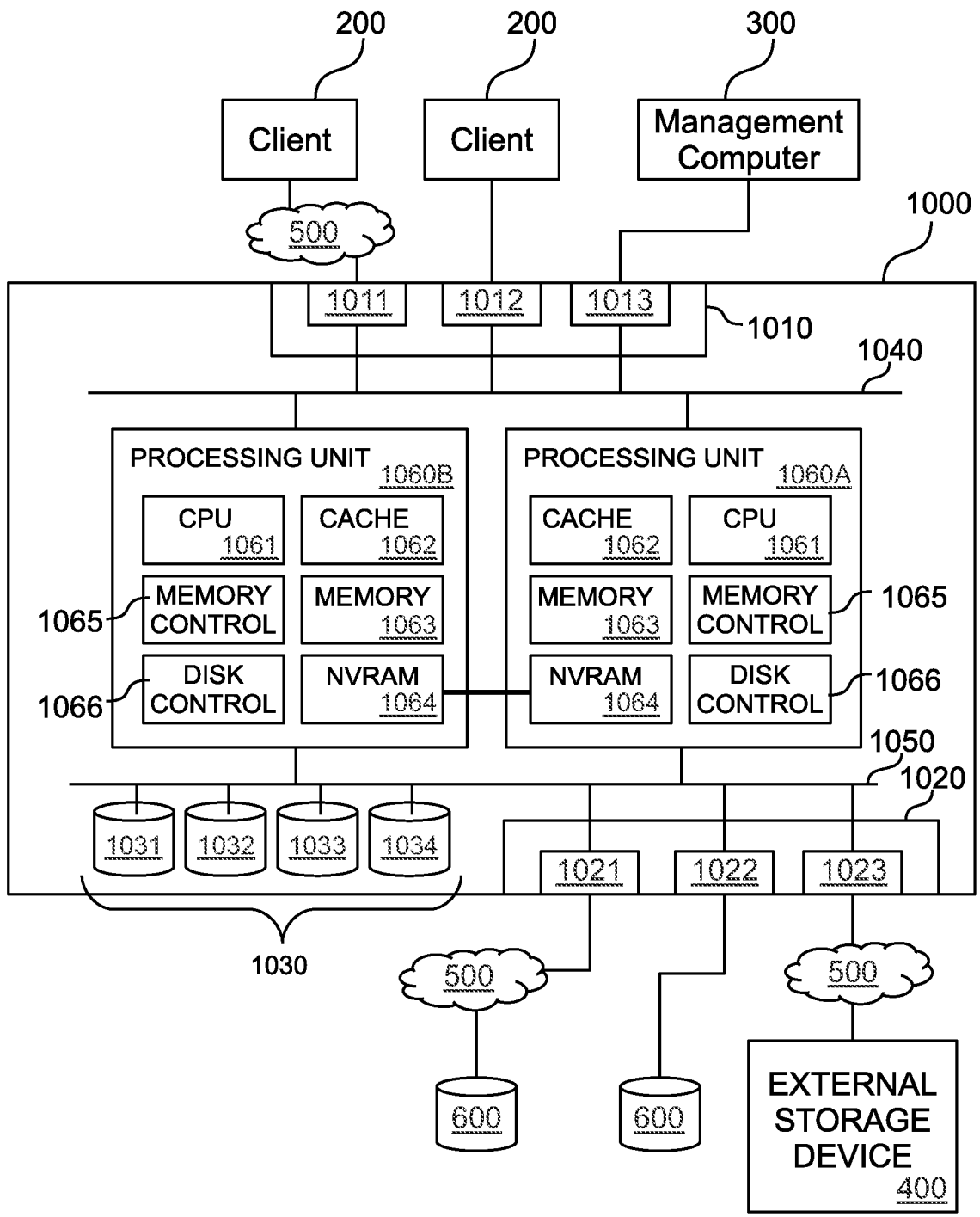
FIG. 1A exemplarily shows a schematic diagram of a data storage apparatus according to some exemplary embodiments.

In the following, preferred aspects and exemplary embodiments will be described in more detail with reference to the accompanying figures. Same or similar features in different drawings and embodiments are sometimes referred to by similar reference numerals.

It is to be understood that the detailed description below relating to various preferred aspects and preferred embodiments are not to be meant as limiting the scope of the present invention.

I. Terminology

As used in this description and the accompanying claims, the following terms shall have the meanings indicated, unless the context otherwise requires:

A "storage device" is a device or system that is used to store data. A storage device may include one or more magnetic or magneto-optical or optical disk drives, solid state storage devices, or magnetic tapes. For convenience, a storage device is sometimes referred to as a "disk" or a "hard disk." A data storage system may include the same or different types of storage devices having the same or different storage capacities.

A "RAID controller" is a device or system that combines the storage capacity of several storage devices into a virtual piece of storage space that may be referred to alternatively as a "system drive" ("SD"), a "logical unit" ("LU" or "LUN"), or a "volume." Typically, an SD is larger than a single storage device, drawing space from several storage devices, and includes redundant information so that it can withstand the failure of a certain number of storage devices without data loss. In exemplary embodiments, each SD is associated with a unique identifier that is referred to hereinafter as a "logical unit identifier" or "LUID," and each SD will be no larger than a predetermined maximum size, e.g., 2 TB-64 TB or more.

When commands are sent to an SD, the RAID controller typically forwards the commands to all storage devices of the SD at the same time. The RAID controller helps to overcome three of the main limitations of typical storage devices, namely that the storage devices are typically the slowest components of the storage system, they are typically the most likely to suffer catastrophic failure, and they typically have relatively small storage capacity.

A "RAID system" is a device or system that includes one or more RAID controllers and a number of storage devices. Typically, a RAID system will contain two RAID controllers (so that one can keep working if the other fails, and also to share the load while both are healthy) and a few dozen storage devices. In exemplary embodiments, the RAID system is typically configured with more or much more than two SDs. When a file server needs to store or retrieve data, it sends commands to the RAID controllers of the RAID system, which in turn are responsible for routing commands onwards to individual storage devices and storing or retrieving the data as necessary.

With some RAID systems, mirror relationships can be established between SDs such that data written to one SD (referred to as the "primary SD") is automatically written by the RAID system to another SD (referred to herein as the "secondary SD" or "mirror SD") for redundancy purposes. The secondary SD may be managed by the same RAID system as the primary SD or by a different local or remote RAID system. Mirroring SDs effectively provides RAID 1+0 functionality across SDs in order to provide recovery from the loss or corruption of an SD or possibly even multiple SDs in some situations.

A "file system" is a structure of files and directories (folders) stored in a file storage system. Within a file storage system, file systems are typically managed using a number of virtual storage constructs, and in exemplary embodiments, file systems are managed using a hierarchy of virtual storage constructs. In some embodiments, file systems are managed as a group of objects, each file or directory being associated with and/or managed as a file system object. Metadata of the file system, its configuration and the file system objects may be stored and managed in system objects and/or metadata objects. File system functionality of a file server may include object management, free space management (e.g. allocation) and/or directory management.

A "block" is generally a unit of storage of predetermined size. A "storage block" may be a unit of storage in the file system that corresponds to portion of physical storage in which user data and/or system data is stored. A file system object (discussed below) generally includes one or more blocks. A "data block" may refer to a unit of data (e.g. user data or metadata) to be written to one storage block. Typically the terms "block", "data block" or "data storage block" may be used interchangeably in the framework of the present disclosure since usually the allocation of a storage block is followed by writing the data to the storage block, hence "data block" may also refer to the unit of storage in the file system that corresponds to portion of physical storage in which user data and/or system data is stored.

In the exemplary embodiments, it is to be noted that the terms "objects" and "blocks" do not refer to only the application to file systems. Rather, objects may relate to logical volumes, logical units (LUNs), file systems, file system objects, object-type storage, and may others. In general, an object is an entity that stores related data in one or more data blocks, and data stored for an object may be extended, truncated, modified, deleted, over-written, to name but a few operations. Each data object has related metadata indicating information of logical and/or physical storage locations, such metadata being managed and stored as one or more tree structures of metadata nodes.

Exemplary embodiments of the present invention are described with reference to an exemplary file system of the type used in various file servers e.g. as sold by Hitachi Data Systems, although it should be noted that various concepts may be applied to other types of data storage systems.

An exemplary file server is described in U.S. Pat. No. 7,457,822, entitled "Apparatus and Method for Hardware-based File System", which is incorporated herein by reference, and PCT application publication number WO 01/28179 A2, published Apr. 19, 2001, entitled "Apparatus and Method for Hardware Implementation or Acceleration of Operating System Functions", which is incorporated herein by reference.

Another implementation of an exemplary file server and hardware-implemented file system management is set forth in U.S. application Ser. No. 09/879,798, filed Jun. 12, 2001, entitled "Apparatus and Method for Hardware Implementation or Acceleration of Operating System Functions", which is incorporated herein by reference.

An exemplary file storage system is described in WO 2012/071335 and U.S. application Ser. No. 13/301,241 entitled "File Cloning and De-Cloning in a Data Storage System", which was filed on Nov. 21, 2011, which are incorporated herein by reference.

An exemplary file server including various hardware-implemented and/or hardware-accelerated subsystems, for example, is described in U.S. patent application Ser. Nos. 09/879,798 and 10/889,158, which are incorporated by reference herein, and such file server may include a hardware-based file system including a plurality of linked sub-modules, for example, as described in U.S. patent application Ser. Nos. 10/286,015 and 11/841,353, which are incorporated by reference herein.

II. Exemplary Architectures of Data Storage Systems of Exemplary Embodiments

FIG. 1A exemplarily shows a schematic diagram of a data storage apparatus 1000 in a data storage system according to exemplary embodiments. One or more such data storage apparatuses 1000 may be used to realize a functional layer structure of any of FIGS. 2A to 2D below.

The data storage apparatus 1000 exemplarily includes an I/O interface 1010 (e.g. front-end interface) exemplarily having physical ports 1011, 1012 and 1013 and being connectable to one or more input/output devices 200 (such as e.g. the clients 200, and/or a management computer 300). Such I/O interface 1010 functions and/or functional handling thereof may be included in an interface/protocol layer 110 of any of FIGS. 2A to 2D below.

The data storage apparatus 1000 exemplarily further includes an external storage interface 1020 (e.g. back-end interface) exemplarily having physical ports 1021, 1022 and 1023 and being connectable to one or more externally connected storage devices 600 (e.g. one or more storage disks and/or storage flash modules) for storing metadata (e.g. system metadata) and data (e.g. user data) and/or to an external storage system 400 (which may include one or more externally connected storage devices such as storage disks and/or storage flash modules) for storing metadata (e.g. system metadata) and data (e.g. user data). Such external storage interface 1020 functions and/or functional handling thereof may be included in a storage device layer 140 of any of FIGS. 2A to 2D below.

The connections to the above interfaces 1010 and 1020 may be direct, via wired connections or wireless connections, and/or via communication networks, such as e.g. networks 500 in FIG. 1A.

Furthermore, exemplarily, the data storage apparatus 1000 further includes one or more internal storage devices 1031, 1032, 1033 and 1034 (e.g. one or more storage disks and/or storage flash modules), summarized as internal storage devices 1030, for storing metadata (e.g. system metadata) and data (e.g. user data).

In further exemplary embodiments, the data storage apparatus(es) may only include internal storage devices (not being connected to external storage devices/systems) and in further exemplary embodiments, the data storage apparatus(es) may only be connected to external storage devices/systems (not having internal storage devices).

The data storage apparatus 1000 exemplarily further includes a processing unit 1060A and optionally another processing unit 1060B. The processing units 1060A and 1060B exemplarily communicate with the interfaces 1010 and 1020, as well as with the internal storage devices 1030, via internal bus systems 1040 and 1050.

Each of the processing units 1060A and 1060B exemplarily includes a processor 1061 (e.g. central processing unit, or CPU), a memory controller 1065, a disk controller 1066 and memories such as e.g. the cache memory 1062, the system memory 1063 and the non-volatile memory 1064 (e.g. NVRAM). The memory controller 1065 may control one or more of the memories such as e.g. the cache memory 1062, the system memory 1063 and the non-volatile memory 1064 (e.g. NVRAM).

The I/O requests/responses to/from the internal storage devices 1030 and/or to/from the external storage devices/systems 400 and 600 (via the interface 1020) is exemplarily controlled by the disk controller 1066 of the data storage apparatus 1000. Accordingly, the disk controller 1066 and/or its functions and/or functional handling thereof may be included in a storage device layer 140 of any of FIGS. 2A to 2D below.

Exemplarily, e.g. for mirroring purposes, the NVRAMs 1064 of the processing units 1060A and 1060B of the data storage apparatus 1000 are exemplarily connected to each other to transfer data between the NVRAMs 1064.

For example, each NVRAM 1064 may be divided into two portions of similar size, and one portion of each NVRAM 1064 is provided to store data and or metadata handled by its respective processing unit 1060 and the other portion of each NVRAM 1064 is provided to store mirrored data from the other NVRAM via the connection, respectively.

For example, the connection between the non-volatile memories 1064 may be exemplarily realized as a non-transparent bridge connection, e.g. by PCIe connection.

Further exemplarily, each of the processing units 1060A and 1060B exemplarily includes a system memory 1063 (e.g. for storing processing related data or program data for execution by the respective processing units) and a cache memory 1063 for temporarily storing data such as e.g. cache data related with metadata and/or data for handling I/O access messages.

For controlling the system memory 1063, the cache memory 1064 and/or the non-volatile memory 1064 (NVRAM), each of the processing units 1060A and 1060B exemplarily includes a memory controller 1065.

For processing, handling, converting, and/or encoding headers of messages, requests and/or responses, the data storage apparatus 1000 exemplarily further includes the processor 1061 (or other type of processing unit which may include one or more processors, one or more programmable logic devices such as integrated circuits, Field Programmable Gate Arrays (FPGAs), or the like, and/or one or more processors such as e.g. CPUs and/or microprocessors).

For temporarily storing data (including metadata and/or user data), the data storage apparatus 1000 includes the non-volatile memory 1064 (e.g. one or more NVRAMs). The non-volatile memory and/or NVRAM(s) may also be referred to as "cache memory" in exemplary embodiments, e.g. if the cache memory 1062 is formed as a portion of the non-volatile memory.

For example, in some embodiments, the difference between cache memory and the non-volatile memory may be that the data in non-volatile memory is stored such as to be retained even after power loss (i.e. being non-volatile), while cache memory may refer to volatile memory. In some exemplary embodiments a difference between the configuration of cache memory and the non-volatile memory (NVRAM) may be that the data stored in the non-volatile memory may additionally be mirrored to another non-volatile memory (e.g. one or more NVRAMs of the other processing unit or another connected data storage apparatus).

The processing unit(s) 1060A and/or 1060B and/or its functions and/or functional handling thereof may be included in a metadata layer 120 and/or a data protection layer 130 of any of FIGS. 2A to 2D below.

Figure 1B:
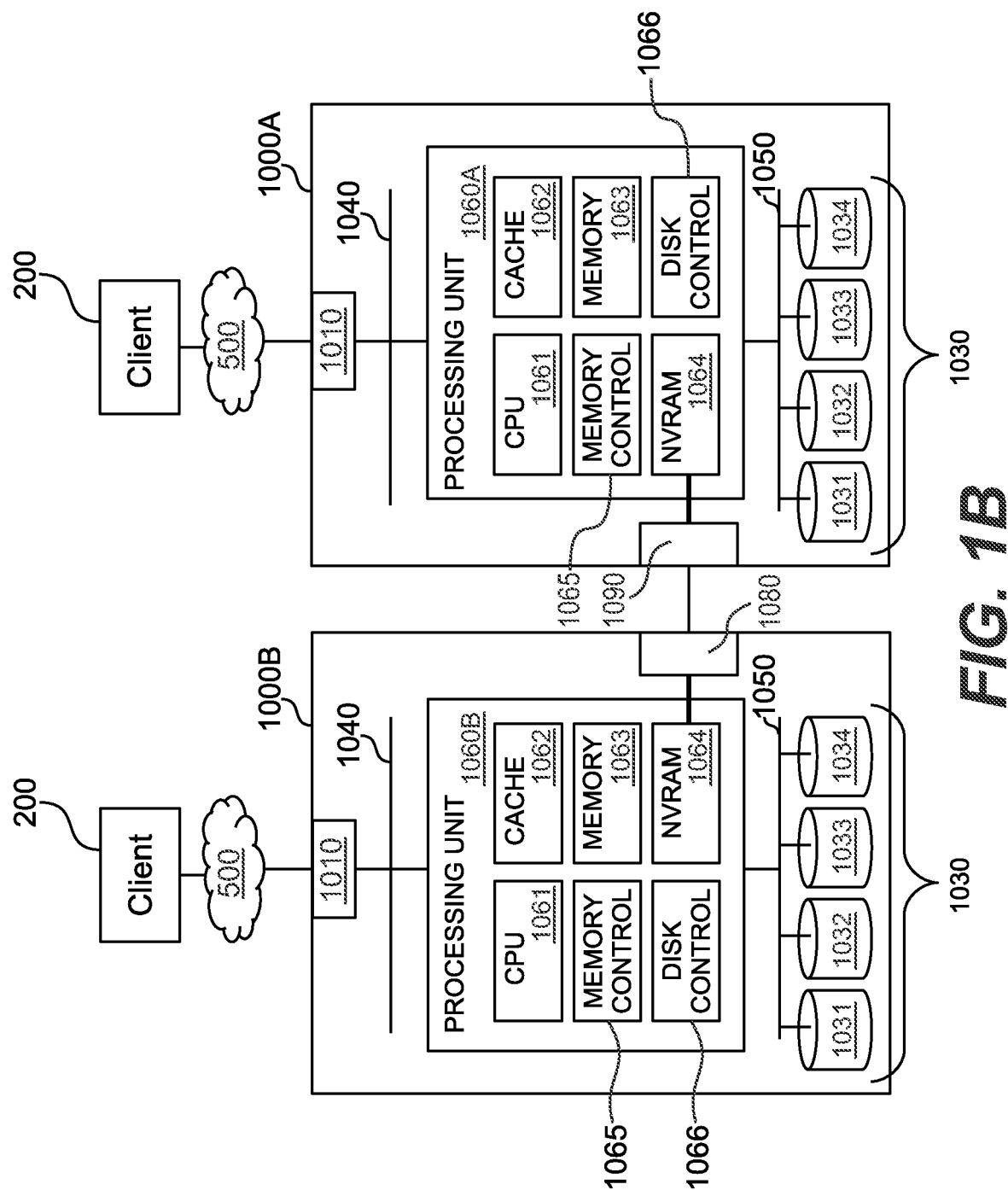
FIG. 1B exemplarily shows a schematic diagram of a data storage system comprising plural data storage apparatuses according to some exemplary embodiments.

FIG. 1B exemplarily shows a schematic diagram of a data storage system comprising plural data storage apparatuses 1000A and 1000B in a data storage system according to further exemplary embodiments.

The data storage apparatuses 1000A and 1000B may be realized as node apparatuses in a storage system cluster of plural node apparatuses, which may be communicably connected with each other via the network interfaces 1010 (or via other front-end or back-end interfaces).

A difference to the data storage apparatus 1000 of FIG. 1A is that the non-volatile memory 1064 (e.g. NVRAM) of the respective processing units 1060 of both data storage apparatuses 1000A and 1000B are connected via a connection between the respective interfaces 1064 of the data storage apparatuses 1000A and 1000B, in particular for mirroring data of the non-volatile memory 1064 (e.g. NVRAM) of the data storage apparatus 1000A in the non-volatile memory 1064 (e.g. NVRAM) of the data storage apparatus 1000B, and vice versa.

Exemplarily, the interfaces 1020 of the data storage apparatuses 1000A and 1000B are not shown in FIG. 1B, but additional interfaces 1020 for connection to external storage devices and/or storage systems may be provided.

Exemplarily, e.g. for mirroring purposes, the NVRAMs 1064 of the processing units 1060 of both data storage apparatuses 1000A and 1000B are exemplarily connected to each other to transfer data between the NVRAMs 1064.

For example, each NVRAM 1064 may be divided into two portions of similar size, and one portion of each NVRAM 1064 is provided to store data and or metadata handled by its respective processing unit 1060 and the other portion of each NVRAM 1064 is provided to store mirrored data from the other NVRAM via the connection, respectively.

Figure 2A:
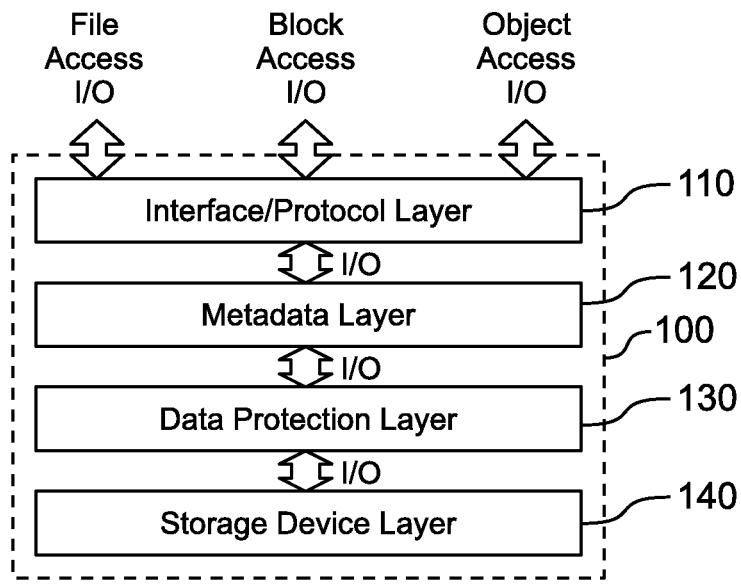
FIG. 2A exemplarily shows a schematic diagram of a data storage system layer architecture according to some exemplary embodiments.
Figure 2B:
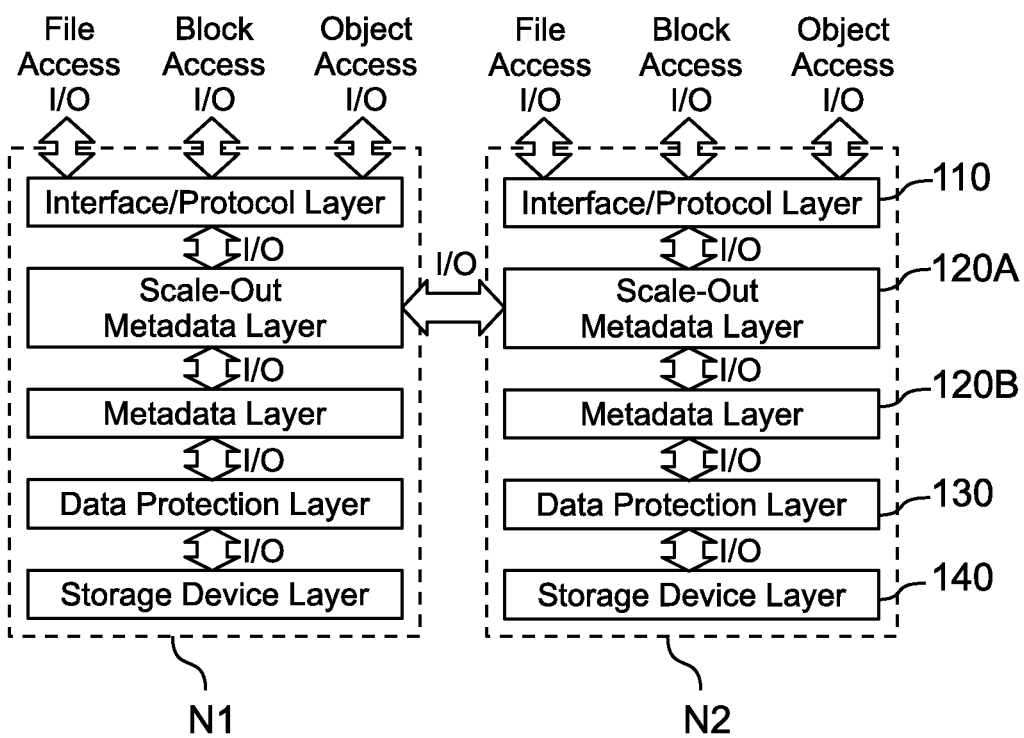
FIG. 2B exemplarily shows a schematic diagram of another data storage system layer architecture according to some exemplary embodiments.
Figure 2C:
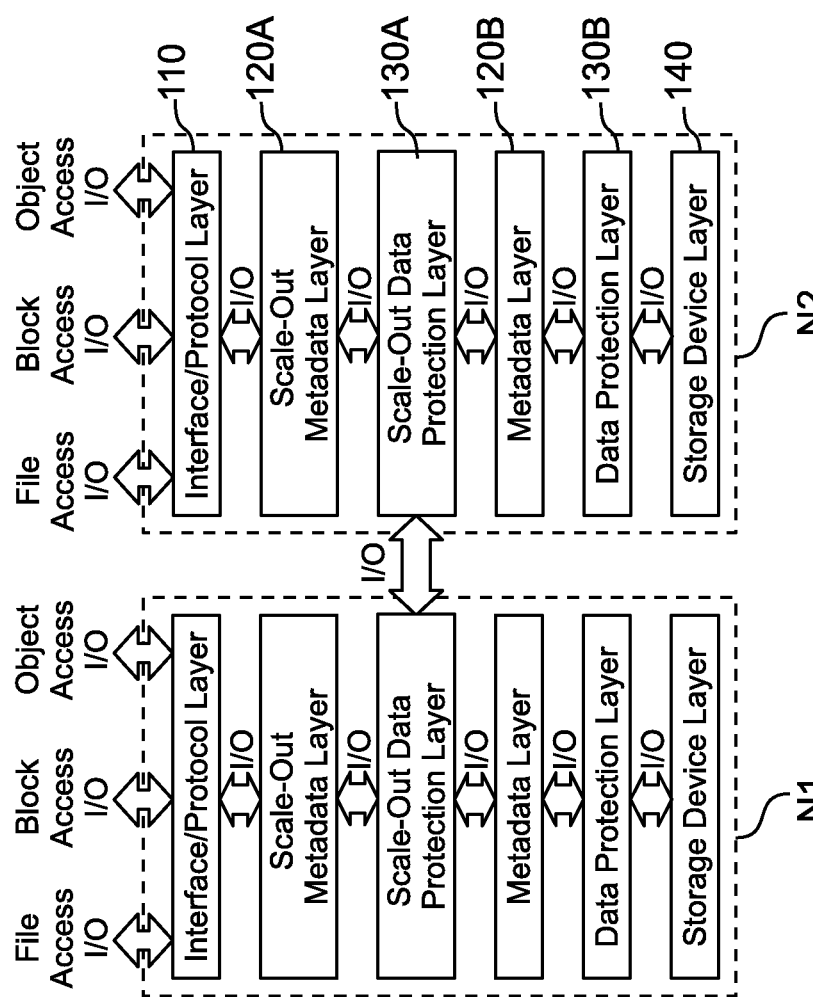
FIG. 2C exemplarily shows a schematic diagram of another data storage system layer architecture according to some exemplary embodiments.

FIG. 2C exemplarily shows a schematic diagram of another data storage apparatus 1000 according to exemplary embodiments.

Figure 1C:
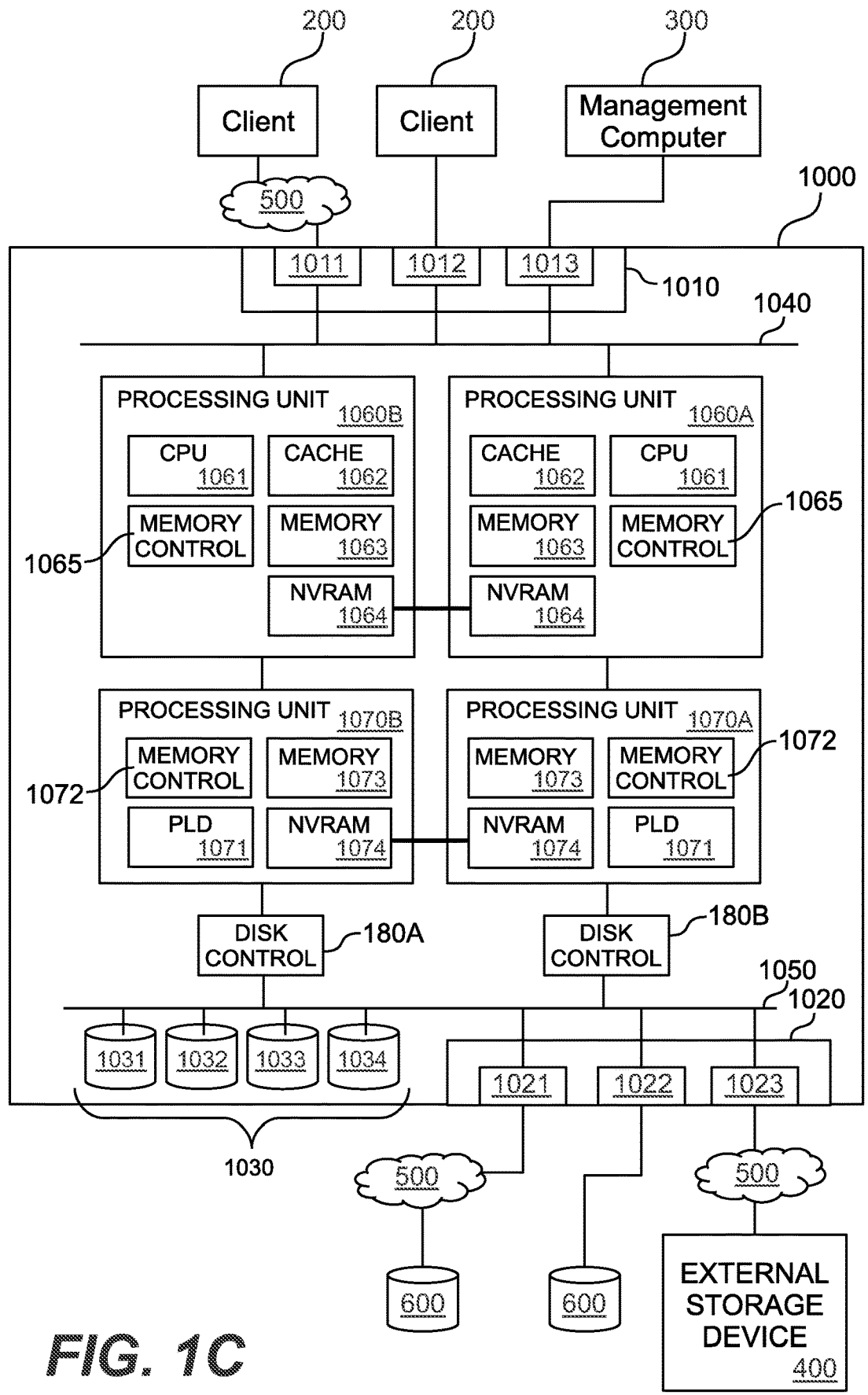
FIG. 1C exemplarily shows a schematic diagram of another data storage apparatus according to some exemplary embodiments.

Exemplarily, in FIG. 1C, in addition to the processing units 1060A and 1060B which may be provided similar as in FIG. 1A, the data storage apparatus 1000 includes, for hardware acceleration purposes, further processing units 1070A and 1070B which may be provided with respective programmable logic devices 1071 (e.g. instead or in addition to processors) for processing data movement, data handling or request/response handling in addition to or in support of the processors 1061 of the processing units 1060A and 1060B.

The programmable logic devices 1071 may be realized by one or more integrated circuits such as e.g. including one or more Field Programmable Gate Arrays (FPGAs). The processing units 1070A and 1070B may include own memories 1073 and non-volatile memories 1074 (e.g. NVRAMs), as well as e.g. their own memory controllers 1072. However, the programmable logic devices 1071 may also be responsible for the control of the memories 1073 and 1074.

Exemplarily, e.g. for mirroring purposes, the NVRAMs 1074 of the processing units 1070A and 1070B of the data storage apparatus 1000 are exemplarily connected to each other to transfer data between the NVRAMs 1074.

For example, each NVRAM 1074 may be divided into two portions of similar size, and one portion of each NVRAM 1074 is provided to store data and or metadata handled by its respective processing unit 1070 and the other portion of each NVRAM 1074 is provided to store mirrored data from the other NVRAM via the connection, respectively.

For example, the connection between the non-volatile memories 1074 may be exemplarily realized as a non-transparent bridge connection, e.g. by PCIe connection.

Figure 1D:
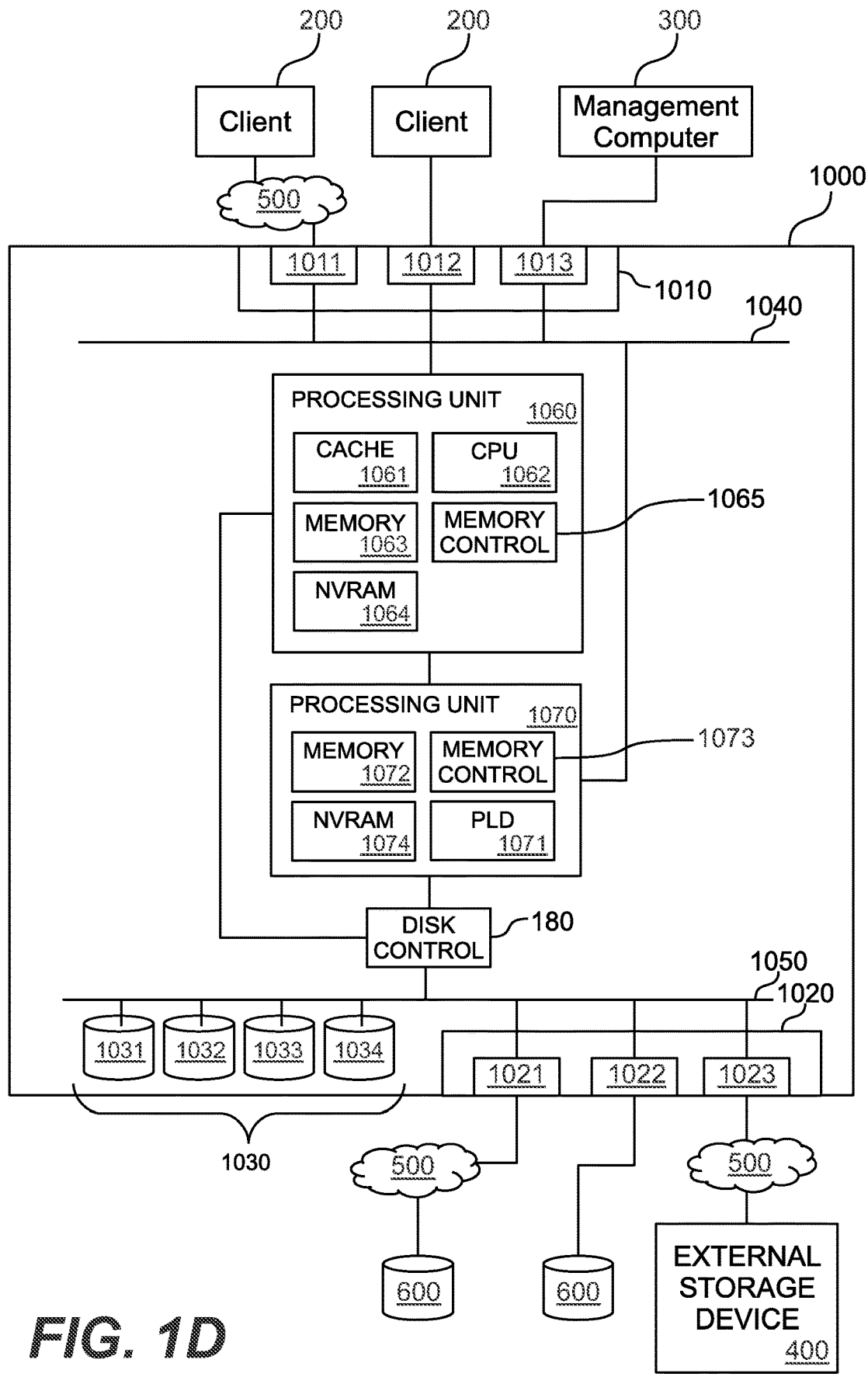
FIG. 1D exemplarily shows a schematic diagram of another data storage apparatus according to some exemplary embodiments.

FIG. 1D exemplarily shows a schematic diagram of another data storage apparatus 1000 according to some exemplary embodiments.

Exemplarily, in FIG. 1D, in addition to the processing unit 1060 which may be provided similar as in FIG. 2A, the data storage apparatus 1000 includes, for hardware acceleration purposes, further another processing unit 1070 which may be provided with a respective programmable logic device 1071 (e.g. instead or in addition to processors) for processing data movement, data handling or request/response handling in addition to or in support of the processor 1061 of the processing unit 1060.

The programmable logic device 1072 may be realized by one or more integrated circuits such as e.g. including one or more Field Programmable Gate Arrays (FPGAs). The processing unit 1070 may include its own (cache and/or ROM and/or RAM) memory 1073 and non-volatile memory 1074 (e.g. NVRAM), as well as e.g. its own memory controller 1072. However, the programmable logic device 1071 may also be responsible for the control of the memories 1073 and 1074.

In all of the above configurations, the processing unit/units of the data storage apparatus(es) may be configured, by one or more software programs and/or based on hardware implemented processing (e.g. by support of programmable logic devices), to execute, by themselves or in combination with one or more further processing unit(s), the processing and methods of examples of control and management processes described herein.

III. Exemplary Layer Structures of Data Storage Systems of Exemplary Embodiments The below descriptions relate to some exemplary software layer configurations in exemplary embodiments. However, it is to be noted that the shown layer structures shall not be intended to be interpreted in any limiting way. The ordering or configurations of layers may be different in other exemplary embodiments, and also additional layers can be added or some of the layers do not need to be present in other exemplary embodiments.

FIG. 2A exemplarily shows a schematic diagram of a data storage system layer architecture 100 according to exemplary embodiments.

Such functional data storage system layer architecture 100 (which may be provided by software, hardware or any combination thereof) can be realized on any one of the data storage apparatuses 1000 (1000A, 1000B) of FIGS. 1A to 1D.

Some or all respective layers may use shared resources (such as sharing processing units, processors, programmable logic devices, memories such as system memories, cache memories and/or non-volatile memories or NVRAMs, controllers and/or storage devices), or some or all layers may be provided on their own respective resources (e.g. having their own dedicated processing units, processors, programmable logic devices, memories such as system memories, cache memories and/or non-volatile memories or NVRAMs, controllers and/or storage devices).

Also the layers may share some resources with other layers for some functions while they own other resources for other functions by themselves.

The data storage system layer architecture 100 exemplarily includes an interface/protocol layer 110, a metadata layer 120, a data protection layer 130 and a storage device layer 140. The data storage system layer architecture 100 may be realized on one or more servers, file servers, computers, storage devices, storage array devices, cluster node apparatuses etc., in particular exemplarily according to configurations of any of FIGS. 1A to 1D.

The interface/protocol layer 110 can exemplarily be communicably connected to client computers 200 and/or an exemplary optional management computer 300, e.g. via physical ports and/or communication networks (e.g. via front-end interfaces 1010 above, such as network interfaces or the like).

The interface/protocol layer 110 may include one or more physical interfaces including one or more physical ports, physical switches, physical connectors, physical interface boards, wireless interfaces etc. for physical connection, network connection and/or wireless connection to one or more networks, computers (clients, hosts, management computers, etc.), servers, or the like.

Also, the interface/protocol layer 110 may include functions, executed on one or more processing units (e.g. processing units of any of FIGS. 1A to 1D), for example, to receive, process, convert, handle, and/or forward messages, requests, instructions, and/or responses in multiple protocols and I/O access types.

Specifically, the interface/protocol layer 110 is preferably configured to receive, process, convert, handle one or more (and preferably all) of:

file-access I/O messages (including file-access I/O requests directed to files and/or directories of one or more file systems) according to one or file access protocols (such as e.g. one or more of AFP, NFS, e.g. $NFS_{V3}$, $NFS_{V4}$ or higher, or SMB/CIFS or $SMB_2$ or higher);

block-access I/O messages (including block-access I/O requests directed to blocks of virtual, logical or physical block-managed storage areas) according to one or more block access protocols (such as e.g. one or more of iSCSI, Fibre Channel and FCoE which means "Fibre Channel over Ethernet"); and object-access I/O messages (including object-access I/O requests directed to objects of an object-based storage) according to one or object-based access protocols (such as e.g. IIOP, SOAP, or other object-based protocols operating over transport protocols such as e.g. HTTP, SMTP, TCP, UDP, or JMS).

The above connection types and communication functions may include different interfaces and/or protocols, including e.g. one or more of Ethernet interfaces, internet protocol interfaces such as e.g. TCPIP, network protocol interfaces such as e.g. Fibre Channel interfaces, device connection bus interfaces such as e.g. PCI Express interfaces, file system protocol interfaces such as NFS and/or SMB, request/response protocol interfaces such as e.g. HTTP and/or HTTP REST interfaces, system interface protocols such as e.g. iSCSI and related interfaces such as e.g. SCSI interfaces, and NVM Express interfaces.

The interface/protocol layer 110 is exemplarily configured to connect to and communicate with client computers 200 and/or the management computer 300 to receive messages, responses, requests, instructions and/or data, and/or to send messages, requests, responses, instructions and/or data from/to the client computers 200 and/or the management computer 300, preferably according to plural different protocols for file access I/Os, block access I/Os and/or object access I/Os.

Accordingly, in some exemplary embodiments, such requests and responses exchanged between the data storage system layer architecture 100 and the client computers zoo may relate to I/O requests to one or more file systems (e.g. based on file access protocol I/O messages) and/or to I/O requests to blocks of physical, logical or virtual storage constructs of one or more storage devices (e.g. based on block access protocol I/O messages) of the data storage system 100.

Also, such requests and responses exchanged between the data storage system layer architecture 100 and the client computers 200 may relate to I/O requests to objects of object-based storage (e.g. based on object access protocol I/O messages) provided by the data storage system 100.

The I/O requests on the basis of file access protocols may be including e.g. read requests to read stored data in a file system (including reading file data, reading file system metadata, reading file and/or directory attributes) or write data into a file system (including creating files and/or directories, modifying files, modifying attributes of files and/or directories, etc.).

The I/O requests on the basis of block access protocols may be including e.g. read requests to read stored data in one or more blocks of a block-based storage area (including reading data or metadata from blocks of a virtual, logical or physical storage area divided in blocks based on block addresses such as e.g. logical block addresses LBAs, and/or block number, e.g. reading data blocks of logical units (LUs)) and write data to blocks of a block-based storage area (including writing data blocks to newly allocated blocks of a virtual, logical or physical storage area divided in blocks based on block addresses such as e.g. logical block addresses LBAs, and/or block number, e.g. writing data blocks of logical units (LUs); or modifying data of previously written data blocks in blocks of the block-based storage area).

In the context of block-based storage on virtual, logical and/or physical storage devices organized in one or more storage areas being provided in units of blocks, it is emphasized that the terms "storage block" and "data block" may refer to related aspects, but are generally intended to differentiate between the "storage block" as a construct for storing data as such, e.g. having a certain block size and being configured to store data of an amount according to the block size, and the "data block" shall refer to the unit of data of an amount according to the block size, i.e. to the block sized unit of data that is written to (or can be read from) one "storage block". When using the term "block" as such, this typically may refer to the "storage block" in the sense above.

As mentioned above, the I/O requests/responses exchanged between clients 200 and the interface/protocol layer 110 may include object-related I/O requests/responses relating to data objects of object-based storage (which may also include an object-based managed file system), file-system-related I/O requests/responses relating to files and/or directories of one or more file systems, and/or block-related I/O requests/responses relating to data stored in storage blocks of block-managed storage areas (provided virtually, logically or physically) on storage devices.

The interface/protocol layer 110 communicates with the metadata layer 120, e.g. for sending requests to the metadata layer 120 and receiving responses from the metadata layer 120.

In exemplary embodiments, the communication between interface/protocol layer 110 and metadata layer 120 may occur in an internal protocol which may be file-based, block-based or object-based. However, standard protocols may be used.

The interface/protocol layer 110 may receive messages (such as I/O requests) from the clients in many different protocols, and the interface/protocol layer 110 is configured to convert messages of such protocols, or at least headers thereof, to the messages to be sent to the metadata layer 120 according to the protocol used by the metadata layer 120. In some exemplary embodiments, the metadata layer 120 may be configured to handle object-related I/O requests.

The metadata layer 120 may then preferably be configured to convert object-related I/O requests relating to data objects (which may relate to block-based storage areas managed as data objects, to file-based files and/or directories of one or more file systems managed as file system objects, and/or to data objects or groups of data objects managed as data objects) into corresponding block-related I/O requests (according to a block access protocol) relating to data stored in storage blocks of virtually, logically or physically provided storage areas of storage devices, and vice versa.

In some exemplary embodiments, the metadata layer 120 may be configured to hold and manage metadata on a data object structure and on data objects of the data object structure in a metadata structure and/or metadata tree structure according to later described examples and exemplary embodiments.

The metadata layer 120 preferably communicates with the data protection layer 130, e.g. for sending requests to the data protection layer 130 and receiving responses from the data protection layer 130, preferably as block-related I/O requests (according to a block access protocol).

The data protection layer 130 communicates with the storage device layer 140, e.g. for sending requests to the storage device layer 140 and receiving responses from the storage device layer 140, preferably as block-related I/O requests (according to a block access protocol).

The data protection layer 130 may include processing involved in connection with data protection, e.g. management of data replication and/or data redundancy for data protection. For example, the data protection layer 130 may include data redundancy controllers managing redundant data writes, e.g. on the basis of RAID configurations including mirroring, and redundant striping with parity. The data protection layer 130 could then be configured to calculate parities.

The storage device layer 140 may execute reading data from storage devices and writing data to storage devices based on messages, requests or instructions received from the data protection layer 130, and may forward responses based on and/or including read data to the data protection layer 130.

In general, I/O processing may be realized by the layer architecture such that the interface/protocol layer 110 receives an I/O request (file-access, block-access or object-access) and converts the I/O request (or at least the header thereof) to a corresponding I/O request in the protocol used by the metadata layer 120 (e.g. object-based, object access).

The metadata layer 120 uses address information of the received I/O request and converts the address information to the address information used by the data protection layer 130. Specifically, the metadata layer 120 uses address information of the received I/O request and converts the address information to related block addresses used by the data protection layer 130. Accordingly, the metadata layer 120 converts received I/O requests to block access I/O in a block-based protocol used by the data protection layer 130.

The data protection layer 130 receives the block access I/O from the metadata layer 120, and converts the logical block address information to physical block address information of related data (e.g. taking into account RAID configurations, and parity calculations, or other error-code calculations) and issues corresponding block access I/O requests in a block-based protocol to the storage device layer 140 which applies the block access I/O to the storage device (e.g. by reading or writing data from/to the storage blocks of the storage devices).

For response messages, e.g. based on read requests to read user data, the corresponding response (e.g. with the user data to be read) can be passed the other way around, for example, in that the storage device layer 140 returns the read user data in a block-based protocol to the data protection layer 130, the data protection layer 130 returns the read user data in a block-based protocol to the metadata layer 120, the metadata layer 120 returns the read user data preferably in an object-based protocol to the interface/protocol layer 110, and the interface/protocol layer 110 returns the final read response to the requesting client.

However, for the above processing, the metadata layer 120 may make use of large amounts of metadata (which is managed in metadata tree structures according to the preferred embodiments herein), which is also stored to storage devices (i.e. in addition to the actual user data of the object-based storage, file system based storage or block-based storage shown to the client).

Accordingly, when handling I/O request such as write requests and/or read requests, the metadata layer may need to obtain metadata, which may lead to read and write amplifications in the communications between the metadata layer 120 and the data protection layer 130 (or directly with the storage device layer, in exemplary embodiments which store metadata directly on storage devices without additional data protection schemes). Such read and write amplifications shall preferably be avoided or at least be reduced by storing parts of metadata tree structures in cache memory.

FIG. 2B exemplarily shows a schematic diagram of another data storage system layer architecture 100 according to further exemplary embodiments.

Exemplarily, the data storage system layer architecture 100 of FIG. 2B is proposed for scale-out purposes, in which multiple node apparatuses (which may also operate as single data storage apparatus, preferably) may be connected to form a cluster system which may be extended (scale-out) by adding further node apparatuses, when needed.

In this connection, it is indicated that the term "node apparatus" in the present context refers to a device entity which forms a part of a cluster system of inter-connectable "node apparatuses". This needs to be distinguished from "metadata nodes", (e.g. "root nodes", "direct nodes" or "indirect nodes") as described later, as such "metadata nodes" from data constructs (data elements) which are units of metadata managed in metadata tree structures as described below. Sometimes, "metadata nodes" are also referred to as onodes or inodes.

Exemplarily, FIG. 2B shows two node apparatuses N1 and N2 included in a cluster of two or more node apparatuses (i.e. including at least N1 and N2), each node apparatus having an interface/protocol layer 110, a metadata layer 120B (similar to the metadata layer 120 above), a data protection layer 130 and a storage device layer 140, similar to the exemplary embodiment of FIG. 2A.

However, in order to scale out the request/response handling to the cluster node apparatuses, preferably between the interface/protocol layer 110 of the data storage system layer architecture 100 and the metadata layers 120B of the node apparatuses N1 and N2, the data storage system layer architecture 100 of FIG. 2B further includes a scale-out metadata layer 120A preferably provided between the interface/protocol layer 110 and the metadata layer 120B, to communicate I/O access messages (e.g. I/O requests or responses) between the scale-out metadata layers 120A of the node apparatuses of the cluster.

By such structure, the clients can send I/O requests to each of the node apparatuses (i.e. to which one or more node apparatuses they are connected themselves) independent of which node apparatus actually stores the target data of the I/O access or actually manages the storage device(s) storing the target data, and the scale-out metadata layers 120A respectively handle metadata managing mapping information locating the target data on the cluster.

Accordingly, the client may issue the I/O access request to either one of the cluster node apparatuses, and the scale-out metadata layer 120A of the receiving node apparatus identifies the node apparatus storing the target data based on scale-out metadata (which may also be stored in storage devices), and issues a corresponding I/O access request to the scale-out metadata layer 120A of the identified node apparatus.

The identified node apparatus handles the I/O request and responds to communicate an I/O response to the scale-out metadata layer 120A of the initial receiving node apparatus to return a corresponding response via the interface/protocol layer 110 of the initial receiving node apparatus to the requesting client.

Other layers in FIG. 2B may have functions similar to the corresponding layers of the layer architecture of FIG. 2A.

FIG. 2C exemplarily shows a schematic diagram of another data storage system layer architecture 100 according to further exemplary embodiments.

Again, the data storage system layer architecture 100 of FIG. 2C is proposed for scale-out purposes, in which multiple node apparatuses (which may also operate as single data storage apparatus, preferably) may be connected to form a cluster system which may be extended (scale-out) by adding further node apparatuses, when needed.

However, in addition to the layers of FIG. 2B, the layer architecture of FIG. 2C exemplarily further includes another scale-out data protection layer 130A exemplarily between the scale-out metadata layer 120A and the metadata layer 120B (which communicates with the data protection layer 130B), wherein the scale-out data protection layers 130A communicate I/O access messages (e.g. I/O requests or responses) between the scale-out data protection layers 130A of the node apparatuses of the cluster.

This may include another data protection scheme in which data may be redundantly stored on multiple node apparatuses as managed by the data protection layers 130A of the node apparatuses of the cluster, according to data protection schemes.

Figure 2D:
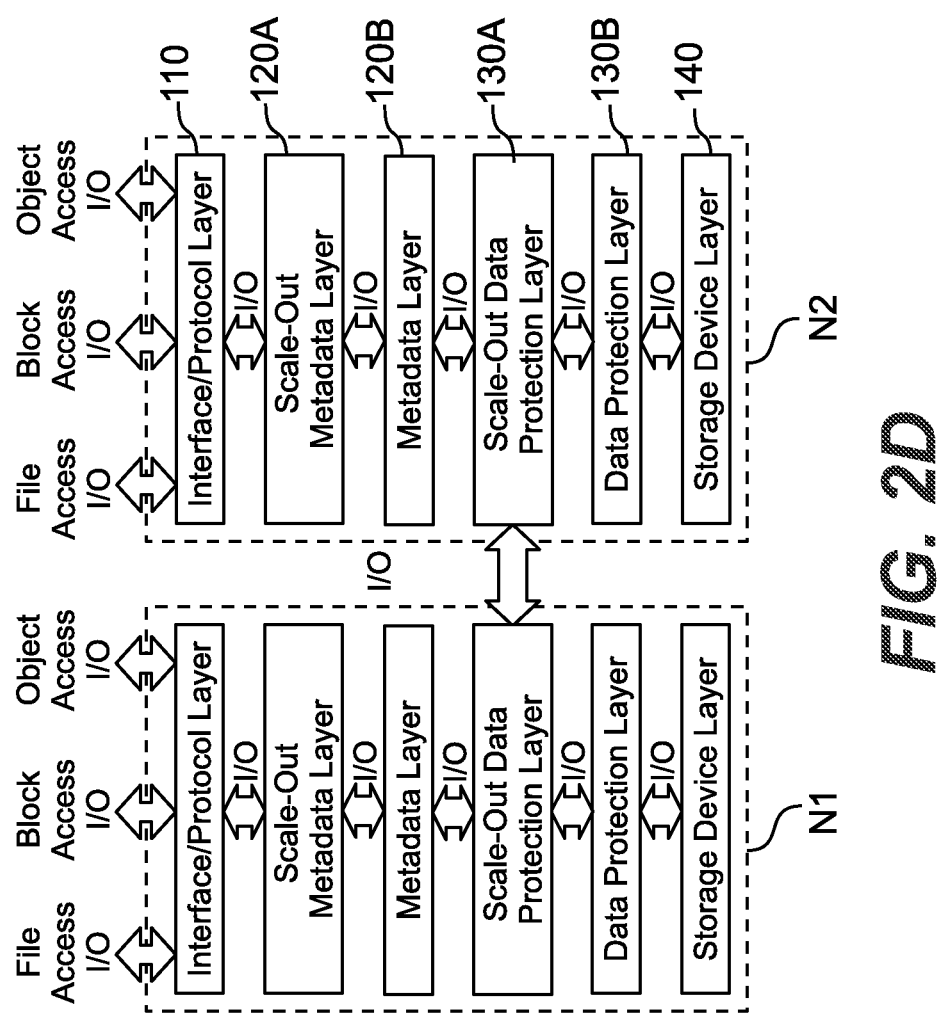
FIG. 2D exemplarily shows a schematic diagram of another data storage system layer architecture according to some exemplary embodiments.

FIG. 2D exemplarily shows a schematic diagram of another data storage system layer architecture 100 according to some exemplary embodiments.

Again, the data storage system layer architecture 100 of FIG. 2D is proposed for scale-out purposes, in which multiple node apparatuses (which may also operate as single data storage apparatus, preferably) may be connected to form a cluster system which may be extended (scale-out) by adding further node apparatuses, when needed.

However, in addition to the layers of FIG. 2B, the layer architecture of FIG. 2D exemplarily further includes another scale-out data protection layer 130A exemplarily between the metadata layer 120B and the data protection layer 130B, wherein the scale-out data protection layers 130A communicate I/O access messages (e.g. I/O requests or responses) between the scale-out data protection layers 130A of the node apparatuses of the cluster.

This may include another data protection scheme in which data may be redundantly stored on multiple node apparatuses as managed by the data protection layers 130A of the node apparatuses of the cluster, according to data protection schemes.

In the above exemplary configurations, the metadata layer 120 (and/or 120B) may make use of large amounts of metadata (which is managed in metadata tree structures according to the preferred embodiments herein), which is also stored to storage devices (i.e. in addition to the actual user data of the object-based storage, file system based storage or block-based storage shown to the client).

Accordingly, when handling I/O request such as write requests and/or read requests, the metadata layer may need to obtain metadata, which may lead to read and write amplifications in the communications between the metadata layer 120 and the data protection layer 130 (or directly with the storage device layer, in exemplary embodiments which store metadata directly on storage devices without additional data protection schemes). Such read and write amplifications shall preferably be avoided or at least be reduced by storing parts of metadata tree structures in cache memory.

IV. Data Object Location Management in Exemplary Embodiments

Figure 3B:
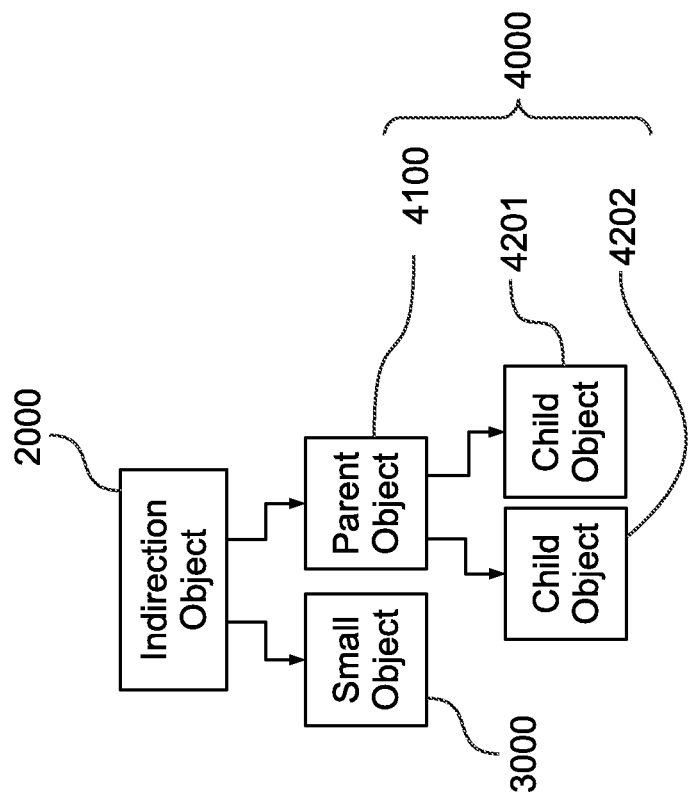
FIGS. 3A and 3B exemplarily show a metadata tree hierarchy of small and large data objects according to some exemplary embodiments.
Figure 3A:
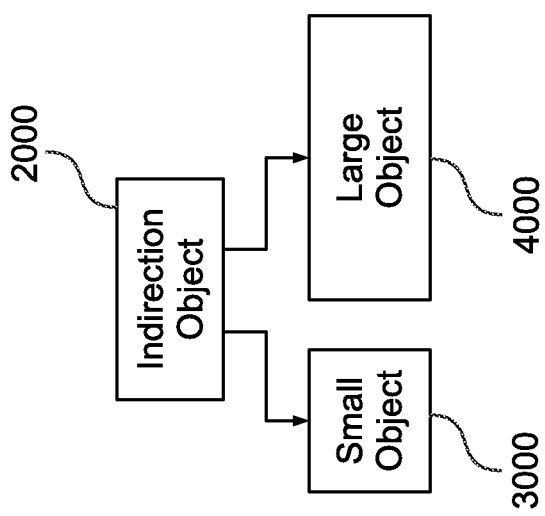

FIGS. 3A and 3B exemplarily show a metadata tree hierarchy of small and large data objects according to some exemplary embodiments.

IV.1 Data Objects and Data Object Metadata Tree Structures

Exemplarily, data objects are managed based on metadata structures, wherein, in principle, a data object can be managed based on an associated metadata tree structure including a root metadata node of the data object pointing directly and/or indirectly (e.g. via one or more direct and/or indirect metadata nodes) to data blocks or optionally pointing directly and/or indirectly (e.g. via one or more indirect metadata nodes) to plural direct metadata nodes which may include references to data blocks and/or references to other data objects, and optionally further including plural indirect metadata nodes being pointed to by the root metadata node of the data object or by other indirect metadata nodes and pointing directly and/or indirectly (via one or more other indirect metadata nodes) to plural direct metadata nodes.

IV.1.1 Indirection Object

On a higher level, an indirection object 2000, which has a metadata tree structure similar to other data objects, is provided, and the indirection object 2000 exemplarily points to other data objects. For example, the indirection object 2000 may be provided on each node apparatus of the cluster system, and the indirection object 2000 on each node apparatus may preferably point to the respective data objects on the respective node apparatus.

IV.1.2 Data Objects

In exemplary embodiments, the data objects may be provided as two types, including small data objects 3000 and large data objects 4000. The indirection object 2000 exemplarily points to small data objects 3000 as well as large data objects 4000, see e.g. FIG. 3A.

IV.1.2.1 Small Data Objects

Exemplarily, small data objects 3000 may be of a size that is smaller than a threshold size, referred to e.g. as distribution size, and such small data objects 3000 may be stored on one particular node apparatus, and such small data objects 3000 can be moved to another node apparatus of the cluster system as a whole.

IV.1.2.2 Large Data Objects

Further exemplarily, large data objects 4000 may be of a size that is larger than the threshold size, referred to e.g. as distribution size, and such large data objects 4000 may be stored in a distributed manner on plural node apparatuses, and such large data objects 4000 can be partially moved to other node apparatuses of the cluster system in units of the distribution size.

In exemplary embodiments, the large data objects 4000 are managed such that the data thereof is managed in segments of the distribution size. That is, each large data object 4000 is divided in plural data segments of the distribution size.

For example, if the size of a large data object 4000 is N times the distribution size (or more precisely larger than N−1 times but smaller than or equal to N times the distribution size), the data of the large data object 4000 will be stored in N distinct segments, which may be distributed to plural node apparatuses. In some exemplary embodiments, the respective data segments are managed as child objects 4200 of a certain parent object 4100.

IV.1.3 Exemplary Metadata Structures

In FIG. 3B, the indirection object 2000 exemplarily points to a small data object 3000 and a parent object 4100 of a large data object 4000, and the parent object 4100 points to two exemplary child objects 4201 and 4202 of the large data object 4000.

In this example, the large data object 4000 has two data segments of the distribution size, each being managed by a respective child object.

Similar to the indirection object 2000, the parent object 4100 may be managed by an associated metadata tree structure including a root metadata node of the data object pointing directly to data blocks or optionally pointing directly and/or indirectly (via one or more indirect metadata nodes) to plural direct metadata nodes which may include references to data blocks and/or references to other data objects, and optionally further including plural indirect metadata nodes being pointed to by the root metadata node of the data object or by other indirect metadata nodes and pointing directly and/or indirectly (via one or more other indirect metadata nodes) to plural direct metadata nodes.

The number of tree levels in the indirection object 2000 as well as the parent object 4100 may be unlimited, so that the number of data objects pointed to by the indirection object 2000 as well as the number of child objects 4200 pointed to by the parent object 4100 is generally unlimited.

Moreover, the metadata tree structures of data objects can be dynamically extended by adding further metadata nodes or even further metadata tree levels so as to increase the manageable data. For example, by extending the metadata tree structure of the indirection object 2000, the number of data objects managed (manageable) by the indirection object 2000 can be increased, and by extending the metadata tree structure of the parent object 4100, the number of child objects 4200 managed (manageable) by the parent object 4300 can be increased.

However, the size of small data objects 3000 as well as child objects 4200 is exemplarily limited and is smaller or equal to the distribution size. Accordingly, the number of tree levels in the small data object 3000 as well as the child object 4200 may be limited to a maximal number of tree levels.

In some exemplary embodiments, the small data object 3000 as well as the child object 4200 may be managed by an associated metadata tree structure including a root metadata node of the respective object pointing directly to plural direct metadata nodes which may include references to data blocks and/or references to other data objects. Then, the number of tree levels may be limited to two tree levels, including the first tree level of the root metadata node and the next tree level of the direct metadata nodes.

In other exemplary embodiments, the small data object 3000 as well as the child object 4200 may be managed by an associated metadata tree structure including a root metadata node of the data object pointing directly to data blocks or optionally pointing directly and/or indirectly (via one or more indirect metadata nodes) to plural direct metadata nodes which may include references to data blocks and/or references to other data objects, and optionally including plural indirect metadata nodes being pointed to by the root metadata node of the data object or by other indirect metadata nodes and pointing directly and/or indirectly (via one or more other indirect metadata nodes) to plural direct metadata nodes, wherein the number of tree levels of indirect metadata nodes between the first tree level of the root metadata node and the last tree level of the direct metadata nodes is fixed to a maximum number (being one or an integer larger than one).

For example, FIG. 7A exemplarily shows a schematic diagram of an exemplary metadata tree structure on a node apparatus according to some exemplary embodiments. Exemplarily, the indirection object in FIG. 7A includes four tree levels including a first tree level of the root metadata node R(IO) of the indirection object, two tree levels of intermediate indirect metadata nodes and a last tree level of the direct metadata nodes.

Assuming exemplarily that the number of pointers N(BP) per metadata node are fixed and equal for root metadata nodes, direct metadata nodes and indirect metadata nodes, the root metadata node R(IO) of the indirection object points to up to N(BP) intermediate indirect metadata nodes of the second metadata tree level of the indirection object.

On the other hand, each of the second tree level indirect metadata nodes may also point to up to another N(BP) intermediate indirect metadata nodes of the third metadata tree level of the indirection object, and each of the third tree level indirect metadata nodes may also point to up to another N(BP) direct metadata nodes of the fourth metadata tree level of the indirection object.

Accordingly, the maximum number of direct metadata nodes in the indirection object of four tree levels is the number N(BP) of pointers per metadata node to the third power (i.e. $[N(BP)]^3$), and, since each of the direct nodes in the indirection object may point to a respective root metadata node of another data object (e.g. small object, parent object or child object), the indirection object of four tree levels can manage a number of up to the number of pointers N(BP) per metadata node to the fourth power (i.e. $[N(BP)]^4$) of data objects.

For example, if the number N(BP) of pointers per metadata node is, for example, 128, then the indirection object of one single tree level can manage up to 128 data objects, the indirection object of two tree levels can manage up to 16384 data objects (more than 16 thousand data objects), the indirection object of three tree levels can manage up to 2097152 data objects (more than 2 million data objects), and the indirection object of four tree levels can manage up to 268435456 data objects (more than 268 million data objects), etc.

For example, in other exemplary embodiments, if the number N(BP) of pointers per metadata node is, for example, 256, then the indirection object of one single tree level can manage up to 256 data objects, the indirection object of two tree levels can manage up to 65536 data objects (more than 65 thousand data objects), the indirection object of three tree levels can manage up to 16777216 data objects (more than 16 million data objects), and the indirection object of four tree levels can manage up to 4294967296 data objects (more than 4 billion data objects), etc.

However, if further data objects are added, additional layers/levels of indirect nodes may be added to the indirection object to enable management of the additional data objects.

Furthermore, in FIG. 7A exemplarily the indirection object points (more specifically a pointer of a direct node thereof) to the root metadata node R(PO) of a parent object, and the parent object metadata tree structure exemplarily has three tree levels, including a tree level of intermediate indirect metadata nodes and a last tree level of direct metadata nodes.

However, if further data is added to the parent object, additional layers/levels of indirect nodes may be added to the parent object to enable management of the additional added data.

In that pointers of direct metadata nodes of the parent object respectively include a respective reference pointing/leading to a root metadata node of a respective child object, the maximum number of child objects manageable by a parent object is equal to the number of direct nodes of the parent object times the number N(BP) of pointers per metadata node.

Accordingly, the maximum number of direct metadata nodes in the parent object of three tree levels is the number of pointers N(BP) per metadata node to the second power, or squared, (i.e. $[N(BP)]^2$), and, the maximum number of child objects manageable by the parent object is the number of pointers N(BP) per metadata node to the third power (i.e. $[N(BP)]^3$).

For example, if the number of pointers per metadata node is, for example, 128, then the parent object of one single tree level can manage up to 128 child objects, the parent object of two tree levels can manage up to 16384 child objects (more than 16 thousand child objects), the parent object of three tree levels can manage up to 2097152 child objects (more than 2 million child objects), and the parent object of four tree levels can manage up to 268435456 child objects (more than 268 million child objects), etc.

For example, in other exemplary embodiments, if the number N(BP) of pointers per metadata node is, for example, 256, then the parent object of one single tree level can manage up to 256 child objects, the parent object of two tree levels can manage up to 65536 child objects (more than 65 thousand child objects), the parent object of three tree levels can manage up to 16777216 child objects (more than 16 million child objects), and the parent object of four tree levels can manage up to 4294967296 child objects (more than 4 billion child objects), etc.

As previously mentioned, pointers of direct metadata nodes of the indirection object respectively point to root metadata nodes of other data objects (e.g. small objects, parent objects or child objects) and pointers of direct metadata nodes of a parent object respectively point to root metadata nodes of child objects (either by direct pointer reference or by indirect object reference, as discussed further below).

On the other hand, pointers of direct metadata nodes of a child object (or pointers of direct metadata nodes of a small object) point to data blocks storing the actual data of the data object.

The block size BS of data blocks is exemplarily fixed, e.g. to 4 kilobytes in exemplary embodiments, and therefore the size of data that can be stored in a child object (or small object) is equal to the number of direct metadata nodes thereof times the number of pointers N(BP) per metadata node.

That is, if the number of tree levels of a child object (or small object) is limited to a level threshold LT (e.g. maximally two tree levels at LT=2, or maximally three tree levels at LT=3), the maximal size of a child object (or small object) is the block size BS times the number of pointers N(BP) per metadata node to the power of (LT), i.e. the maximal size of a child object (or small object) is $BS \times [N(BP)]^{LT}$.

For example, if the number of pointers per metadata node is, for example, 128 and the block size BS of data blocks is exemplarily fixed to 4 kB in exemplary embodiments, the maximal size of a child object (or small object) at a maximum of one tree level per child object (or small object) is 512 kB, the maximal size of a child object (or small object) at a maximum of two tree levels per child object (or small object) is 64 MB, and the maximal size of a child object (or small object) at a maximum of three tree levels per child object (or small object) is 8 GB.

For example, in other exemplary embodiments, if the number of pointers per metadata node is, for example, 256 and the block size BS of data blocks is exemplarily fixed to 4 kB in exemplary embodiments, the maximal size of a child object (or small object) at a maximum of one tree level per child object (or small object) is 1024 kB (1 MB), the maximal size of a child object (or small object) at a maximum of two tree levels per child object (or small object) is 256 MB, and the maximal size of a child object (or small object) at a maximum of three tree levels per child object (or small object) is 64 GB.

In a preferred exemplary embodiment, the number of metadata node pointers is 256 and the maximum tree level of child objects is 2 (i.e. the child objects would not include any indirect metadata nodes).

Then, the maximum data (maximal size) of a child object (or small object) is exemplarily determined as 256 MB.

This means that if a data object (small object) at a size smaller or equal to 1 MB (1024 kB) is written or created, exemplarily the data object only includes the root metadata node, and the up to 256 pointers of the root metadata node of that object directly point to the up to 256 data blocks of 4 kB size each.

As soon as at least another $257^{th}$ data block is accumulatively written to the data object or such data object larger than 1 MB is created (at up to 256 MB), such small object is extended or created to include at least one direct metadata node and up to 256 direct metadata nodes. Such (small) data objects would cover the data object sizes between more than 1 MB (1024 kB) and up to 256 MB.

As soon as more than 256 MB of data is accumulatively written to the data object or the created data object includes more than 256 MB, the data object would be created or would become a large data object. Such large object would include a parent object having at least a root metadata node, and at least two child objects. Specifically, for data object sizes between more than 256 MB and up to 64 GB (256 child objects of 256 MB each), the data object would include a parent object including only the root metadata node (but no direct or indirect nodes), and such root metadata node would point to two or more and up to 256 root metadata nodes of the respective two or more and up to 256 child objects.

For objects larger than 64 GB, the parent object of the large object would include at least one or more direct metadata nodes, and optionally being further extended by one or more indirect metadata nodes.

The size of large data objects is practically unlimited, and already for three node tree levels in a parent object (i.e. one root metadata node, up to 256 indirect metadata nodes and therefore up to 65536 direct metadata nodes), the parent object can point to up to 16777216 child objects, which translates to up to 4096 TB (i.e. 4 PB).

In view of the above, it should become clear that the respective metadata tree structure of each object, including the indirection object, the small data object, the parent object and the child object includes at least the respective root metadata node and being extendible optionally and on requirement by one or more direct metadata nodes and optionally further extended by one or more indirect metadata nodes.

Only for small data objects or child data objects, the tree structure may be limited to only a root metadata node, to a root metadata node and direct metadata nodes, or to a root metadata node, direct metadata nodes and a limited number of one or more tree levels of indirect metadata nodes, depending on the maximum size of small/child data objects.

In exemplary embodiments, the maximum size of small/child data objects may be configurable.

In FIG. 7A exemplarily the indirection object (more specifically a pointer of a direct node thereof) points to the root metadata node R(CO) of a child object, and the child object metadata tree structure exemplarily has two tree levels, including a tree level of the root node a second/last tree level of direct metadata nodes.

Accordingly, the size of the child object is exemplarily limited to the block size BS times the square of the number of pointers N(BP) per metadata node. If further data is written to a large data object, since the size of child objects is fixed, additional child objects may be created when new data is written to the large data object.

In FIG. 7A exemplarily pointers of direct metadata nodes of parent objects may point to data blocks indicating locations of root metadata nodes of its respective child objects.

However, in preferred exemplary embodiments, the pointers of direct metadata nodes of parent objects may directly point to root metadata nodes of root metadata nodes of its respective child objects. Then, only direct metadata nodes of small data objects and child objects actually point to data blocks.

In such exemplary embodiments, parent object may support and/or have metadata nodes including two types of pointers, such as e.g. a local pointer type (e.g. using a disk or storage device reference) that points to a location of a root metadata node of a child object on the local node apparatus, and a non-local pointer type (e.g. using an object reference) that points to a location of a child object or the root metadata node of the data object on another node apparatus.

In any case, only direct metadata nodes of small data objects and child objects actually point to data blocks storing actual user data of the respective associated data object.

Figure 7B:
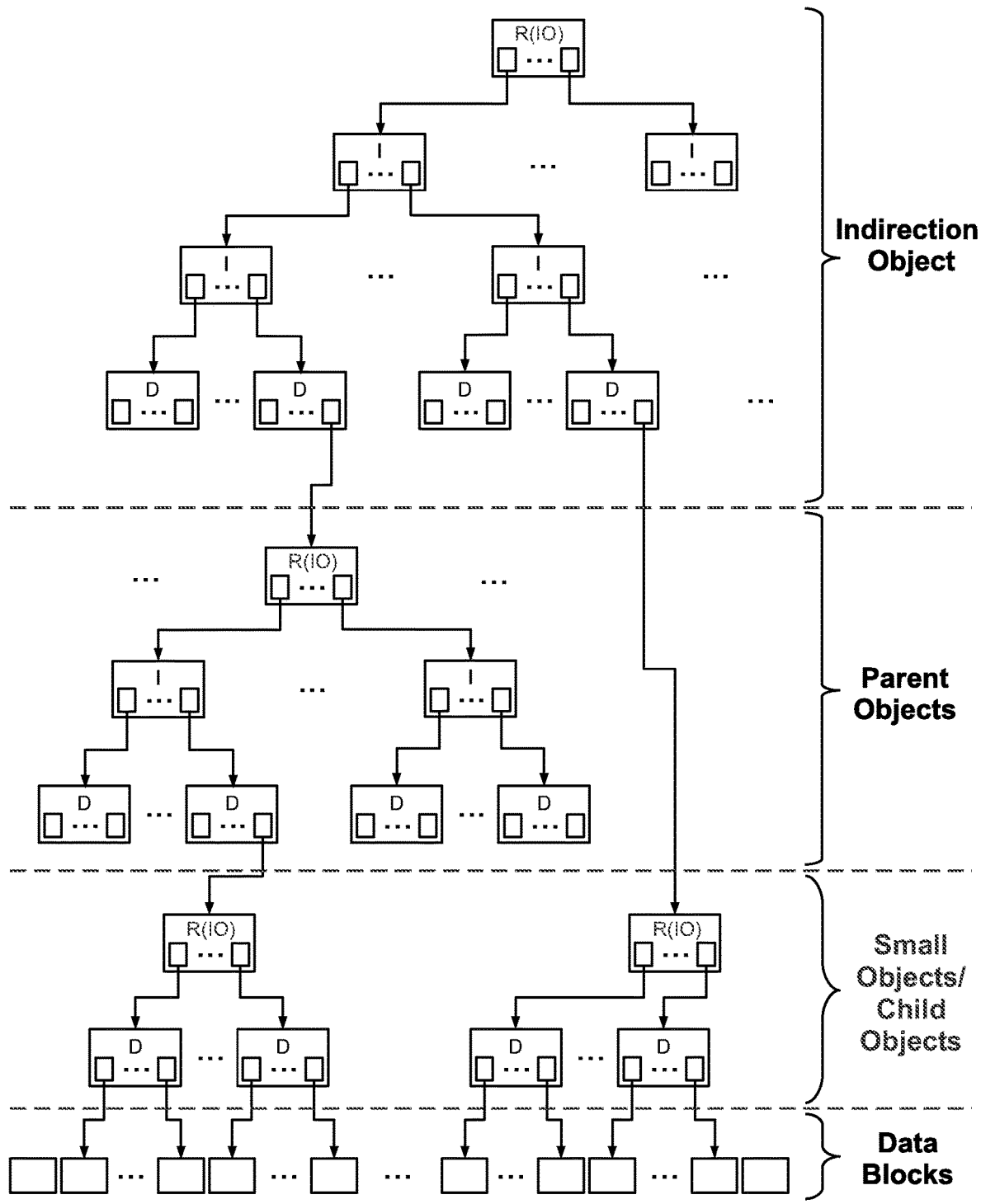
FIG. 7B exemplarily shows a schematic diagram of an exemplary metadata tree structure on a node apparatus according to some exemplary embodiments.

FIG. 7B exemplarily shows a schematic diagram of an exemplary metadata tree structure on a node apparatus according to some exemplary embodiments.

While most features of FIG. 7B are similar to FIG. 7A, in FIG. 7B, the pointers of direct metadata nodes of the parent object PO point to the root metadata nodes R(CO) of its associated respective child objects (local pointer or local object reference). The indirection object's direct metadata node pointers respectively point either to root metadata nodes of small objects or child objects which have been moved to this particular node apparatus, such as the other child object CO in FIG. 7B, e.g. such as child objects being referenced by a non-local pointer or non-local object reference from another node apparatus.

V. Data Object Distribution in Exemplary Embodiments

V.1 Data Object Distribution Approach Comparison

FIG. 4A exemplarily shows a distribution of a data object across a plurality of node apparatuses of a cluster system according to a stateless scale-out approach, FIG. 4B exemplarily shows a distribution of a data object across a plurality of node apparatuses of a cluster system according to a stateful scale-out approach, and FIG. 4C exemplarily shows a distribution of a data object across a plurality of node apparatuses of a cluster system according to a hybrid scale-out approach according to some exemplary embodiments.

In all of the exemplary drawings of FIGS. 4A to 4C, a large sized data object having a size larger than the distribution size is stored in a distributed manner across a plurality of node apparatuses 1000 of a cluster system (e.g. node apparatuses #1 to #5), and each node apparatus 1000 exemplarily stores one (or more) data segment(s) of the large data object.

V.1.1 Stateless Distribution Approach

In the stateless scale-out approach of FIG. 4A, the data segments of the large data object are stored as independent child objects on the respective node apparatuses 1000, and each of the child objects points to the respective data blocks storing the respective data segment(s) of the large data object. However, exemplarily, no additional parent objects are provided.

Accordingly, when an I/O access request to the large data object is received at one of the node apparatuses 1000, the receiving node apparatus 1000 (i.e. the node apparatus 1000 receiving the I/O access request), e.g. to read or modify data of a data segment of the large data object, the receiving node apparatus 1000 may need to forward the received I/O access request (or a corresponding I/O access request) to the node apparatus 1000 having the child object pointing to the target data of the data segment addressed by the received I/O access request.

For example, in the stateless scale-out approach of FIG. 4A, the location of data segments and/or child objects in the cluster system may be determined based on a deterministic algorithm. The deterministic algorithm may be used to determine intended locations of data segments of a large data object at the time of distributing the data segments thereof across the node apparatuses of the cluster system, and may be used to determine locations of data segments of a large data object when receiving I/O requests. Locations of child objects on node apparatuses may be managed by respective indirection objects.

For example, the I/O access request may include a reference to an offset of the target data in the large data object (or to another type of ID of the target data segment of the I/O access request), and the location of the respective target data/target data segment in the cluster may then be determined on the basis of the deterministic approach, which was already used at the time of distributing the data segments thereof across the node apparatuses of the cluster system. Such deterministic distribution approach may use a pre-determined distribution map or calculate distribution maps by use of known distribution algorithms such as e.g. the known CRUSH (Controlled Replication Under Scalable Hashing) algorithm.

Basically, such deterministic algorithm may take input information and/or an input parameter relating to an identifier of the respective data segment (e.g. as an identifier identifying the large data object combined with a second identifier identifying the respective data segment in the respective data object, such as e.g. a segment number or an offset in the data object; or a single identifier identifying the respective data segment) and output location information as a function of the input information and/or an input parameter such that the output location information indicates the target node apparatus storing (or designated to store) the respective data segment.

Accordingly, when the receiving node apparatus 1000 receives an I/O access request to a data segment of the large data object, the receiving node apparatus 1000 (e.g. the scale-out layer thereof) determines the location of the target data segment based on information included in the I/O access request (e.g. input information or input parameter for the deterministic algorithm included in the I/O access request or determined based on information included in the I/O access request) and the defined deterministic algorithm to determine the node apparatus 1000 being responsible for the target data segment (i.e. the node apparatus 1000 storing the child object associated with the target data segment).

Then, upon determining the node apparatus 1000 being responsible for the target data segment, the receiving node apparatus 1000 may send the (or a corresponding) I/O access request to the identified node apparatus 1000 handling the respective target data segment. Upon processing the I/O request on the identified node apparatus 1000, a respective I/O response can be returned to the receiving node apparatus 1000 to issue an I/O response to the requesting client from the receiving node apparatus 1000.

A benefit of such stateless approach is that the number of message hops between node apparatuses of the cluster system in the handling/processing of I/O access requests is low, and typically only two hops are required (i.e. one message hop from the receiving node apparatus to the target node apparatus having the child object of the respective target data segment for forwarding the I/O request, and one message hop from the target node apparatus back to the receiving node apparatus returning the I/O response).

That is, handling of I/O access requests can be efficiently handled across the node apparatuses with low numbers of message hops, although the target data may be stored on any node apparatus and the I/O access request from the client may be received on and handled by any of the node apparatuses of the cluster system. However, since the distribution of data segments of a large data object is done based on a deterministic approach, hot spot data (such as data segments of storage devices being accessed frequently, or data segments stored on frequently accessed node apparatuses) cannot be re-distributed due to the deterministic approach.

Accordingly, the stateless approach advantageously allows for efficient communication across node apparatuses in the handling of I/O requests but has the disadvantage that hot spot data (such as frequently accessed data segments, or data segments stored on a frequently accessed storage device or node apparatus) cannot be moved to another node apparatus for rebalancing the system if needed or desired.

V.1.2 Stateful Distribution Approach

In the stateful scale-out approach of FIG. 4B, the data segments of the large data object are also stored as child objects on the respective node apparatuses 1000, and each of the child objects points to the respective data blocks storing the respective data segment(s) of the large data object.

Further exemplarily, one single parent object is provided for the large data object on one node apparatus (e.g. node apparatus #1 in FIG. 4B), and the parent object points to all of the distributed child objects of the large data object, including the one or more child objects on the same node apparatus as the parent object and the other child objects on other node apparatuses. Therefore, no deterministic algorithm needs to be used in the handling of I/O access requests for finding the respective child object of the target data segment, however, a deterministic algorithm may still be used at the time of distribution of data segments.

Accordingly, when an I/O access request to the large data object is received at one of the node apparatuses 1000, the receiving node apparatus 1000 (i.e. the node apparatus 1000 receiving the I/O access request), e.g. to read or modify data of a data segment of the large data object, the receiving node apparatus 1000 may need to forward the received I/O access request (or a corresponding I/O access request) to the node apparatus 1000 having the parent object of the respective data object and that (parent) node apparatus 1000 may need to forward the received I/O access request (or a corresponding I/O access request) to yet another node apparatus 1000 having the respective child object pointing to the target data of the data segment addressed by the received I/O access request.

For example, in the stateful scale-out approach of FIG. 4B, the location of data segments and/or child objects in the cluster system may be determined based on pointers of the associated parent object and, in particular, the pointers of the parent object to respective child objects on the same or on other node apparatuses may be used to determine locations of data segments of a large data object on the same or on other node apparatuses as the parent object.

For example, the I/O access request may include a reference to the parent object (such as an identifier of the parent object, or location information indicating the location of the parent object) and a reference to an offset of the target data in the large data object (or to another type of ID of the target data segment of the I/O access request), and the location of the respective target data/target data segment in the cluster may then be determined by first finding the parent object and then determining the location of the respective child object based on a pointer of the parent object identified based on the offset of the target data segment.

For example, the location of the parent object can be selected/determined by a simple function using the parent object ID (e.g. a parent object number) as input, e.g. a modulo function (such as the parent object number modulo a number of node apparatuses in the cluster system). Locations of parent and child objects on node apparatuses may be managed by respective indirection objects.

Accordingly, when the receiving node apparatus 1000 receives an I/O access request to a data segment of the large data object, the receiving node apparatus 1000 (e.g. the scale-out layer thereof) determines the location of the respective parent object of the large data object based on information included in the I/O access request (such as e.g. location information on the parent object and/or an identifier of the parent object) and sends the (or a corresponding) I/O access request to the identified node apparatus 1000 handling the respective parent object so that the identified node apparatus 1000 further handles the I/O request to be sent to the node apparatus 1000 having the respective child object pointing to the target data segment.

Alternatively, the receiving node 1000 may communicate with the identified node apparatus 1000 handling the respective parent object so as to determine the location of the respective child object and to send the I/O access request (or corresponding request) to the node apparatus 1000 having the respective child object pointing to the target data segment.

Then, upon determining the node apparatus 1000 being responsible for the target data segment, the receiving node 1000 or the parent object's node apparatus 1000 may send the (or a corresponding) I/O access request to the identified node apparatus 1000 handling the respective child object and target data segment.

Upon processing the I/O request on the identified node apparatus 1000, a respective I/O response can be returned to the receiving node apparatus 1000 directly or indirectly via the parent object's node apparatus 1000 to issue an I/O response to the requesting client from the receiving node apparatus 1000.

A benefit of such stateful approach is that hot spot data (such as data segments of storage devices being accessed frequently, or data segments stored on frequently accessed node apparatuses) can be re-distributed and moved to other nodes easily. This only requires to move the child object to another node apparatus 1000 and update the respective pointer to the child object in the responsible parent node.

Accordingly, the stateful approach advantageously allows for efficient handling of hot spot data and easy re-distribution of child objects across node apparatuses of the cluster system, and easily provides the advantage that hot spot data (such as frequently accessed data segments, or data segments stored on a frequently accessed storage device or node apparatus) can be moved to another node apparatus for rebalancing the system if needed or desired.

However, the number of message hops between node apparatuses of the cluster system in the handling/processing of I/O access requests is higher, and typically at least three or even four hops are required (i.e. one message hop from the receiving node apparatus to the parent node apparatus having the parent node for forwarding the I/O request, one message hop from the parent object's node apparatus to target node apparatus having the child object of the respective target data segment for forwarding the I/O request, and one or more message hops from the target node apparatus back to the receiving node apparatus returning the I/O response).

That is, as a disadvantage, handling of I/O access requests can be handled across the node apparatuses with higher numbers of message hops.

Accordingly, the stateful approach has the disadvantage of less efficient communication across node apparatuses in the handling of I/O requests but has the advantage that hot spot data (such as frequently accessed data segments, or data segments stored on a frequently accessed storage device or node apparatus) can be moved easily to another node apparatus for rebalancing the system if needed or desired.

V.1.3 Hybrid Distribution Approach According to Exemplary Embodiments

In the hybrid scale-out approach of FIG. 4C, the data segments of the large data object are stored as plural child objects on the respective node apparatuses 1000, and each of the child objects points to the respective data blocks storing the respective data segment(s) of the large data object.

Further exemplarily, a parent object is provided for the large data object on each of the node apparatuses, and the parent object on each node apparatus points to all or at least some child objects of the large data object, including some or all of the child objects being held on the same node apparatus as the parent object.

In some embodiments, the parent object can be fully stored on each node apparatus 1000 so that each parent object on each node apparatus 1000 points to all of the child objects, and any child object may be located by observing an arbitrary one of the parent objects thereof. However, in preferred exemplary embodiments, each node apparatus 1000 may store only part of the parent object, each respective part of the parent object managing locations of a certain group of child objects, such that each child object is pointed to by one of the parts of the parent object. For example, upon creation of the data object (including creation of the parent object and the plural child objects), the child objects may be distributed across the plural node apparatuses of the cluster system, and each node apparatus may have the part of the parent object managing the locations of child objects initially created on the same node apparatus.

For example, in the hybrid scale-out approach of FIG. 4C, the intended location of data segments and/or child objects in the cluster system may be determined based on a deterministic algorithm.

The deterministic algorithm may be used to determine intended locations of data segments of a large data object at the time of distributing the data segments thereof across the node apparatuses of the cluster system, and may be used to determine the locations of respective parent object parts managing the locations of the data segments of a large data object when receiving I/O requests.

Locations of child objects and parent objects or parent object parts on node apparatuses may be managed by respective indirection objects.

Accordingly, when an I/O access request to the large data object is received at one of the node apparatuses 1000, the receiving node apparatus 1000 (i.e. the node apparatus 1000 receiving the I/O access request), e.g. to read or modify data of a data segment of the large data object, the receiving node apparatus 1000 may need to forward the received I/O access request (or a corresponding I/O access request) to the node apparatus 1000 having the part of the parent object or parent object pointing to the respective child object pointing to the target data of the data segment addressed by the received I/O access request.

For example, the I/O access request may include a reference to an offset of the target data in the large data object (or to another type of ID of the target data segment of the I/O access request), and the intended location of the respective target data/target data segment in the cluster may then be determined on the basis of the deterministic approach, which was already used at the time of distributing the data segments thereof across the node apparatuses of the cluster system. Such deterministic distribution approach may use a pre-determined distribution map or calculate distribution maps by use of known distribution algorithms such as e.g. the known CRUSH (Controlled Replication Under Scalable Hashing) algorithm.

Basically, such deterministic algorithm may take input information and/or an input parameter relating to an identifier of the respective data segment (e.g. as an identifier identifying the large data object combined with a second identifier identifying the respective data segment in the respective data object, such as e.g. a segment number or an offset in the data object; or a single identifier identifying the respective data segment) and output location information as a function of the input information and/or an input parameter such that the output location information indicates the target node apparatus storing (or designated to store) the respective parent object or parent object part managing the location of the targeted child object or data segment.

Typically, on the time of creation, the child objects will be created on the same node apparatus 1000 which also stores the parent object or parent object part managing/indicating the location of the respective child object, so that typically the parent object or parent object part on a node apparatus 1000 points to child objects created/stored on the same node apparatus 1000, unless moved exceptionally to another node apparatus 1000 for purposes of load balancing.

Accordingly, when the receiving node apparatus 1000 receives an I/O access request to a data segment of the large data object, the receiving node apparatus 1000 (e.g. the scale-out layer thereof) determines the intended location of the target data segment based on a determination of the location of the parent object or parent object part based on information included in the I/O access request (e.g. input information or input parameter for the deterministic algorithm included in the I/O access request or determined based on information included in the I/O access request) and the defined deterministic algorithm to determine the node apparatus 1000 being responsible for the parent object or parent object part responsible for the target child object or target data segment (i.e. the node apparatus 1000 storing the parent object or parent object part associated with the child object associated with the target data segment).

Then, upon determining the node apparatus 1000 being responsible for the parent object or parent object part responsible for the target data segment, the receiving node apparatus 1000 may send the (or a corresponding) I/O access request to the identified node apparatus 1000 handling the parent object or parent object part responsible for the respective target child object/data segment.

On that node apparatus 1000 the location of the child object pointing to the target data segment may be determined, which may typically be on the same node apparatus 1000 but also on another node apparatus 1000 (e.g. in case the respective child object has been moved to another node apparatus 1000 since creation thereof).

If the respective child object is on the same node apparatus 1000, the I/O access request may be processed locally on that node apparatus 1000. On the other hand, if the parent object or parent object part on that node apparatus 1000 has a pointer relating to the target child object that points to another node apparatus 1000, the (or a corresponding) I/O access request may be sent to the other node apparatus 1000 to process the I/O access request.

Upon processing the I/O request on the identified node apparatus 1000, a respective I/O response can be returned directly or indirectly to the receiving node apparatus 1000 to issue an I/O response to the requesting client from the receiving node apparatus 1000.

Accordingly, in principle, the child object will be on the same node apparatus as the parent object or parent object part pointing to that respective child object, and the number of required hop messages in I/O request processing may be as low as in the above stateless approach.

However, as a benefit of the hybrid approach it is easily possible to move one or more child objects to other node apparatuses 1000 if required for purposes of load balancing, e.g. by moving hot spot data.

A further benefit of such hybrid approach is that the number of message hops between node apparatuses of the cluster system in the handling/processing of I/O access requests is low, and typically only two hops are required (i.e. one message hop from the receiving node apparatus to the target node apparatus having the parent object or parent object part pointing to the respective target data segment for forwarding the I/O request, and one message hop from the target node apparatus back to the receiving node apparatus returning the I/O response).

That is, handling of I/O access requests can be efficiently handled across the node apparatuses with low numbers of message hops, although the target data may be stored on any node apparatus and the I/O access request from the client may be received on and handled by any of the node apparatuses of the cluster system.

As previously mentioned, another benefit of such hybrid approach is that hot spot data (such as data segments of storage devices being accessed frequently, or data segments stored on frequently accessed node apparatuses) can be re-distributed and moved to other nodes easily. This only requires to move the child object to another node apparatus 1000 and update the respective pointer to the child object in the responsible parent node or parent node part.

Accordingly, the hybrid approach advantageously allows for efficient handling of hot spot data and easy re-distribution of child objects across node apparatuses of the cluster system for purposes of load balancing, and easily provides the advantage that hot spot data (such as frequently accessed data segments, or data segments stored on a frequently accessed storage device or node apparatus) can be moved to another node apparatus for rebalancing the system if needed or desired.

Summarizing, the hybrid approach on the one hand advantageously allows for efficient communication across node apparatuses in the handling of I/O requests, similar to the benefits of the above stateless approach, and, on the other hand, also has the advantage that hot spot data (such as frequently accessed data segments, or data segments stored on a frequently accessed storage device or node apparatus) can be moved to another node apparatus for rebalancing the system if needed or desired, similar to the benefits of the above stateful approach.

As a consequence, the hybrid approach combines the benefits of both of the above stateful and stateless approaches.

V.2 Distribution of Data Objects According to Exemplary Embodiments

As discussed above, the data objects may be managed either as small data objects, if the size thereof is equal to or smaller than the distribution size, or large data objects which include a parent node pointing to two or more child objects, each child object being of a size equal to or smaller than the distribution size while the size of the large data object is larger as the distribution size.

V.2.1 Distribution of Small Data Objects

Figure 5A:
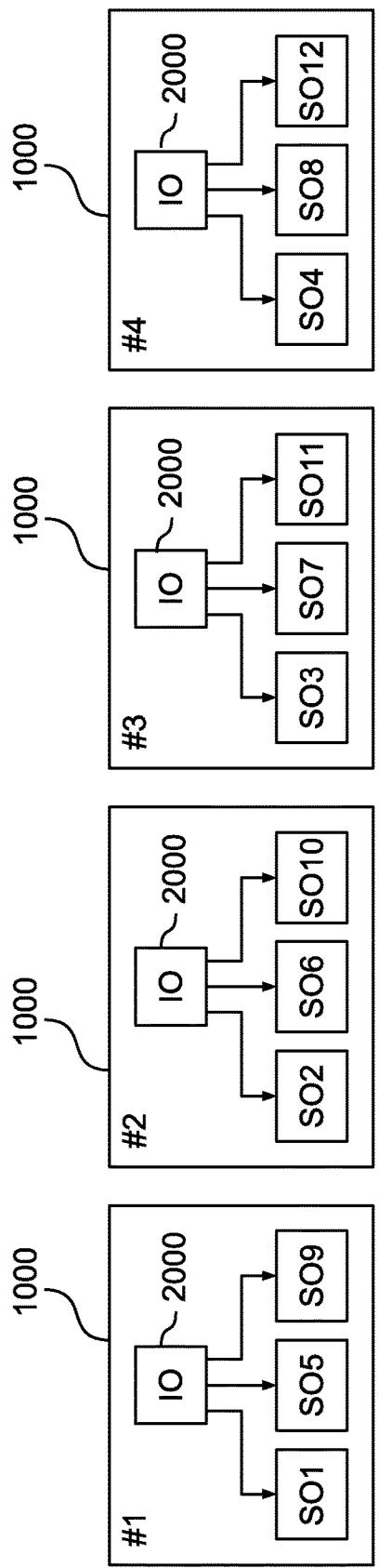
FIG. 5A exemplarily shows a distribution of plural small data objects across a plurality of node apparatuses of a cluster system according to a hybrid scale-out approach according to some exemplary embodiments.

FIG. 5A exemplarily shows a distribution of plural small data objects across a plurality of node apparatuses 1000 of a cluster system according to a hybrid scale-out approach according to some exemplary embodiments.

Exemplarily, the cluster system includes four node apparatuses 1000, and on each node apparatus 1000 there is provided a respective indirection object 2000 for managing locations of data objects (including small object, parent and/or child objects, or system objects storing metadata on the system) on that particular respective node apparatus 1000.

Further exemplarily, the twelve small data objects $SO_1$ to $SO_{12}$ (each of a size equal or smaller than a predetermined distribution size) are stored in a distributed manner across the node apparatuses 1000 (numbered #1 to #4), and exemplarily the small data objects $SO_1$ to $SO_{12}$ are distributed across the cluster system in accordance with a deterministic algorithm.

That is, based on an identifier (such as e.g. an object ID or object number) of the respective small data object, the deterministic algorithm allows to determine a location of the respective small data object.

Still, for load balancing purposes, the small data objects can be moved to other node apparatuses.

In some exemplary embodiments, such movement of a small object may involve to assign another identifier (such as e.g. an object ID or object number) to the respective small data object corresponding to the new location, i.e. such that the deterministic algorithm outputs the new location of the respective small data object after movement thereof based on the new assigned identifier.

However, in other preferred exemplary embodiments, if the identifier object such as an object ID or object number of the object shall preferably not be changed despite the data movement, thereby making object management easier, the indirection object may be updated such as to indicate the location of the moved small data object.

For example, upon movement of a small data object from one node apparatus to another node apparatus, the indirection object may be updated so that the respective block pointer in the direct node of the indirection object pointing to the respective small data object is updated so as to point to the new location on the other node apparatus instead of the previous location on the local node apparatus.

For such purpose, in some exemplary embodiments, the indirection object may support and/or have metadata nodes including two types of pointers, such as e.g. a local pointer type (e.g. using a disk or storage device reference) that points to a location of a root metadata node of a data object on the local node apparatus, and a non-local pointer type (e.g. using an object reference) that points to a location of a data object or the root metadata node of the data object on another node apparatus.

For a similar purpose, in some exemplary embodiments, the parent object may support and/or have metadata nodes including two types of pointers, such as e.g. a local pointer type (e.g. using a disk or storage device reference) that points to a location of a root metadata node of a child object on the local node apparatus, and a non-local pointer type (e.g. using an object reference) that points to a location of a child object or the root metadata node of the data object on another node apparatus. Such aspects will be described for some exemplary embodiments in more detail below.

V.2.2 Distribution of Large Data Objects

Figure 5B:
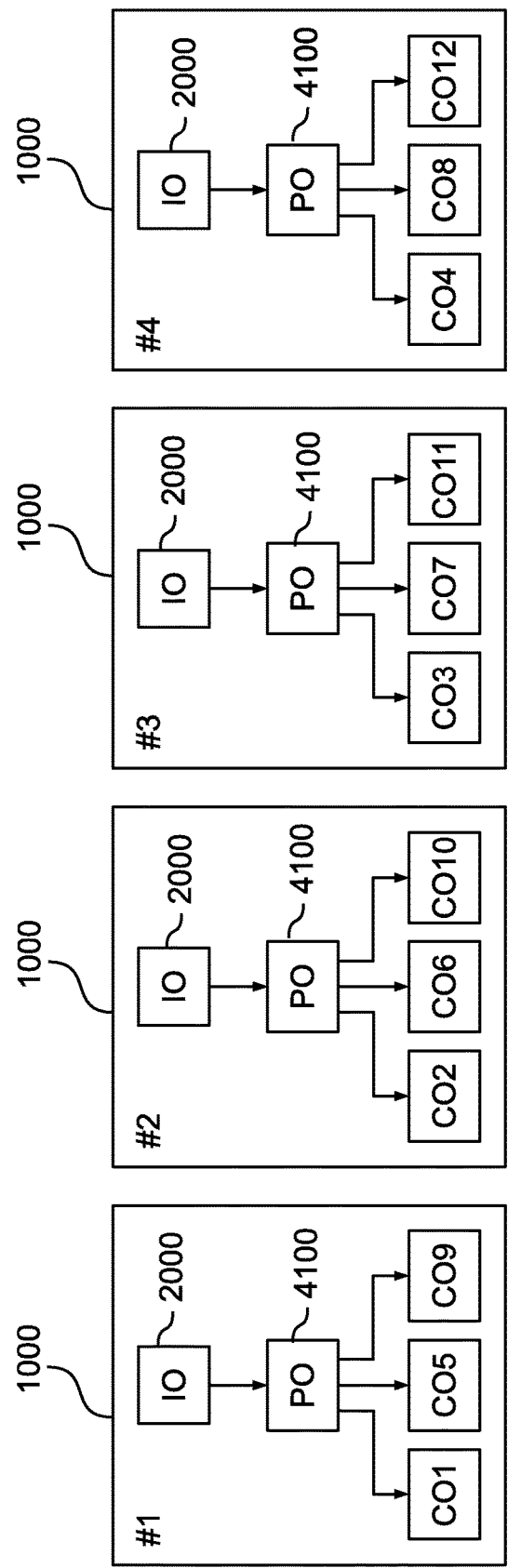
FIG. 5B exemplarily shows a distribution of plural large data objects across a plurality of node apparatuses of a cluster system according to a hybrid scale-out approach according to some exemplary embodiments.

FIG. 5B exemplarily shows a distribution of a large data object including the parent object and child objects across a plurality of node apparatuses 1000 of a cluster system according to a hybrid scale-out approach according to some exemplary embodiments.

Exemplarily, the cluster system includes four node apparatuses 1000, and on each node apparatus 1000 there is provided a respective indirection object 1000 for managing locations of data objects (including small object, parent and/or child objects, or system objects storing metadata on the system) on that particular respective node apparatus 1000, and each node apparatus 1000 stores a group of child objects of the child objects CO1 to CO12 of the respective large data object.

Further exemplarily, each of the node apparatuses 1000 storing a group of child objects of the child objects CO1 to CO12 of the respective large data object additionally stores an associated parent object 4100 (or parent object part) which exemplarily points to the locations of the respective child objects stored on the particular node apparatus 1000.

Accordingly, while the node apparatus 1000 labeled with #1 in FIG. 5B stores the child objects CO1, CO5 and CO9 of the respective large data object, the respective associated parent object 4100 (or parent object part) of the large data object on the node apparatus 1000 labeled with #1 in FIG. 5B points to these child objects CO1, CO5 and CO9.

So, generally the parent object 4100 (or parent object part) on a node apparatus 1000 points to the child objects stored on the same node apparatus 1000 (but it may also point to all other child objects on other node apparatuses in further exemplary embodiments).

Further exemplarily, the twelve child objects CO1 to CO12 (each of a size equal or smaller than a predetermined distribution size) are stored in a distributed manner across the node apparatuses 1000 (numbered #1 to #4), and exemplarily the child objects CO1 to CO12 are distributed across the cluster system in accordance with a deterministic algorithm, at least at the time of creation of the large data object in the cluster system.

Accordingly, based on an identifier of the respective child objects and based on the deterministic algorithm, the intended location of each child object may be determined, and the respective child object may then be accessed through the parent object 4100 (or parent object part) stored in the node apparatus 1000 of the intended location according to the deterministic algorithm.

Still, the child object can be moved to another node apparatus 1000 (contrary to the stateless approach discussed above) in that the child object is moved to another node apparatus and the pointer to that child object in the parent object or parent object part on the node apparatus of the former location is adjusted or updated based on the new location.

Then, the location of the responsible parent object or parent object part may be determined still on the basis of the same deterministic approach but the location of the respective child object on another node apparatus 1000 may be dynamically determined by reading the respective pointers or references in that parent object or parent object part.

While FIG. 5B exemplarily shows that each node apparatus 1000 of the cluster system has child objects and a parent object of the same large data object, distributed according to a distribution map (1,2,3,4), other distribution schemes are possible. Specifically, it is possible that child objects of a certain large data object are distributed across a subset of node apparatuses 1000 of the cluster system, and e.g. that child objects of different large data objects are distributed across different subsets of node apparatuses 1000 of the cluster system, e.g. based on different cluster maps.

For example, in the below example of FIG. 6A, two large data objects, and child objects thereof, are distributed on different subsets of three node apparatuses 1000 in a cluster system including four node apparatuses 1000 labelled #1 to #4.

Figure 6A:
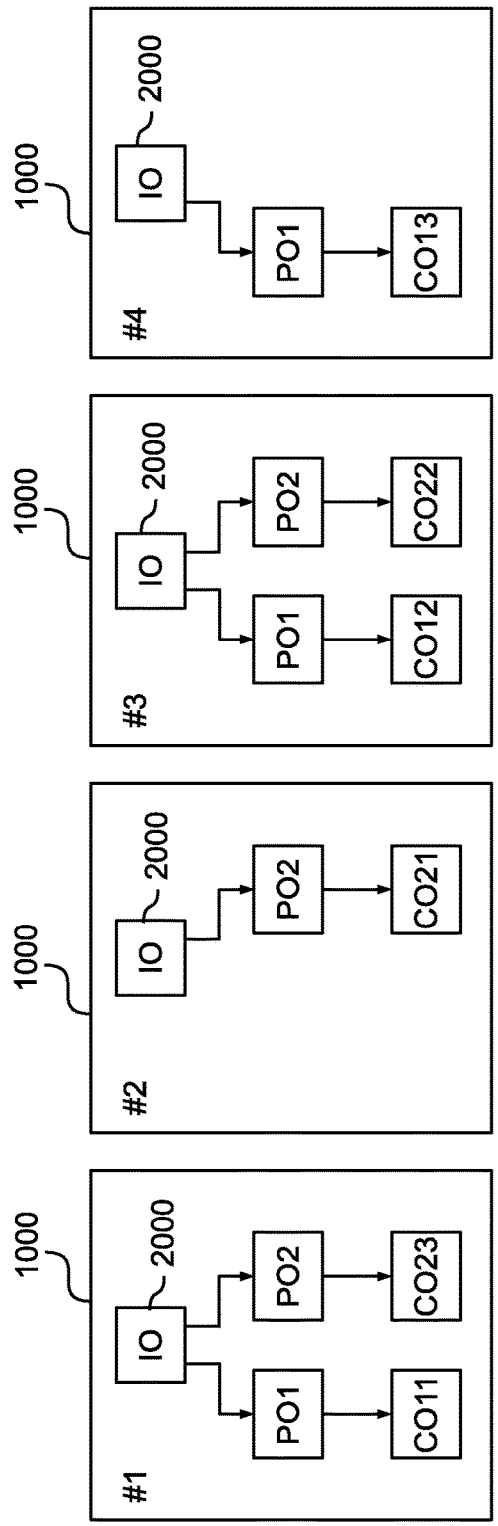
FIG. 6A exemplarily shows a distribution of plural large data object across a plurality of node apparatuses of a cluster system according to a hybrid scale-out approach according to exemplary embodiments.
Figure 6B:
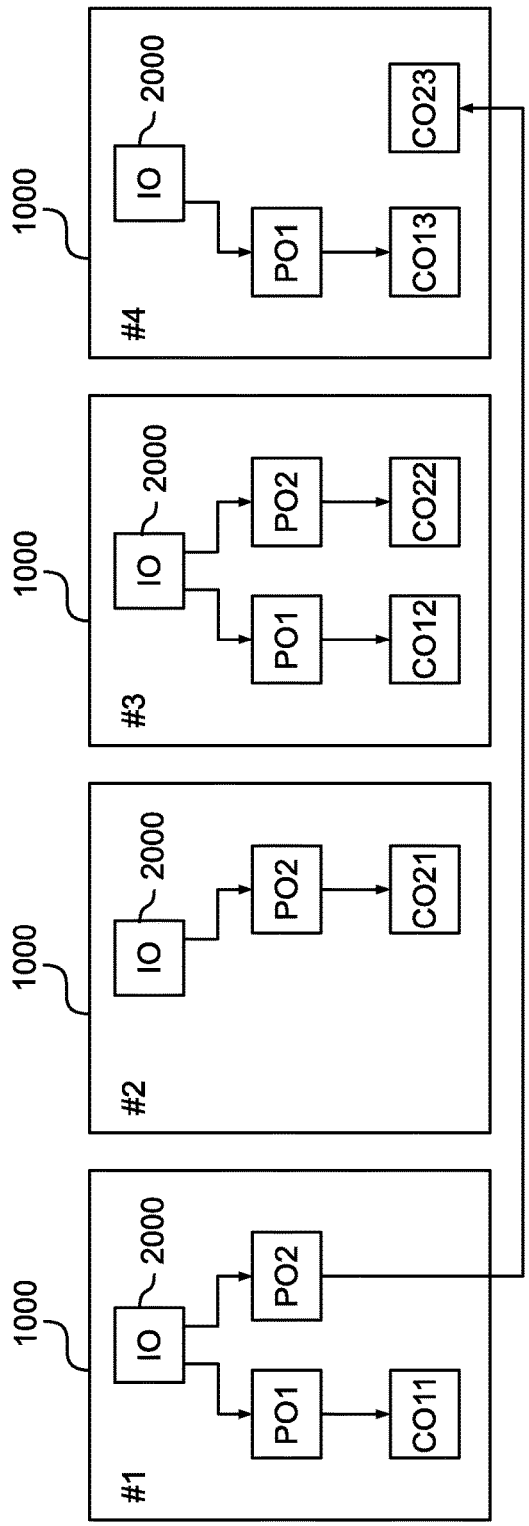
FIGS. 6B to 6D show a distribution of plural large data object across a plurality of node apparatuses of a cluster system according to a hybrid scale-out approach according to some exemplary embodiments after moving a data object segment to another node apparatus.
Figure 6C:
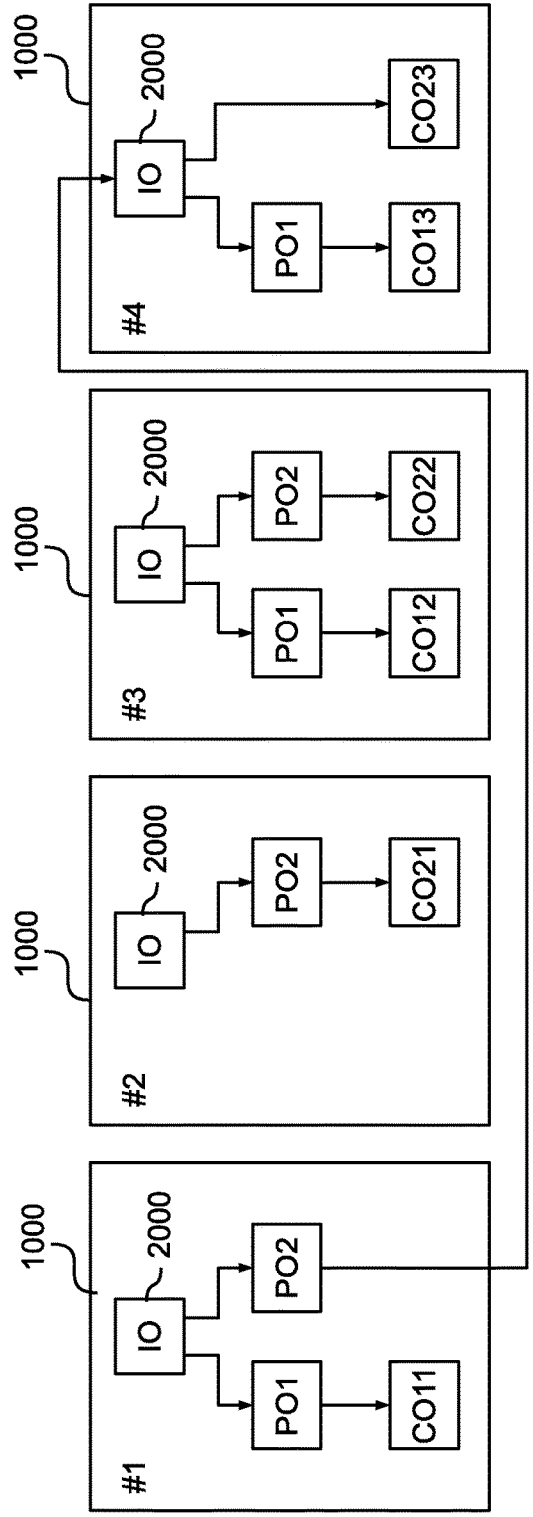
Figure 6D:
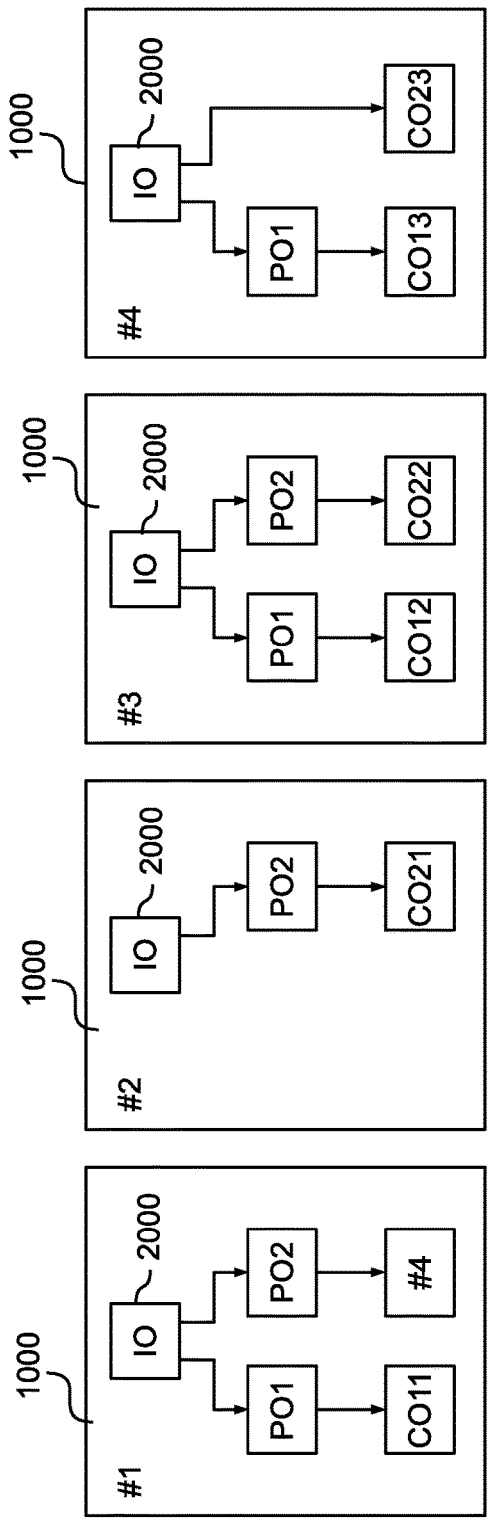

FIG. 6A exemplarily shows a distribution of plural large data object across a plurality of node apparatuses of a cluster system according to a hybrid scale-out approach according to exemplary embodiments, and FIGS. 6B to 6D show a distribution of plural large data object across a plurality of node apparatuses of a cluster system according to a hybrid scale-out approach according to some exemplary embodiments after moving a data object segment to another node apparatus.

Exemplarily, in FIG. 6A, the cluster system includes four node apparatuses 1000, and on each node apparatus 1000 there is provided a respective indirection object 2000 for managing locations of data objects (including small object, parent and/or child objects, or system objects storing metadata on the system) on that particular respective node apparatus 1000.

A first large object associated with the parent object PO1 is distributed across the node apparatuses #1, #3 and #4 based on a distribution map (1,3,4), and a second large object associated with the parent object PO2 is distributed across the node apparatuses #1, #2 and #3 based on a distribution map (2,3,1).

For example, in the above denotation, a cluster map (#a,#b,#c) would indicate that node apparatuses #a, #b and #c store data segments or child objects of a certain large data object in that the data segments or child objects are stored in a distributed manner on these node apparatuses #a, #b and #c, while, exemplarily, a first data segment/child object of the respective large object is stored on node apparatus #a, a second data segment/child object of the respective large object is stored on node apparatus #b, a third data segment/child object of the respective large object is stored on node apparatus #c, a fourth data segment/child object of the respective large object is stored on node apparatus #a again, a fifth data segment/child object of the respective large object is stored on node apparatus #b again, etc.

That is, if data segments or child objects are distributed across a number of N node apparatuses, the (N+1)-th data segment or child object may be stored initially on the same node apparatus as the $1^{st}$ data segment or child object, and the M-th data segment or child object (M being larger than N) may be stored initially on the same node apparatus as the (M−N)-th data segment or child object, wherein the node apparatuses (and/or the order thereof) storing the first N data segments or child objects may be indicated by the distribution map.

It is to be emphasized that different distribution maps may be used for distribution of different large data objects in some embodiments. However, it is further emphasized that the format of distribution maps is not limited to the above denotation, and plural different formats may be used.

In connection with distribution maps in the sense of the present disclosure, it is mentioned that a distribution map is generally indicative of the node apparatuses 1000 among which the large data object is stored in a distributed manner, and the distribution map may generally be further indicative of a particular node apparatus 1000 storing a particular data segment or child object of a large object.

In the example of FIG. 6A, the indirection objects 2000 point to the respective parent objects PO1 and/or PO2 on the respective node apparatus 1000, and the parent objects PO1 and PO2 respectively point to the child objects of the respective large data object on the respective node apparatus 1000, i.e. parent object PO1 on node #1 points to child object CO11 and parent object PO2 on node #1 points to child object CO23, parent object PO2 on node #2 points to child object CO21, parent object PO1 on node #3 points to child object CO12 and parent object PO2 on node #3 points to child object CO22, and parent object PO1 on node #4 points to child object CO13.

For example, if an I/O access request to the large data object into a data segment pointed to by child object CO13 is received on node apparatus 1000 labeled as #2, the location of child object CO13 is determined based on the deterministic algorithm.

For example, it is determined that the I/O access request is directed to the third segment of the respective large data object which is distributed according to the distribution map (1,3,4), and that, therefore, the child object 13, which stores the third segment of the respective large data object, is typically stored on node #4 based on such distribution map.

The node apparatus #2, as receiving node apparatus, therefore forwards the I/O access request (or a corresponding access request) to node apparatus #4, and the location of the child object 13 is determined based on the metadata structures of the indirection object 2000 on node apparatus #4 to identify the location of the parent object PO1 on node apparatus #4 and based on the metadata structure of the respective parent object PO1 on node apparatus #4 which points to the child object 13 on node apparatus #4.

Then, node apparatus #4 may continue to process the I/O access request in connection with the data of the data segment of child object 13 on node apparatus #4, and a response may be sent back to the initial receiving node apparatus #2 which may then issue a corresponding I/O access response to the requesting client.

V.3 Child Object Movement in Exemplary Embodiments

In the above, the parent object location of a parent object or parent object part pointing to the accessed child object is determined based on a deterministic algorithm. Still, as mentioned above, the hybrid approach allows to move child objects to other node apparatuses for purposes of load balancing.

For example, in FIGS. 6B to 6C, the child object CO23 is exemplarily moved to the fourth node apparatus 1000 (#4). Exemplarily, the pointers of the parent object PO2 on node apparatus 1000 (#1) are adjusted accordingly to reflect the new location of the moved child object CO23, but the location of the child object CO23 is still managed by the parent object PO2 (or parent object part) on node apparatus 1000 (#1).

For example, if an I/O access request to the large data object into a data segment pointed to by child object CO23 is received on node apparatus 1000 labeled as #2, the designated (intended) location of child object CO23 is determined based on the deterministic algorithm.

For example, it is determined that the I/O access request is directed to the third segment of the respective large data object which is distributed according to the distribution map (2,3,1), and that, therefore, the child object CO23, which stores the third segment of the respective large data object, is typically stored on node #1 based on such distribution map.

The node apparatus #2, as receiving node apparatus, therefore forwards the I/O access request (or a corresponding access request) to node apparatus #1, and the location of the child object CO23 is determined based on the metadata structures of the indirection object 2000 on node apparatus #1 to identify the location of the parent object PO2 on node apparatus #1 and based on the metadata structure of the respective parent object PO2 on node apparatus #1 which points to the child object CO23 on the other node apparatus #4.

Then, node apparatus #1 may forward the I/O access request (or a corresponding access request) to node apparatus #4, and node apparatus #4 may continue to process the I/O access request in connection with the data of the data segment of child object CO23 on node apparatus #4, and a response may be sent back directly or indirectly (via node apparatus #1) to the initial receiving node apparatus #2 which may then issue a corresponding I/O access response to the requesting client.

In the above, by referring to the metadata structure of the parent object PO2 on node apparatus #1, the location of child object CO23 may be determined even though the child object CO23 is not stored anymore on node apparatus #1 as was indicated by the determination based on the deterministic algorithm, in that the location of child object CO23 is determined based on a pointer of parent object PO2 on node apparatus #1 including a pointing reference to the child object CO23 in the new location of node apparatus #4.

Plural possible embodiments of pointers to child objects on other node apparatuses are possible, and the present invention is not limited to a certain embodiment thereof.

For example, in FIG. 6B, the parent object PO2 on node apparatus #1 exemplarily includes a direct pointer to the child object CO23 on node apparatus #4 (e.g. by including a reference information indicative of a storage location of a root metadata node of the child object CO23 on storage devices of the node apparatus #4), so that the child object CO23 on node apparatus #4 can be accessed without the requirement to reference the indirection object 2000 of node apparatus #4 for identifying the location of the child object CO23 on node apparatus #4.

Further exemplarily, in FIG. 6C, the parent object PO2 on node apparatus #1 exemplarily includes a direct pointer to the indirection object 2000 on node apparatus #4 (e.g. by including a reference information indicative of a storage location of a root metadata node of the indirection object 2000 on storage devices of the node apparatus #4), so that the indirection object 2000 of node apparatus #4 can be accessed to identify the location of the child object CO23 on node apparatus #4.

Further exemplarily, in FIG. 6D, the parent object PO2 on node apparatus #1 exemplarily includes a block pointer pointing to a data block on storage devices of the node apparatus #1 in which location information is stored that allows to identify the node apparatus on which the child object CO23 is newly stored after movement thereof. This is exemplarily indicated in FIG. 6D by the data block indicating the node apparatus #4 on which the child object CO23 is newly stored after movement thereof.

However in further embodiments as described in more detail below the location information may store an identifier of the child object CO23 (such as an object ID or object number) that can be used as input to the same deterministic algorithm as used for distribution of small data objects, to determine the new location of the respective child object CO23 based on the identifier stored in the data block pointed to by the parent object PO2 on node apparatus #1 and the deterministic algorithm underlying the data distribution in the cluster system.

In some exemplary embodiments, child objects can be pointed to by an indirection object similar to small data objects and parent objects being pointed to by the indirection object. Such metadata structure is exemplarily illustrated in FIG. 7A, which exemplarily shows a schematic diagram of an exemplary metadata tree structure on a node apparatus according to some exemplary embodiments.

For example, in FIG. 7A, the metadata tree structure of a parent object on a node apparatus is pointed to by the metadata tree structure of the indirection object (rooted in a root metadata node R(IO)) in that a pointer of a direct metadata node of the indirection object points to the root metadata node R(PO) of the parent object PO.

In the same way, the metadata tree structure of a child object on the node apparatus is pointed to by the metadata tree structure of the indirection object (rooted in a root metadata node R(IO)) in that a pointer of a direct metadata node of the indirection object points to the root metadata node R(CO) of the child object CO.

In this sense, the parent and child objects, and small data objects, may exist in parallel metadata tree structures at a data object level below the metadata tree structure of the indirection object level, in that all root metadata nodes of data objects (parent objects, child objects, small data object, system objects) may be directly pointed to by pointers of a direct metadata node tree level of the indirection object on a particular node apparatus.

In FIG. 7A exemplarily pointers of direct metadata nodes of parent objects may point to data blocks indicating locations of root metadata nodes of its respective child objects.

However, in preferred exemplary embodiments, the pointers of direct metadata nodes of parent objects may directly point to root metadata nodes of root metadata nodes of its respective child objects, at least the ones locally managed on the same node apparatus; see e.g. FIG. 7B. Then, only direct metadata nodes of small data objects and child objects actually point to data blocks.

In such exemplary embodiments, parent object may support and/or have metadata nodes including two types of pointers, such as e.g. a local pointer type (e.g. using a disk or storage device reference) that points to a location of a root metadata node of a child object on the local node apparatus, and a non-local pointer type (e.g. using an object reference) that points to a location of a child object or the root metadata node of the data object on another node apparatus.

In any case, only direct metadata nodes of small data objects and child objects actually point to data blocks storing actual user data of the respective associated data object.

VI. Object Number Allocation in Exemplary Embodiments

In exemplary embodiments, a deterministic approach may be used to distribute data segments of large data objects. The size of such data segments is limited according to a so-called distribution size.

For example, if a large data object shall be stored on M node apparatuses of a cluster of N node apparatuses (N≥M), the large data object shall be stored in a distributed manner by distributing its K data segments on M node apparatuses. For example, if the large data object is of a data size being K times the distribution size, the K data segments are distributed on K node apparatuses if K<M or the K data segments are distributed on M node apparatuses if K≥M.

In the management of data objects in the cluster system, in order to uniquely identify data objects, each data object is assigned with a unique object identifier such as e.g. a unique object number in exemplary embodiments.

In the cluster system, each data object is assigned the unique object identifier, preferably independent of whether it is a small data object, a large data object, a parent object or a child object, in exemplary embodiments. In the following, exemplary embodiments will be described with reference to object numbers as object identifiers. This is however not intended to be interpreted as limiting the present invention, and other object identifiers may be used.

VI.1 Deterministic Distribution Algorithm in Exemplary Embodiments

Exemplarily, each node apparatus is assigned another range in the object number space, and a deterministic algorithm is used to provide a mapping function uniquely (and optionally subjectively) mapping object numbers of an object number space to node apparatus IDs.

Such mapping function takes, for example, an object number as input parameter and returns an output parameter indicative of a particular node apparatus ID (e.g. a unique node apparatus identifier or unique node apparatus ID number). Such mapping function may be used to determine a responsible node apparatus based on a deterministic algorithm.

Furthermore, such mapping function may be provided as (or be combined with) a distribution map providing function which takes an object number as input parameter and returns a distribution map for a distribution of M data segments on different node apparatuses of a cluster of N node apparatuses (with M≤N), wherein M and N may be further input parameters of the distribution map providing function or may be pre-determined.

As previously mentioned, the (M+1)-th data segment shall be distributed/stored to the same node apparatus as the $1^{st}$ data segment and the (M+j)-th data segment shall be distributed/stored to the same node apparatus as the j-th data segment. Therefore, any distribution map, independent of the parameter M, can be used to distribute an arbitrary number of one or more data segments.

For example, in a cluster system with N=3 nodes and for distribution of M=3 data segments on different nodes, the available distribution maps are: (1,2,3), (2,3,1), (3,1,2), (1,3,2), (2,1,3), and (3,2,1). For example, for a distribution map (1,2,3), the first data segment of a large data object (i.e. a child object associated with the first data segment) would, according to the deterministic algorithm, be stored to the first node apparatus (#1).

In the same way, a small object (which has a total data size smaller or equal to the distribution size and therefore is smaller or equal than a data segment) would, according to the deterministic algorithm and based on the distribution map (1,2,3), be stored to the first node apparatus (#1).

On the other hand, for a distribution map (1,2,3), the second data segment of a large data object (i.e. a child object associated with the second data segment) would, according to the deterministic algorithm, be stored to the second node apparatus (#2), the third data segment of a large data object (i.e. a child object associated with the third data segment) would, according to the deterministic algorithm, be stored to the third node apparatus (#3), and further data segments would be sequentially stored again to the first to third node apparatuses.

VI.2 Object Number Lists in Exemplary Embodiments

Generally, object numbers can be managed in such a way that each node apparatus of the cluster system stores a respective object number list of object numbers handled by itself, i.e. a list indicative of plural object numbers which map, when using the mapping function of the deterministic algorithm, to the node apparatus itself.

That is, each object number of an object number list stored at a certain node apparatus includes those (and preferably only those) object numbers that map, when being used an input parameter in the mapping function, to the certain node apparatus.

When using a deterministic algorithm that provides a distribution map on the basis of an object number as input parameter, each object number of an object number list stored at a certain node apparatus includes those (and preferably only those) object numbers that map, when being used an input parameter in the distribution map providing function, to distribution maps that indicate that a first data segment of a large data object is to be stored to the certain node apparatus.

For example, in a cluster system with N=3 nodes and for distribution of M=3 data segments on different nodes, in which the available distribution maps are, (1,2,3), (2,3,1), (3,1,2), (1,3,2), (2,1,3), and (3,2,1), the object number list stored on the first node apparatus (#1) would be indicative of the object numbers (and preferably only those object numbers) that map to the distribution maps (1,2,3) and (1,3,2); or more generally to one or more or all distribution maps (1,2), (1,3), (1,2,3), and (1,3,2) (if M is 1, 2 or 3).

Furthermore, in the object number list on each node apparatus, the node apparatus preferably tracks whether the respective object number is used or not used on the particular node apparatus.

Accordingly, when a new object is created on a node apparatus, the node apparatus can allocate/assign a free (non-used) object number from the object number list to the newly created object. Then, the respective object number may be indicated to be used in the object number list by updating the object number list upon creation of a new object.

Accordingly, each node can autonomously assign unique object numbers to newly created objects, and still if another node apparatus, which has no knowledge about creation of the newly created object, receives a request to access the newly created object by an I/O request including the object number thereof as object reference, such receiving node apparatus can determine the location of the newly created based on the deterministic algorithm.

For example, in a cluster system with N=3 nodes and for distribution of M=3 data segments on different nodes, in which the available distribution maps are, (1,2,3), (2,3,1), (3,1,2), (1,3,2), (2,1,3), and (3,2,1), if the first node apparatus (#1) receives an I/O access request to a data object having the object number 14 and the deterministic algorithm using the input of the object number 14 returns an identifier of the second node apparatus (#2) or any of the distribution maps (2,3,1), (2,1,3), (2,1), or (2,3), then the first node apparatus (#1) is able to determine that a location of the respective object is on the second node apparatus (#2).

VI.3 Child Object Numbers in Exemplary Embodiments

Object numbers of child objects may not be communicated to upper layers (above the metadata layer or above the scale-out layer) and only object numbers of the large data object may be communicated to such upper layers, in exemplary embodiments, such that upper layers issue access requests to large data object by the object number of the large data object and an offset in the large data object, e.g. in that an object reference may include a segment number as an indicator of an offset.

Then, a first data segment of a large data object having the object number R may be addressed as R:0, a second data segment of a large data object having the object number R may be addressed as R:1, etc.

Then, the deterministic algorithm still allows to determine, by any node apparatus, the (intended) location of a respective child object based on a distribution map associated with the respective object number of the large data object, and the actual location of the child object may be indicated by the parent object stored on the node apparatus of the (intended) location of the respective child object.

For example, in a cluster system with N=3 nodes and for distribution of M=3 data segments on different nodes, in which the available distribution maps are, (1,2,3), (2,3,1), (3,1,2), (3,1,2), (1,3,2), (2,1,3), and (3,2,1), if the first node apparatus (#1) receives an I/O access request to a large data object having the object number 14 at an offset 5 (24:5), indicating the sixth data segment of the large data object with object number 14, and the deterministic algorithm using the input of the object number 14 returns a distribution map (1,2,3), then the first node apparatus (#1) is able to determine that a (intended) location of the respective child object is on the third node apparatus (#3).

VI.4 First Object Number Allocation Example

The below Table 1 (first example) exemplarily maps object numbers 1 to 14 to respective distribution maps for a cluster system including three node apparatuses #1 to #3.

Exemplarily, the cluster system stores in a distributed manner the global data objects A to G in which objects A, D and F are large data objects (object A having 4 data segments, object D having 3 data segments and object F having 2 data segments) and objects B, C, E and G are small data objects of only one data segment each.

TABLE 1

Example 1

| Object ID | Distribution map | Node #1 | Node #2 | Node #3 |
|---|---|---|---|---|
| 1 | (1, 2, 3) | 1 (PO) | 1 (PO) | 1 (PO) |
| 2 | (2, 3, 1) | not used | 2 (2:0) | not used |
| 3 | (3, 1, 2) | not used | not used | 3 (3:0) |
| 4 | (1, 2, 3) | 4 (1:0) | not used | not used |
| 5 | (2, 3, 1) | not used | 5 (1:1) | not used |
| 6 | (3, 1, 2) | not used | not used | 6 (1:2) |
| 7 | (1, 2, 3) | 7 (1:3) | not used | not used |
| 8 | (2, 3, 1) | 8 (PO) | 8 (PO) | 8 (PO) |
| 9 | (3, 1, 2) | not used | not used | 9 (9:0) |
| 10 | (1, 2, 3) | 10 (PO) | 10 (PO) | not used |
| 11 | (2, 3, 1) | not used | 11 (8:0) | not used |
| 12 | (3, 1, 2) | not used | not used | 12 (8:1) |
| 13 | (1, 2, 3) | 13 (8:2) | not used | not used |
| 14 | (2, 3, 1) | not used | 14 (10:1) | not used |
| 15 | (3, 1, 2) | not used | not used | 15 (15:0) |
| 16 | (1, 2, 3) | 16 (10:0) | not used | not used |

Figure 8A:
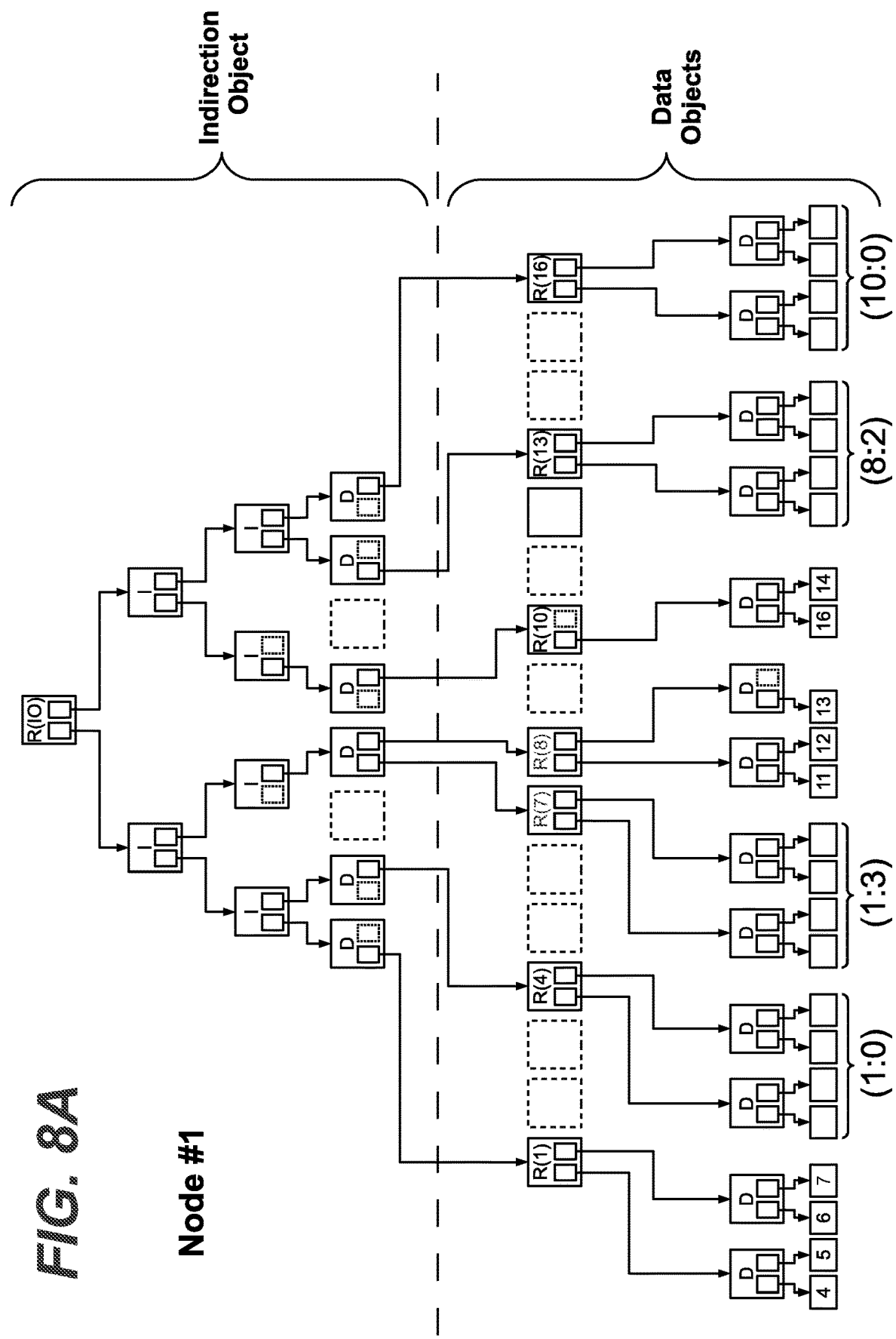
FIGS. 8A to 8C exemplarily show schematic diagrams of exemplary metadata tree structures on three node apparatuses, respectively, according to exemplary embodiments based on a first example.
Figure 8B:
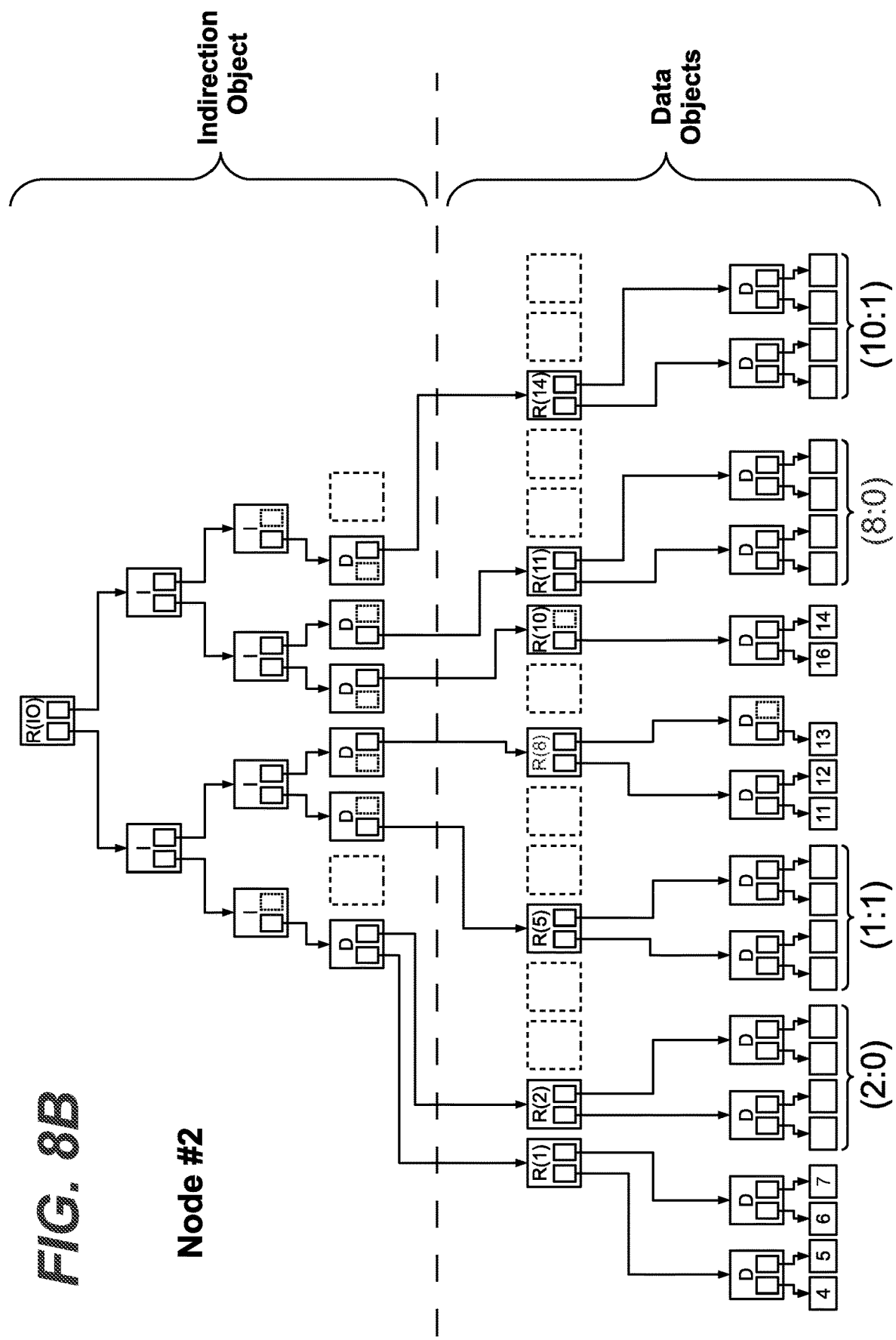
Figure 8C:
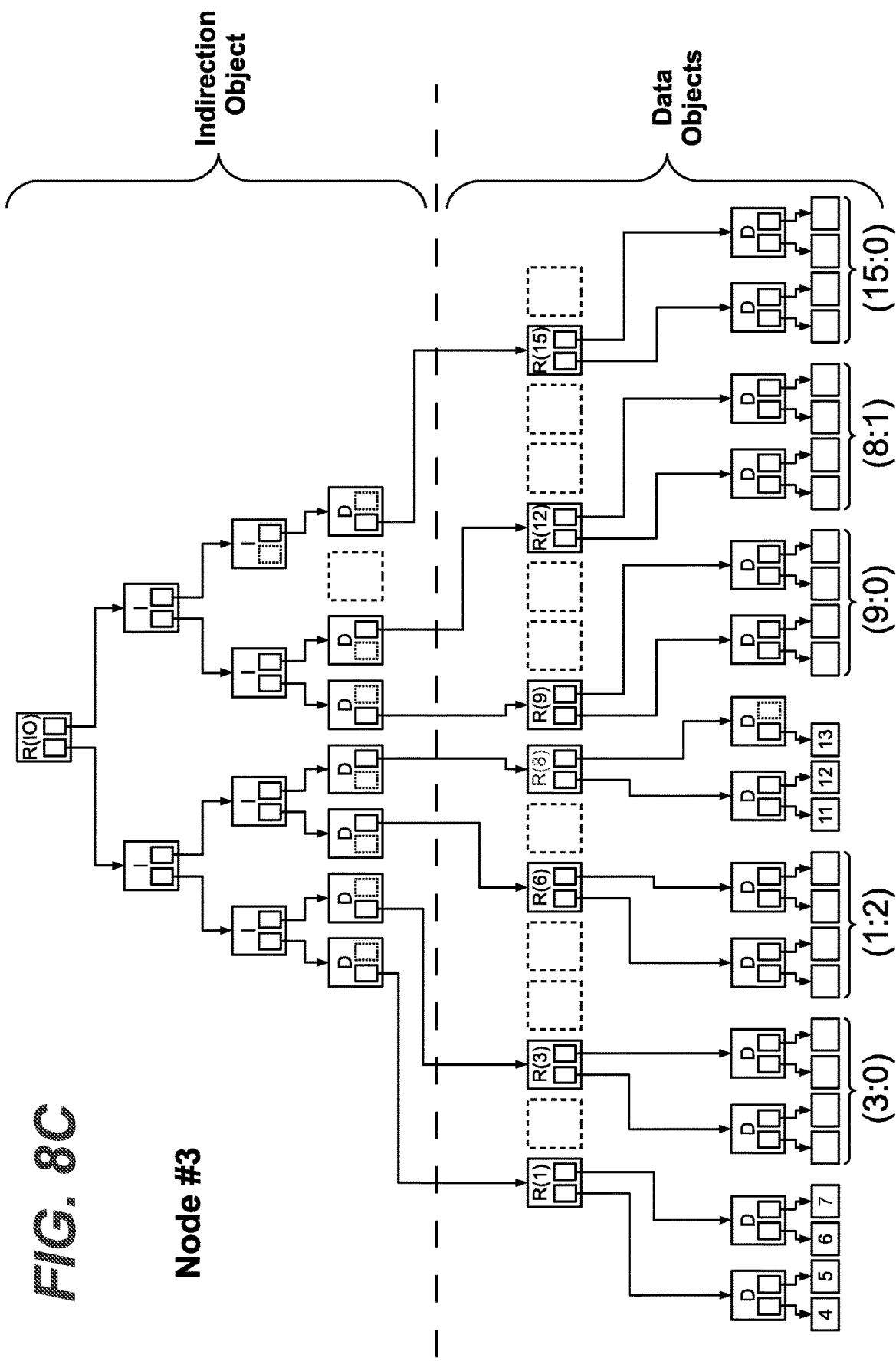

FIGS. 8A to 8C exemplarily show schematic diagrams of exemplary metadata tree structures on the three node apparatuses #1 to #3, respectively, according to exemplary embodiments based on the above first example.

Exemplarily, for purposes of simplification, in FIGS. 8A to 8C, the number of pointers per metadata node is two, so that each root metadata node or indirect metadata node points to up to two metadata nodes of a next tree level, and direct metadata nodes of the indirection object point to up to two root metadata nodes of data objects, and direct metadata nodes of the data objects point to up to two data blocks.

As the indirection object exemplarily has four tree levels, the number of direct nodes in the indirection object is up to $8=2^3$ and the indirection object may point to up to $16=2^4$ objects (e.g. according to the object numbers 1 to 16 from left to right in FIGS. 8A to 8C).

Based on an object number from 1 to 16 being used at the root of the metadata tree of the indirection object and following the respective branch of the tree according to the respective object number, the location of the root metadata node of the respective data object associated with the respective object number can be obtained, and by further following the tree branches of data objects, the data blocks of the data objects can be identified (and potentially accessed, if necessary).

FIG. 8A exemplarily shows the metadata tree structures on the first node apparatus #1 which stores, the parent object of global object A under object number 1, the parent object of global object D under object number 8 and the parent object of global object F under object number 10.

While object number 8 does not itself map to node apparatus #1 based on the associated distribution map (2,3,1), the parent object of object number 8 is still stored on node apparatus #1 since the third data segment of global object D is stored on node apparatus #1 as segment 8:2 under the object number 13.

Accordingly, if an access request addressing data segment 8:2 of object D with object number 8 is received on any node apparatus, the receiving node apparatus can determine the location of node apparatus #1 for data segment 8:2 based on the distribution map (2,3,1) associated with object number 8.

Then, the access request (or corresponding access request) can be forwarded to the determined node apparatus #1, and, based on the input of object number 8 and following the respective branch of the indirection object to the root metadata node R(8) of the parent object of object D with object number 8 and following the tree metadata structure of the parent object of object D to the third data block, the object number 13 of the respective child object can be determined by reading the respective data block of the parent object of object D with object number 8.

Then, based on the object number 13 and following the respective branch of the indirection object to the root metadata node R(13) of the respective child object corresponding to the data segment 8:2 of large data object D with object number 8, the child object corresponding to the data segment 8:2 can be accessed.

In this example, the child object corresponding to the data segment 8:2 of large data object D with object number 8 is still stored on the node apparatus #1, according to the deterministic distribution algorithm.

However, according to the exemplary hybrid approach, the child object of segment 8:2 can be moved to another node apparatus (by being at the same time assigned a new object number as handled by the other target node apparatus) and such movement may be indicated by updating the data block of the parent object of the parent object with object number 8 on the node apparatus #1 to reflect the new object number.

Then, after reading the respective data block of the parent object of object D with object number 8 and obtaining the new object number (after movement of the data segment 8:2), the new location of the child object of data segment 8:2 can be determined to be accessed in the next step on the other node apparatus.

In this first example, the global object A is managed under the object number (and exemplarily the object number of the parent object is the same as the object number of the global object A), and exemplarily the global object A has the four segments 1:0, 1:1, 1:2, and 1:3 which are all stored as respective child objects).

Here, data segments 1:0 and 1:3 are exemplarily stored on the node apparatus #1 (FIG. 8A) under child objects with object numbers 4 and 7, data segment 1:1 is exemplarily stored on the node apparatus #2 (FIG. 8B) under child object with object number 5, and data segment 1:2 is exemplarily stored on the node apparatus #3 (FIG. 8C) under child object with object number 6.

Since all three node apparatuses #1 to #3 have at least one child object of global object A, each of the node apparatuses #1 to #3 has a respective parent object under the same object number 1. In this example of FIGS. 8A to 8C, the parent objects on each node apparatus store object numbers (and thereby indirectly indicating data locations) of all child objects, exemplarily.

For example, each parent object of global object A with object number 8 indicates all four object numbers 4, 5, 6 and 7 of the child objects of its four segments.

However, in preferred embodiments, the parent objects on a particular node apparatus may only store object numbers (and thereby indirectly indicating data locations) of the particular child objects associated with them based on the distribution map (see e.g. the examples of FIGS. 9A to 10C below).

Furthermore, in this first example, the global object D is managed under the object number 8 (and exemplarily the object number of the parent object is the same as the object number of the global object D), and exemplarily the global object D has the three segments 8:0, 8:1 and 8:2 which are all stored as respective child objects).

Here, data segment 8:0 is exemplarily stored on the node apparatus #2 (FIG. 8B) under child object with object number 11, data segment 8:1 is exemplarily stored on the node apparatus #3 (FIG. 8C) under child object with object number 12, and data segment 8:2 is exemplarily stored on the node apparatus #1 (FIG. 8A) under child object with object number 13.

The global object F is managed under the object number 10 (and exemplarily the object number of the parent object is the same as the object number of the global object F), and exemplarily the global object F has the two segments 10:0 and 10:1 which are all stored as respective child objects).

Here, data segment 10:0 is exemplarily stored on the node apparatus #1 (FIG. 8A) under child object with object number 16, and data segment 10:1 is exemplarily stored on the node apparatus #2 (FIG. 8B) under child object with object number 14.

The four small data objects B, C, G and E are respectively stored under the object numbers 2 (2:0), 3 (3:0), 9 (9:0) and 15 (15:0) without any parent objects being associated with them.

However, if additional data may be written to such small data objects such that the size thereof increases beyond the distribution size, then a second data segment and respective parent objects will be created according to the above rules to convert the small data object to a large data object having a parent object and two or mode child objects.

VI.5 Object Number Grouping in Object Number Allocation in Exemplary Embodiments As becomes apparent from FIGS. 8A to 8C, since not all object numbers are used on all of the node apparatuses in some embodiments, the indirection object may have a certain degree of sparseness in that some metadata nodes are not used and some pointers of existing metadata nodes are sparse.

In some embodiments, especially in connection with embodiments in which one or more tree levels of metadata structures (in particular of the indirection object) are stored in cache to allow for higher efficiency in handling of I/O requests, it is desirable to reduce the sparseness in the indirection object, in particular by reducing the number of required metadata nodes and particularly by avoiding metadata nodes having sparse pointers, so as to significantly increase the I/O handling by metadata tree caching at efficient cache capacity usage.

In the above examples, each object number maps to another node apparatus based on the mapping function of the deterministic algorithm compared to the previous object number.

Accordingly, if an object number is used as an input parameter of a mapping function or distribution map providing function, the output is different for the next higher object number or next lower object number.

Such handling may lead to sparseness in the indirection object as discussed above and as can be seen in FIGS. 8A to 8C.

However, in some preferred embodiments, the object numbers may be grouped such that each group of a plurality of subsequent object numbers maps to a same node apparatus.

Preferably, the size of such object number groups is equal to the number $N(BP)$ of pointers of a metadata node of the indirection object, the square $N(BP)^2$ of the number of pointers of a metadata node of the indirection object or in general the number $N(BP)^L$ of pointers of a metadata node of the indirection object to the power L (L being an integer of one or more).

For example, if the number of pointers of a metadata node of the indirection object is $N(BP)$, the input parameter of the mapping function (or distribution map providing function) may be taken as the quotient of the object number for divisor $N(BP)^L$ (L being an integer of one, two or three or more) by neglecting the remainder, such that each group of $N(BP)^L$ subsequent object numbers leads to a same input parameter and thus to a same mapped node apparatus or distribution map.

It is to be noted that such procedure leads to a grouping of object numbers on node apparatuses but not to a grouping of data objects. Specifically, if a large object is distributed in the cluster, each subsequent data segment will be stored on another next storage apparatus according to the distribution map, instead of creating the respective child object on the same node. Also small object will not be grouped since the owner node creating an object may be chosen first, before an object number is assigned to the created object (please see descriptions below).

For example, if the number of pointers of a metadata node of the indirection object is 128 then an object number grouping could be used to group each of 128 subsequent object numbers such as to be mapped to a same node apparatus, the next 128 subsequent object numbers being mapped to another node apparatus, etc.

Also, an object number grouping could be used to group each of 128×128=16384 subsequent object numbers such as to be mapped to a same node apparatus, the next 16384 subsequent object numbers being mapped to another node apparatus.

The above assumes that the number N(BP) of pointers of a metadata node of the indirection object is the same for direct and indirect metadata nodes of the indirection object. Otherwise, preferred embodiments would use another grouping.

For example, if the number of pointers of a metadata direct node of the indirection object is N(BPDN) and the number of pointers of a metadata indirect node of the indirection object is N(BPIN), the input parameter of the mapping function (or distribution map providing function) may be taken as the quotient of the object number for divisor N(BPDN)×N(BPIN)$^L$ (L being an integer of zero, one, two or more, up to the number of indirect node tree levels) by neglecting the remainder.

Such object number grouping has a benefit that sparseness in the indirection object may be shifted to node tree levels closer to the root metadata node of the indirection object, typically leading to a benefit that the number of sparse metadata nodes and the total number of metadata nodes in the indirection object can be reduced for the similar arrangement of object, thereby improving efficiency of metadata tree caching for improving I/O access request handling at higher cache efficiency.

VI.6 Second Object Number Allocation Examples (Avoid Indirection Object Sparseness)

In the example of FIGS. 8A to 8C above, the number of pointers per metadata node of the indirection object was 2 as an example.

Figure 9A:
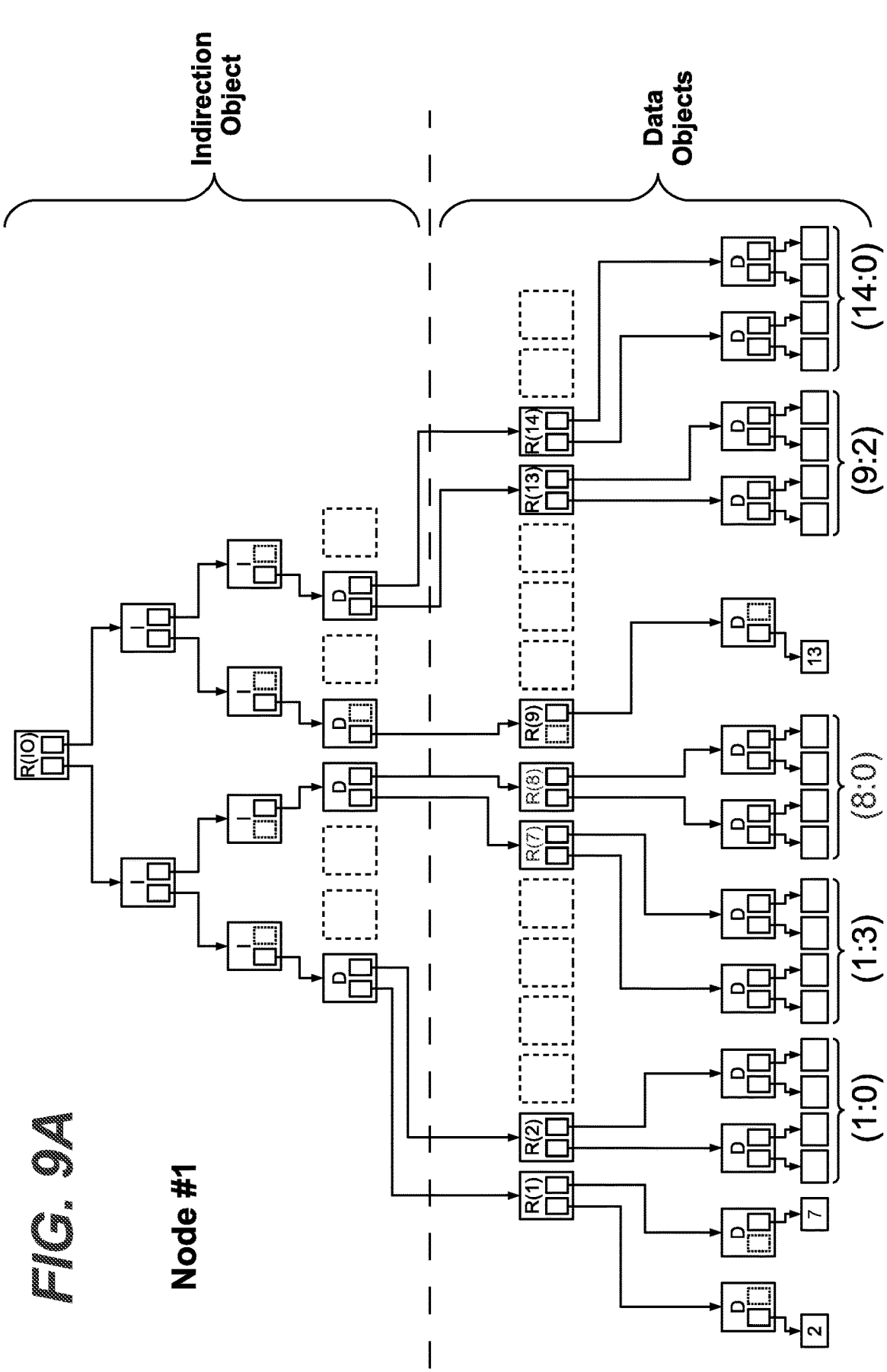
FIGS. 9A to 9C exemplarily show schematic diagrams of exemplary metadata tree structures on three node apparatuses, respectively, according to exemplary embodiments based on a second example.
Figure 9B:
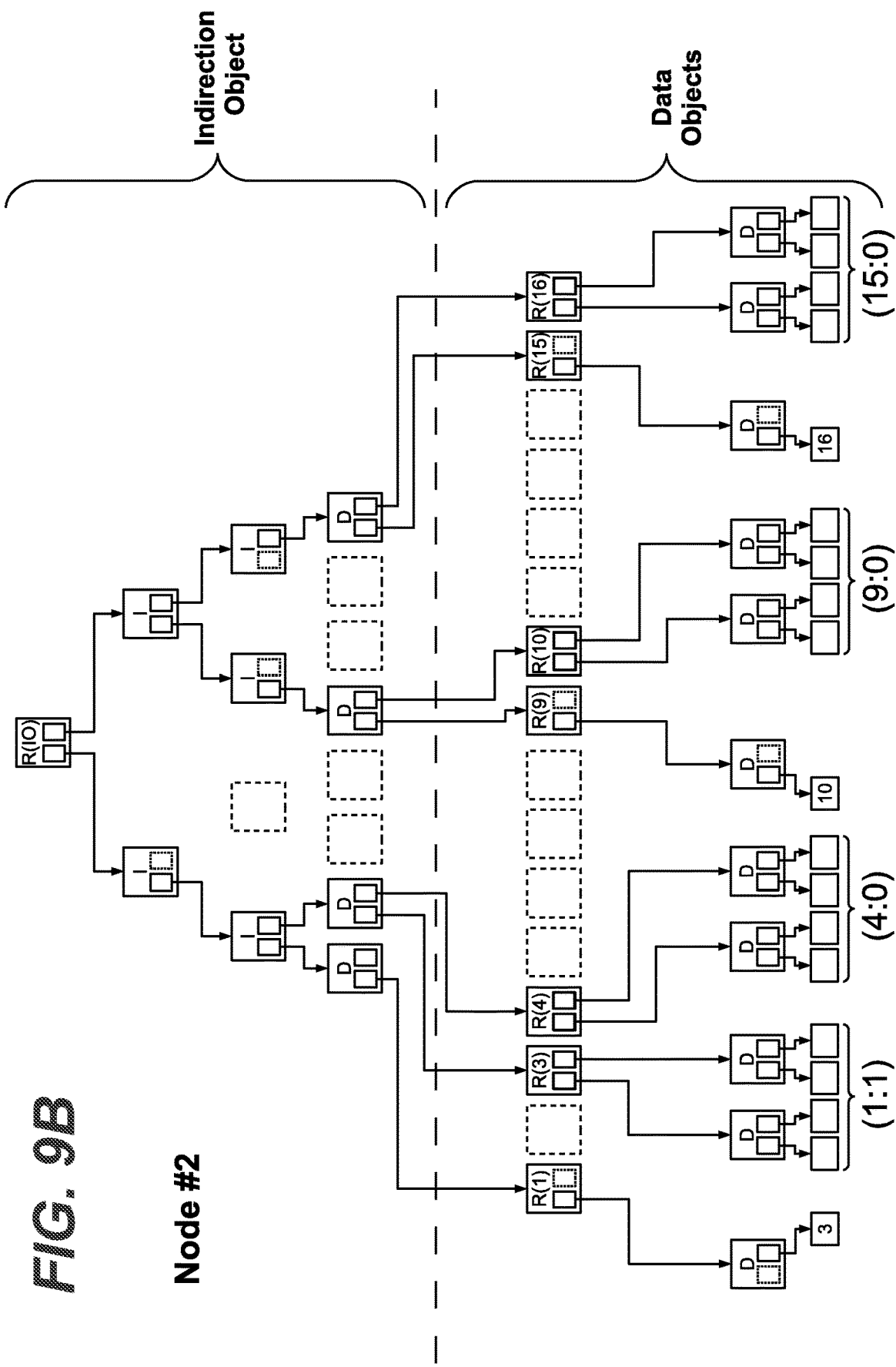
Figure 9C:
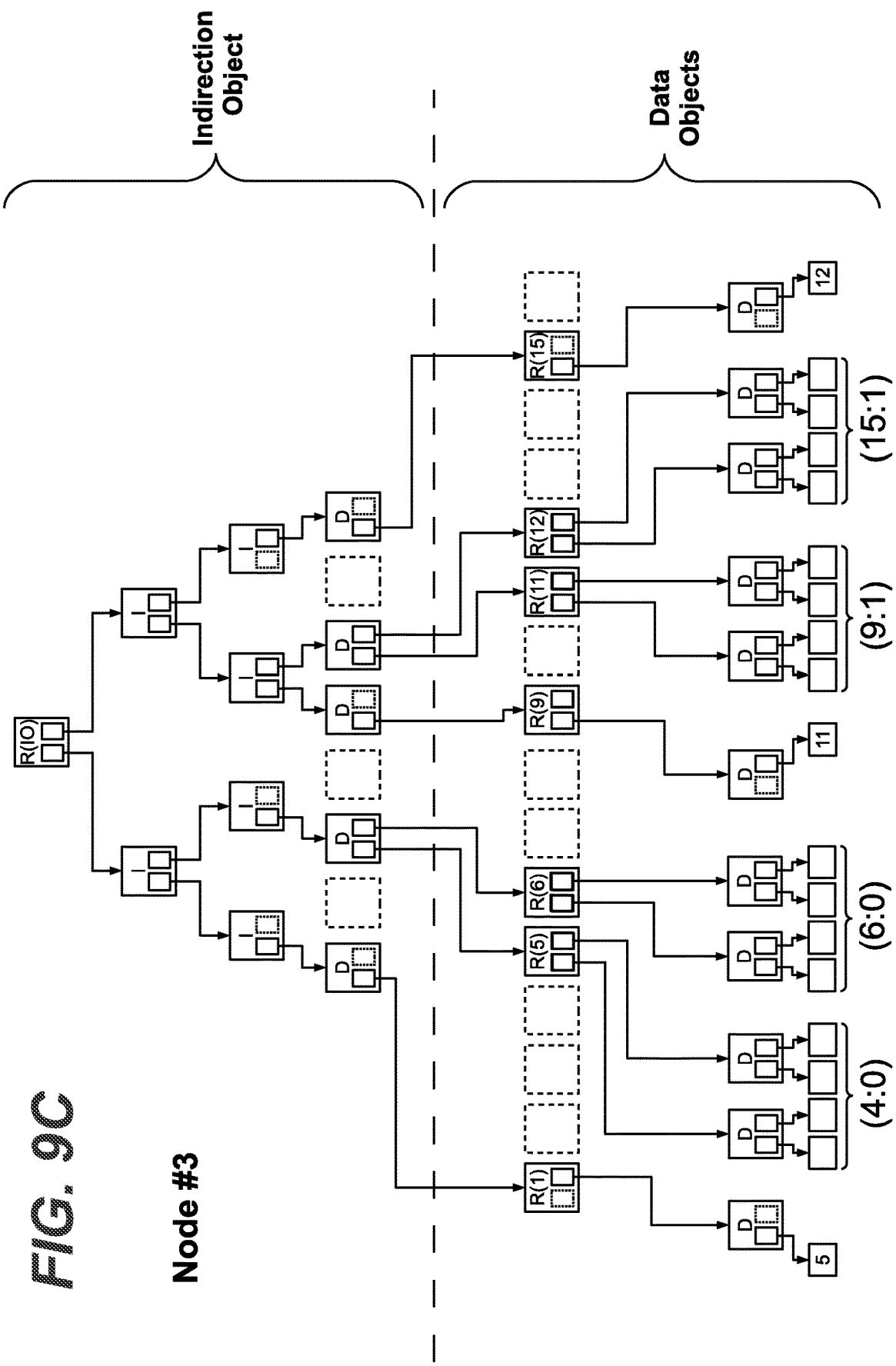

FIGS. 9A to 9C show an example (second example) for an object number grouping in which the input parameter of the mapping function (or distribution map providing function) may be taken as the quotient of the object number for divisor N(BP)=2 (neglecting the remainder).

The respective object number allocation and distribution arrangement of the global objects A to G is given in Table 2 below.

TABLE 2

Example 2

| Object ID | Distribution map | Node #1 | Node #2 | Node #3 |
|---|---|---|---|---|
| 1 | (1, 2, 3) | 1 (PO) | 1 (PO) | 1 (PO) |
| 2 | (1, 2, 3) | 2 (1:0) | not used | not used |
| 3 | (2, 3, 1) | not used | 3 (1:1) | not used |
| 4 | (2, 3, 1) | not used | 4 (4:0) | not used |
| 5 | (3, 1, 2) | not used | not used | 5 (1:2) |
| 6 | (3, 1, 2) | not used | not used | 6 (6:0) |
| 7 | (1, 2, 3) | 7 (1:3) | not used | not used |
| 8 | (1, 2, 3) | 8 (8:0) | not used | not used |
| 9 | (2, 3, 1) | 9 (PO) | 9 (PO) | 9 (PO) |
| 10 | (2, 3, 1) | not used | 10 (9:0) | not used |
| 11 | (3, 1, 2) | not used | not used | 11 (9:1) |
| 12 | (3, 1, 2) | not used | not used | 12 (15:1) |
| 13 | (1, 2, 3) | 13 (9:2) | not used | not used |
| 14 | (1, 2, 3) | 14 (14:0) | not used | not used |
| 15 | (2, 3, 1) | not used | 15 (PO) | 15 (PO) |
| 16 | (2, 3, 1) | not used | 16 (15:0) | not used |

VI.7 Third Object Number Allocation Examples (Avoid Indirection Object Sparseness)

Figure 10A:
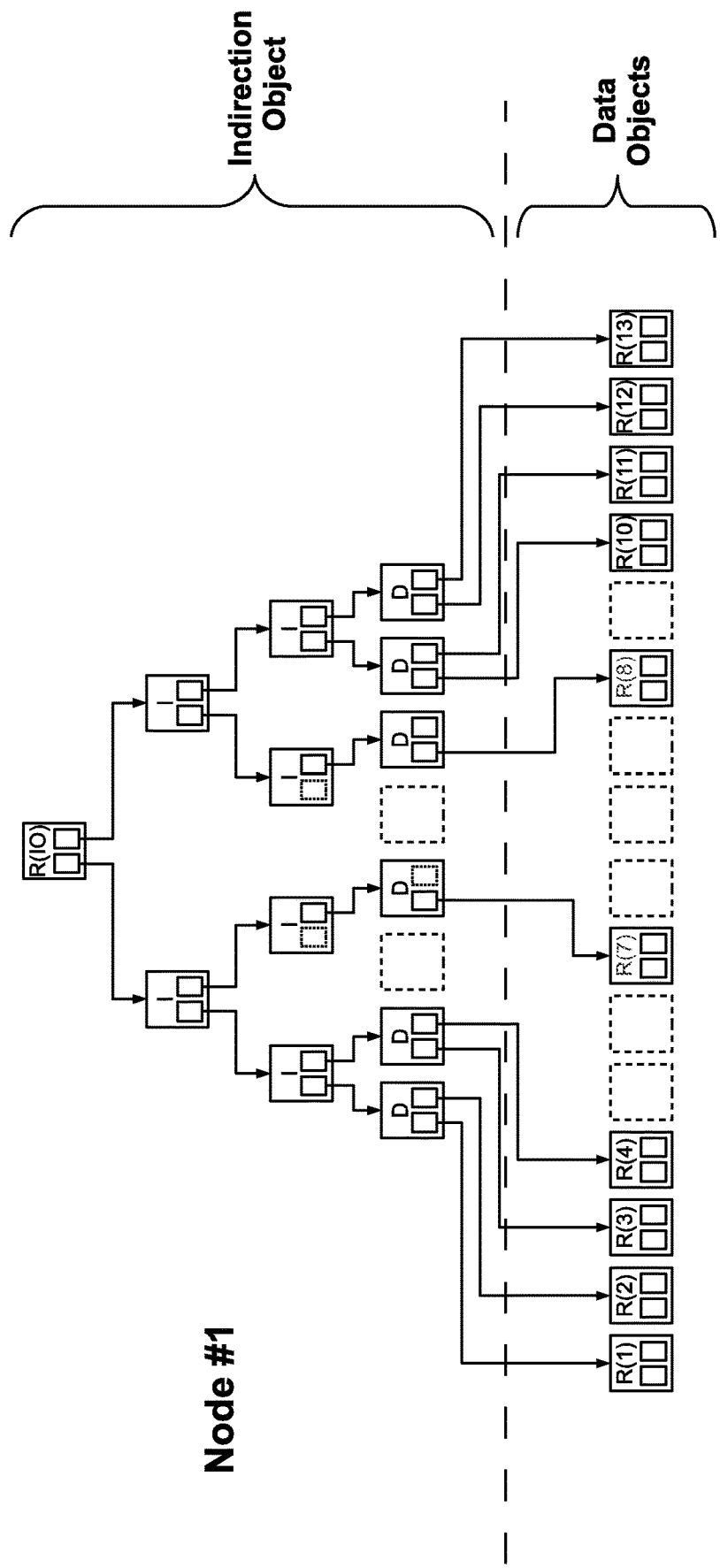
FIGS. 10A to 10C exemplarily show schematic diagrams of exemplary metadata tree structures on three node apparatuses, respectively, according to exemplary embodiments based on a third example.
Figure 10B:
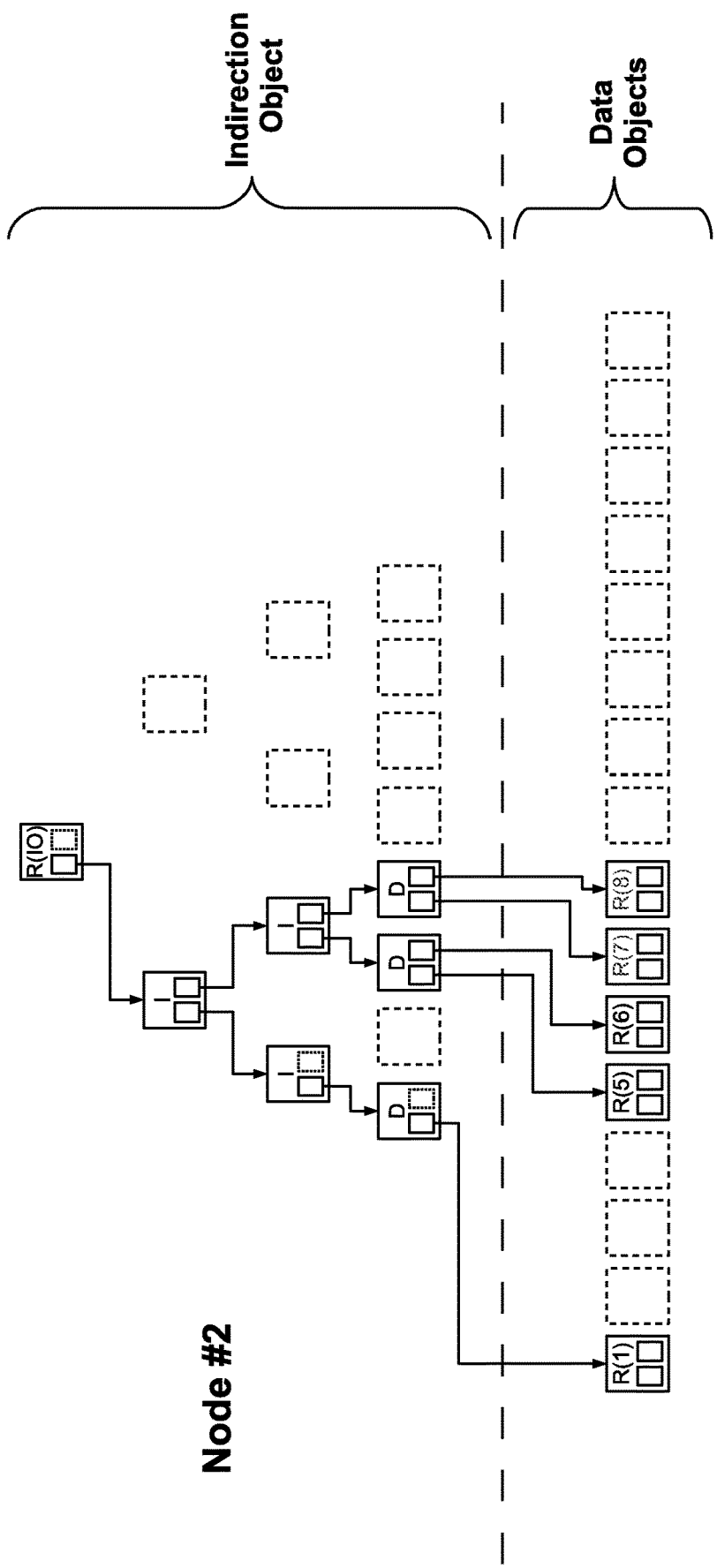
Figure 10C:
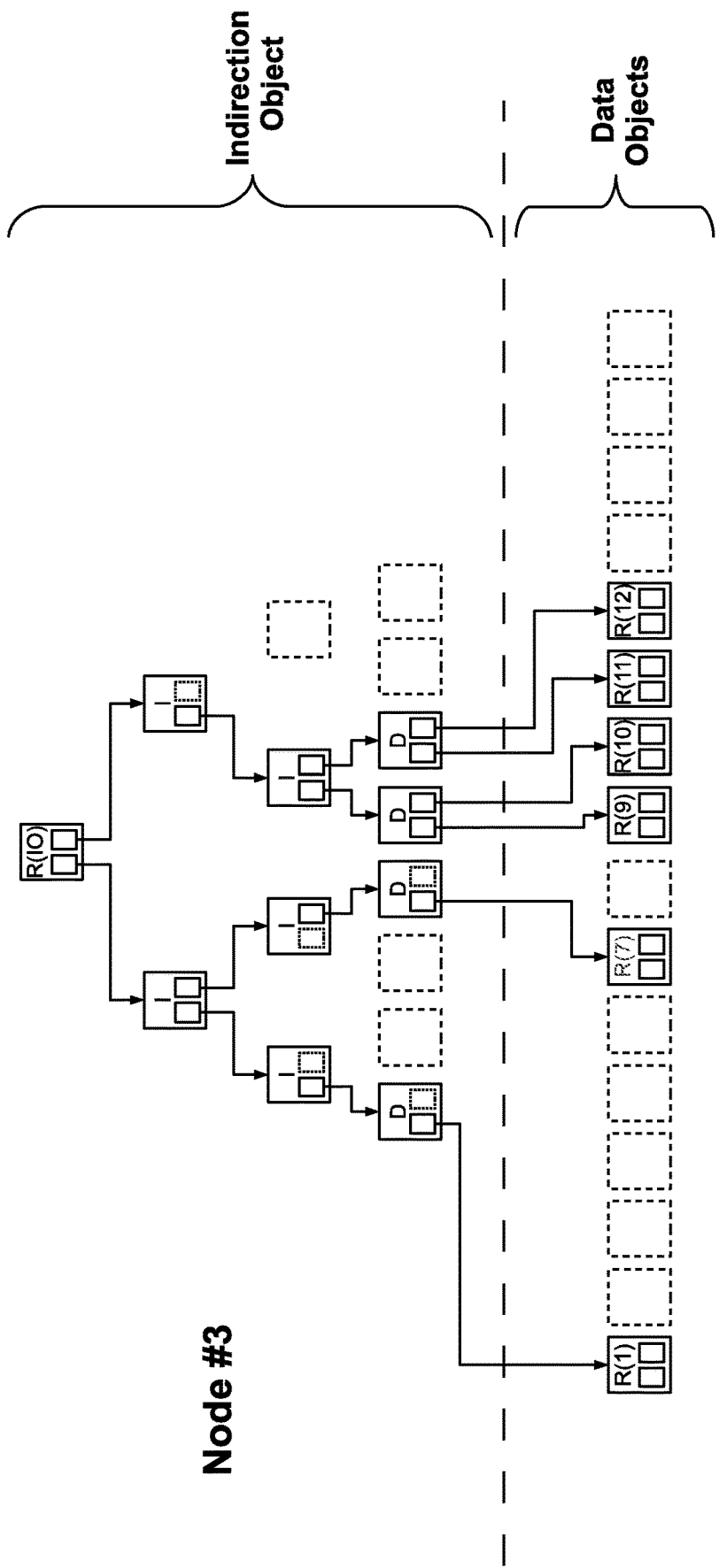

FIGS. 10A to 10C show an example (third example) for an object number grouping in which the input parameter of the mapping function (or distribution map providing function) may be taken as the quotient of the object number for divisor N(BP)=2×2 (neglecting the remainder).

The FIGS. 10A to 10C exemplarily only show the indirection structure and neglect the data object structure which can be provided in analog to FIGS. 8A to 9C.

The respective object number allocation and distribution arrangement of the global objects A to G is given in Table 3 below.

TABLE 3

Example 3

| Object ID | Distribution map | Node #1 | Node #2 | Node #3 |
|---|---|---|---|---|
| 1 | (1, 2, 3) | 1 (PO) | 1 (PO) | 1 (PO) |
| 2 | (1, 2, 3) | 2 (1:0) | not used | not used |
| 3 | (1, 2, 3) | 3 (1:3) | not used | not used |
| 4 | (1, 2, 3) | 4 (4:0) | not used | not used |
| 5 | (2, 3, 1) | not used | 5 (1:1) | not used |
| 6 | (2, 3, 1) | not used | 6 (6:0) | not used |
| 7 | (2, 3, 1) | 7 (PO) | 7 (PO) | 7 (PO) |
| 8 | (2, 3, 1) | not used | 8 (7:0) | not used |
| 9 | (3, 1, 2) | not used | not used | 9 (1:2) |
| 10 | (3, 1, 2) | not used | not used | 10 (7:1) |
| 11 | (3, 1, 2) | 11 (PO) | not used | 11 (PO) |
| 12 | (3, 1, 2) | not used | not used | 12 (11:0) |
| 13 | (1, 2, 3) | 13 (7:2) | not used | not used |
| 14 | (1, 2, 3) | 14 (11:1) | not used | not used |
| 15 | (1, 2, 3) | 15 (15:0) | not used | not used |
| 16 | (1, 2, 3) | 16 (16:0) | not used | not used |

VI.8 Comparison of Object Number Allocation Examples

FIGS. 9A to 9C exemplarily show schematic diagrams of exemplary metadata tree structures on three node apparatuses, respectively, according to exemplary embodiments based on a second example according to Table 2 above, and FIGS. 10A to 10C exemplarily show schematic diagrams of exemplary metadata tree structures on three node apparatuses, respectively, according to exemplary embodiments based on a third example according to Table 3 above.

TABLE 4

Comparison-Object Distribution in Examples 1 to 3

| Object | Type | Segments | Example 1 | Example 2 | Example 3 |
|---|---|---|---|---|---|
| A | Large | 4 | 4 (1:0) | 2 (1:0) | 2 (1:0) |
|   |   |   | 5 (1:1) | 3 (1:1) | 5 (1:1) |
|   |   |   | 6 (1:2) | 5 (1:2) | 9 (1:2) |
|   |   |   | 7 (1:3) | 7 (1:3) | 3 (1:3) |
| B | Small | 1 | 2 (2:0) | 4 (4:0) | 4 (4:0) |
| C | Small | 1 | 3 (3:0) | 6 (6:0) | 6 (6:0) |
| D | Large | 3 | 11 (8:0) | 10 (9:0) | 8 (7:0) |
|   |   |   | 12 (8:1) | 11 (9:1) | 10 (7:1) |
|   |   |   | 13 (8:2) | 13 (9:2) | 13 (7:2) |
| E | Small | 1 | 9 (9:0) | 8 (8:0) | 15 (15:0) |
| F | Large | 2 | 16 (10:0) | 16 (15:0) | 12 (11:0) |
|   |   |   | 14 (10:1) | 12 (15:1) | 14 (11:1) |
| G | Small | 1 | 15 (15:0) | 14 (14:0) | 16 (16:0) |

However, as can be derived from the above Table 4, each of the first to third examples stores the same global objects A to G with same sizes to the same cluster system, only by different object number grouping or other grouping of distribution maps.

While the first example does not have any object number grouping of subsequent object numbers and any subsequent object numbers result in different distribution maps, the second example has a disjoint grouping in which each two subsequent object numbers are grouped together such that each group of two subsequent object numbers (disjoint groups of two subsequent object numbers) maps to the same distribution map, and the third example has a disjoint grouping in which each 4 (=$2^2$) subsequent object numbers are grouped together such that each group of four subsequent object numbers (disjoint groups of four subsequent object numbers) maps to the same distribution map.

As a consequence, it may be seen in FIGS. 9A to 10C that the occurrence of sparseness in the indirection object, and in particular the number of required indirection object metadata nodes can be reduced.

TABLE 5

Comparison-Indirection Object Sparseness in Examples 1 to 3

| Example | #IOnodes on node #1 | #IOnodes on node #2 | #IOnodes on node #3 | #IOnodes (total) | #IOnodes (sparse) |
|---|---|---|---|---|---|
| No. 1 | 13 | 13 | 14 | 40 | 21 |
| No. 2 | 11 | 10 | 12 | 33 | 14 |
| No. 3 | 13 | 7 | 10 | 30 | 10 |

For the above three examples, the results are given in the above Table 5, which indicates that the number of sparse metadata nodes in the indirection object across all three nodes can be reduced from 21 to 14 to 10 sparse metadata nodes from the first to third examples, and the total number of required indirection object metadata nodes can be reduced as well, e.g. from a total number of 40 to 33 to 30 metadata nodes in the indirection objects from the first to third examples.

Accordingly, while the same amount and number of data objects is handled on the same number of node apparatuses in all of the above three examples, the size of the indirection object (given by the number of metadata nodes) can be reduced significantly so as to increase cache efficiency in embodiments which store parts of the indirection object in the cache memory to improve efficiency in I/O access request handling.

VII. Distribution Map Determination in Exemplary Embodiments

In exemplary embodiments, a deterministic approach may be used to distribute data segments of large data objects. The size of such data segments is limited according to a so-called distribution size.

For example, if a large data object shall be stored on M node apparatuses of a cluster of N node apparatuses (N≥M), the large data object shall be stored in a distributed manner by distributing its K data segments on M node apparatuses. For example, if the large data object is of a data size being K times the distribution size, the K data segments are distributed on K node apparatuses if K<M or the K data segments are distributed on M node apparatuses if K≥M.

In the management of data objects in the cluster system, in order to uniquely identify data objects, each data object is assigned with a unique object identifier such as e.g. a unique object number in exemplary embodiments.

In the cluster system, each data object is assigned the unique object identifier, preferably independent of whether it is a small data object, a large data object, a parent object or a child object, in exemplary embodiments. In the following, exemplary embodiments will be described with reference to object numbers as object identifiers. This is however not intended to be interpreted as limiting the present invention, and other object identifiers may be used.

VII.1 Deterministic Distribution Algorithm in Exemplary Embodiments

As previously mentioned, exemplarily, each node apparatus is assigned another range in the object number space, and a deterministic algorithm is used to provide a mapping function uniquely (and optionally subjectively) mapping object numbers of an object number space to node apparatus IDs.

Such mapping function takes, for example, an object number as input parameter and returns an output parameter indicative of a particular node apparatus ID (e.g. a unique node apparatus identifier or unique node apparatus ID number). Such mapping function may be used to determine a responsible node apparatus based on a deterministic algorithm.

Furthermore, such mapping function may be provided as (or be combined with) a distribution map providing function which takes an object number as input parameter and returns a distribution map for a distribution of M data segments on different node apparatuses of a cluster of N node apparatuses (with M≤N), wherein M and N may be further input parameters of the distribution map providing function or may be pre-determined.

As previously mentioned, the (M+1)-th data segment shall be distributed/stored to the same node apparatus as the $1^{st}$ data segment and the (M+j)-th data segment shall be distributed/stored to the same node apparatus as the j-th data segment. Therefore, any distribution map, independent of the parameter M, can be used to distribute an arbitrary number of one or more data segments.

For example, in a cluster system with N=3 nodes and for distribution of M=3 data segments on different nodes, the available distribution maps are: (1,2,3), (2,3,1), (3,1,2), (1,3,2), (2,1,3), and (3,2,1). For example, for a distribution map (1,2,3), the first data segment of a large data object (i.e. a child object associated with the first data segment) would, according to the deterministic algorithm, be stored to the first node apparatus (#2). In the same way, a small object (which has a total data size smaller or equal to the distribution size and therefore is smaller or equal than a data segment) would, according to the deterministic algorithm and based on the distribution map (1,2,3), be stored to the first node apparatus (#1).

On the other hand, for a distribution map (1,2,3), the second data segment of a large data object (i.e. a child object associated with the second data segment) would, according to the deterministic algorithm, be stored to the second node apparatus (#2), the third data segment of a large data object (i.e. a child object associated with the third data segment) would, according to the deterministic algorithm, be stored to the third node apparatus (#3), and further data segments would be sequentially stored again to the first to third node apparatuses.

For example, according to object number grouping described above, if the number of pointers of a metadata node of the indirection object is N(BP), the input parameter of the mapping function (or distribution map providing function) may be taken as the quotient of the object number (or the object number minus one, if the object number counting starting at 1) for divisor $N(BP)^L$ (L being an integer of one, two or three or more) by neglecting the remainder, such that each group of $N(BP)^L$ subsequent object numbers leads to a same input parameter and thus to a same mapped node apparatus or same distribution map.

In some examples, a known algorithm such as the CRUSH (Controlled Replication Under Scalable Hashing) algorithm may be used to realize a mapping function and a distribution map providing function. Also, modified mapping algorithms based on the CRUSH algorithm may be used.

As another example of a mapping function and a distribution map providing function will be described in the following. In the example, the input values of the distribution map providing function will exemplarily be given as the quotient of the object number minus 1 for divisor 2 by neglecting the remainder (i.e. assuming exemplarily that L=1 and N(BP)=2).

Accordingly, the first group of object numbers 1 and 2 map to an input value 0, the second group of object numbers 3 and 4 map to an input value 1, the third group of object numbers 4 and 5 map to an input value 2, etc. In total, an object number range from 1 to N is exemplarily used.

Further exemplarily, it is assumed that the cluster system includes six node apparatuses labelled #2 to #6.

The deterministic algorithm according to some exemplary embodiments may include a pseudo-random number generator which takes the input value combined with a node number (node ID) as a seed and returns a pseudo-random number which is however returned each time the same seed is used. Accordingly, each seed is associated with a fixed pseudo-random number. Accordingly, each combination of an input value being determined based on the object number and node ID (node number) is associated with a fixed pseudo-random number.

Further exemplarily, for each object number of the range of object numbers 1 to N and for each node apparatus, a respective seed is determined and used to determine an associated pseudo-random number.

In the example of Table 6 for object number 0 (input value 0), the node apparatus #6 associated with the pseudo-random number 8720 as the largest number among the pseudo-random numbers returned for object number 0 (input value 0) may exemplarily selected as main node for object number 0.

Accordingly, the node apparatus #6 would be intended to store a small data object of the given object number 0 or a first segment of a large data object of the given object number 0. Similarly, the main nodes can be selected also for the other object numbers as exemplarily given in the 9$^{th}$ column of the above Table 6.

Furthermore, in order to determine a distribution map based on the above algorithm using pseudo-random numbers, a distribution sequence of node apparatuses storing further data segments of large data objects may be determined based on the ordering of the pseudo-random numbers returned for the node apparatuses for the given object numbers.

Also, only a subset of node apparatuses may be selected for the distribution of data segments, i.e. by taking only the node apparatuses having the M largest (or smallest) pseudo-random numbers among all pseudo-random numbers. In the example, the distribution maps are exemplarily determined to select four node apparatuses among the six node apparatuses by exemplarily taking the four largest pseudo-random numbers among all pseudo-random numbers returned for the node apparatuses for the given object numbers. The resulting distribution maps are exemplarily indicated in the 10$^{th}$ column of the above Table 6.

TABLE 6

Exemplary Distribution Map Determination

| Object Number | Input Value | Node #1 | Node #2 | Node #3 | Node #4 | Node #5 | Node #6 | Main Node | Distribution Map |
|---|---|---|---|---|---|---|---|---|---|
| 1 | 0 | 1095 | 2440 | 1677 | 8075 | 5583 | *8720* | #6 | (6, 2, 4, 5) |
| 2 | 0 | 1095 | 2440 | 1677 | 8075 | 5583 | *8720* | #6 | (6, 2, 4, 5) |
| 3 | 1 | 0884 | 4942 | 9411 | 5577 | *9849* | 2499 | #5 | (5, 2, 3, 4) |
| 4 | 1 | 0884 | 4942 | 9411 | 5577 | *9849* | 2499 | #5 | (5, 2, 3, 4) |
| 5 | 2 | 2244 | 1269 | *9847* | 8187 | 6567 | 1686 | #3 | (3, 4, 5, 1) |
| 6 | 2 | 2244 | 1269 | *9847* | 8187 | 6567 | 1686 | #3 | (3, 4, 5, 1) |
| 7 | 3 | *8998* | 2821 | 1282 | 0448 | 3260 | 7958 | #1 | (1, 2, 5, 6) |
| 8 | 3 | *8998* | 2821 | 1282 | 0448 | 3260 | 7958 | #1 | (1, 2, 5, 6) |
| . | . | . | . | . | . | . | . | . | . |
| . | . | . | . | . | . | . | . | . | . |
| . | . | . | . | . | . | . | . | . | . |
| N-1 | N div 2 | 7311 | 3679 | 5908 | 7231 | 1055 | *8652* | #6 | (6, 1, 3, 4) |
| N | N div 2 | 7311 | 3679 | 5908 | 7231 | 1055 | *8652* | #6 | (6, 1, 3, 4) |

The above table 6 exemplarily illustrates examples of the obtained pseudo-random numbers for each input value and each node apparatus #1 to #6. Since the input value is exemplarily determined for a quotient of the object number minus 1 for divisor 2 by neglecting the remainder, the object numbers 0 and 1 give the same pseudo-random numbers for each node apparatus, and the object numbers 2 and 3 give the same pseudo-random numbers for each node apparatus, etc.

For a given object number, the main node apparatus (e.g. a node apparatus intended to store a small data object of the given object number or a first segment of a large data object of the given object number) can be determined for example as the node apparatus which is associated with the largest pseudo-random number (or the smallest pseudo-random object number) among the pseudo-random numbers returned for the node apparatuses for the given object numbers.

It is emphasized that the algorithm can be extended to be used for an arbitrary number of object numbers, an arbitrary total number of node apparatuses in the cluster system, as well as to an arbitrary number of node apparatuses (between two and the total number of node apparatuses in the cluster system) being used for a certain distribution map.

It is to be noted that the invention is not limited to any specific deterministic algorithm used to provide a deterministic mapping function for determining a distribution map in the cluster.

In general, a deterministic mapping function algorithm may take one or more input values, including e.g. a total number of nodes of the cluster (which may change by adding or removal of one or more node apparatuses), a number of a subset of nodes used to distribute data segments of parent objects (e.g. if in a cluster of N node apparatuses, the data segments/child objects of certain parent objects shall not be distributed across all N nodes but to respective subsets of M node apparatuses with M<N), an object identifier or a parameter deterministically determined based on such object identifier (e.g. an object number or parameter determined based on the object number), and/or a data segment number.

As output value(s), e.g. if the deterministic algorithm takes the object identifier or a parameter deterministically determined based on such object identifier (e.g. an object number or parameter determined based on the object number) as input value, the deterministic algorithm may directly output a distribution map indicating the respective main node apparatus to store the small data object or first data segment of a parent object being associated with the input value object identifier and optionally additionally indicating the one or more other node apparatuses to store the other data segments of the associated parent object in a distributed manner.

the respective data object (small data object or large data object) may be re-distributed according to the new distribution map. For object numbers for which the distribution map has not changed, the respective data object does not need to be re-distributed.

Based on the above example of a deterministic algorithm using pseudo-random numbers, exemplarily in a case of adding another node apparatus (node apparatus #7) to the cluster system, the new pseudo-random numbers may be determined for the added node apparatus based on the input values and a node apparatus ID (node number) for the added node apparatus.

The below table 7 exemplarily illustrates examples of the obtained pseudo-random numbers for each input value and each node apparatus #1 to #7 in the same way as described above.

TABLE 7

Exemplary New Distribution Map Determination

| Object Number | Input Value | Node #1 | Node #2 | Node #3 | Node #4 | Node #5 | Node #6 | Node #7 | Main Node | Distribution Map |
|---|---|---|---|---|---|---|---|---|---|---|
| 1 | 0 | 1095 | 2440 | 1677 | 8075 | 5583 | 8720 | 6486 | #6 | (6, 7, 4, 5) |
| 2 | 0 | 1095 | 2440 | 1677 | 8075 | 5583 | 8720 | 6486 | #6 | (6, 7, 4, 5) |
| 3 | 1 | 0884 | 4942 | 9411 | 5577 | 9849 | 2499 | 0930 | #5 | (5, 2, 3, 4) |
| 4 | 1 | 0884 | 4942 | 9411 | 5577 | 9849 | 2499 | 0930 | #5 | (5, 2, 3, 4) |
| 5 | 2 | 2244 | 1269 | 9847 | 8187 | 6567 | 1686 | 7432 | #3 | (3, 4, 5, 7) |
| 6 | 2 | 2244 | 1269 | 9847 | 8187 | 6567 | 1686 | 7432 | #3 | (3, 4, 5, 7) |
| 7 | 3 | 8998 | 2821 | 1282 | 0448 | 3260 | 7958 | 4721 | #1 | (1, 2, 6, 7) |
| 8 | 3 | 8998 | 2821 | 1282 | 0448 | 3260 | 7958 | 4721 | #1 | (1, 2, 6, 7) |
| . | . | . | . | . | . | . | . | . | . | . |
| . | . | . | . | . | . | . | . | . | . | . |
| . | . | . | . | . | . | . | . | . | . | . |
| N-1 | N div 2 | 7311 | 3679 | 5908 | 7231 | 1055 | 8652 | 4652 | #6 | (6, 1, 3, 4) |
| N | N div 2 | 7311 | 3679 | 5908 | 7231 | 1055 | 8652 | 4652 | #6 | (6, 1, 3, 4) |

In other exemplary embodiments, the e.g. if the deterministic algorithm takes the object identifier or a parameter deterministically determined based on such object identifier (e.g. an object number or parameter determined based on the object number) as one input value and a data segment number as another input value, the deterministic algorithm may directly output information identifying a certain specific node apparatus to store a certain data segment of a certain object. Then, locations of small data objects and locations of a first data segment of a parent object being associated with the input value object identifier would be output if the other input value would indicate the first data segment (such as e.g. being the lowest data segment number, such as e.g. data segment number 0).

VII.2 Distribution Map Change in Exemplary Embodiments

If one or more node apparatuses are added (or removed) from the cluster system, exemplary embodiments allow to re-distribute the data objects in the newly arranged cluster system by executing a distribution map change and re-distributing the data objects according to new (changed) distribution maps.

This may be achieved in that each a new distribution map may be determined for each used object number in the cluster system based on the new number of total node apparatuses (after adding or removing one or more node apparatuses) using the same deterministic algorithm and, for each used object number, determining whether the distribution map is changed based on the changed total number of node apparatuses in the cluster system. Then, if the distribution map has changed for a certain used object number, For a given object number, the main node apparatus (e.g. a node apparatus intended to store a small data object of the given object number or a first segment of a large data object of the given object number) can again be determined for example as the node apparatus which is associated with the largest pseudo-random number (or the smallest pseudo-random object number) among the pseudo-random numbers returned for the node apparatuses for the given object numbers. In the example of Table 7, the main nodes have not changed compared to the distribution maps in Table 6.

In the example of Table 7 for object number 0 (input value 0), the node apparatus #6 associated with the pseudo-random number 8720 as the largest number among the pseudo-random numbers returned for object number 0 (input value 0) may exemplarily remain to be selected as main node for object number 0.

Accordingly, the node apparatus #6 would be intended to store a small data object of the given object number 0 or a first segment of a large data object of the given object number 0. Similarly, the main nodes can be selected also for the other object numbers as exemplarily given in the $10^{th}$ column of the above Table 7.

Furthermore, in order to determine new distribution maps based on the above algorithm using pseudo-random numbers, a distribution sequence of node apparatuses storing further data segments of large data objects may be again determined based on the ordering of the pseudo-random numbers returned for the node apparatuses for the given object numbers.

Also, only a subset of node apparatuses may be selected for the distribution of data segments, i.e. by taking only the node apparatuses having the M largest (or smallest) pseudo-random numbers among all pseudo-random numbers.

In the example, the distribution maps are exemplarily determined to select four node apparatuses among the seven node apparatuses by exemplarily taking the four largest pseudo-random numbers among all pseudo-random numbers returned for the node apparatuses for the given object numbers. The resulting distribution maps are exemplarily indicated in the 11$^{th}$ column of the above Table 7.

As can be seen by comparing Tables 6 and 7, exemplarily only the distribution maps for object numbers 1, 2, 5, 6, 7 and 8 have changed and the distribution maps for object numbers 3, 4, N−1 and N remain unchanged.

Accordingly, based on the new distribution maps, only the data objects associated with object numbers 1, 2, 5, 6, 7 and 8 need to be re-distributed. For example, for object number 0 the respective data segments (e.g. a second data segment) of a large data object associated with object number 0 on node may be moved from the node apparatus #2 to the newly added node apparatus #7.

It is emphasized that the algorithm can be extended to be used for an arbitrary number of object numbers, an arbitrary total number of node apparatuses in the cluster system, as well as to an arbitrary number of node apparatuses (between two and the total number of node apparatuses in the cluster system) being used for a certain distribution map.

VII.3 Modified Deterministic Distribution Algorithms in Exemplary Embodiments

In exemplary embodiments, the deterministic algorithm may take an object number (object identifier) or parameter calculated based on the object number as a first input value and a data segment number (data segment identifier) as a second input value.

This does however not exclude that additional input parameters such as a total number of node apparatuses in the cluster or the number of node apparatuses in a subset of node apparatuses to distribute data segments of a parent object.

Exemplarily, it is assumed that the deterministic algorithm is used to determine mapping information for a data object having an object number N, i.e. the first input value is the object number N (or an parameter determined based on the object number N, e.g. to also provide the aspect of object number grouping described in connection with other exemplary embodiments herein).

Exemplarily, it is assumed that the mapping algorithm is a function F(x,y) where x is the object number (or other object identifier or being determined on the basis thereof) and y is the data segment number (or other data segment identifier).

Then F(N,0) would deterministically determine and output location information indicative of the designated node apparatus to store the small data object having the object number N or being associated with the object identifier N and, in case of a large data object, F(N,0) would deterministically determine and output location information indicative of the designated node apparatus to store the first data segment (having exemplarily the data segment number 0).

Further exemplarily assuming that data segments of a large data object shall be distributed across M node apparatuses (e.g. either because the total number of node apparatuses is M or since the data segments shall be distributed across a subset of M node apparatuses in the larger cluster), the locations of data segments may be determined by calculating/determining the function F(N,i) for all M data segments (i=0, 1, . . . , M−1), the (M+1)-th data segment being stored again at the same location (node apparatus) as the first (0-th) data segment, e.g. with F(N,M)=F(N,0).

TABLE 8

Exemplary Location Information Determination

| Object Number | Data Segm. | Node #1 | Node #2 | Node #3 | Node #4 | Node #5 | Node #6 | Designate Node |
|---|---|---|---|---|---|---|---|---|
| N | 0 | 2919 | 5341 | 2922 | 3805 | 0895 | 8085 | #6 |
| N | 1 | 0735 | 4894 | 3728 | 2854 | 8726 | 4164 | #5 |
| N | 2 | 9453 | 2455 | 4864 | 1964 | 7453 | 5224 | #1 |
| N | 3 | 4262 | 8463 | 3742 | 2489 | 6739 | 2453 | #2 |

For example, the above Table 8 exemplarily deterministically determines locations of data segments 0 to 3 of an object of object number N in an example in which data segments shall be distributed across four node apparatuses in a cluster of six node apparatuses in total.

Again, the algorithm may be based on pseudo random number generation based on a seed value, wherein the object number N and the respective data segment number 0 to 3 and the respective node identifier is used for the seed value.

Exemplarily, taking the node apparatus having the largest pseudo random number in the above Table 8 the distribution map for data segments of an object of object number N is determined as (6,5,1,2).

VII.3.1 Optimization of Deterministic Distribution Algorithms in Exemplary Embodiments As becomes apparent from Table 8 above, it may occur that a node apparatus is picked as designated location for a data segment but was already picked for another earlier data segment.

In this case, the calculation can be repeated by adjusting the seed value by modifying the second input value (corresponding to or based on the data segment identifier) by a predetermined amount (e.g. a correction amount a), e.g. by calculating F(N,k+α) for data segment k if F(N,k) would select a node apparatus previously selected for another data segment.

Such calculation could be performed as long as a new node apparatus could be selected, such as by calculating F(N,k+α), F(N,k+2α), F(N,k+3α), etc., as exemplarily shown in Table 9 below.

TABLE 9

Exemplary Location Information Determination

| Object Number | Data Segm. | Node #1 | Node #2 | Node #3 | Node #4 | Node #5 | Node #6 | Designate Node |
|---|---|---|---|---|---|---|---|---|
| N | 0 | 2919 | 5341 | 2922 | 3805 | 0895 | 8085 | #6 |
| N | 1 | 0735 | 4894 | 3728 | 2854 | 8726 | 4164 | #5 |
| N | 2 | 9453 | 2455 | 4864 | 1964 | 7453 | 5224 | #1 |
| N | 3 | 8436 | 1647 | 4738 | 2647 | 3974 | 1844 | #1 |
| N | 3 + α | 2638 | 5748 | 8422 | 6923 | 9462 | 4274 | #5 |
| N | 3 + 2α | 4262 | 8463 | 3742 | 2489 | 6739 | 2453 | #2 |

Here, exemplarily, the deterministic algorithm for the first input value of the exemplary object number N and the exemplary data segment identifier 3 as second input value (as well as with the adapted data segment identifier 3+α) exemplarily would select a previously selected node apparatus. Exemplarily, in the above Table 9, the distribution map for data segments of an object of object number N is determined as (6,5,1,2).

However, by repeatedly executing the algorithm with a deterministically adapted seed value or at least deterministically adapted second input value, it is finally advantageously possible to select a previously non-selected node apparatus.

VII.3.2 Optimization of Deterministic Distribution Algorithms in Exemplary Embodiments In the exemplary algorithm described under it may occur that a high number of re-calculations must be performed in some cases, especially for higher data segment numbers and when the data segments shall be distributed on the whole cluster.

Another improved algorithm avoiding such re-calculations may be achieved in that the deterministic algorithm uses the first and second input values to determine/calculate an index number mapping onto a group (e.g. an array) of the available node apparatuses, the index number indexing a node apparatus of the group (e.g. the array) of available node apparatuses.

Then, once a node apparatus is selected in the algorithm as designated location for a certain data segment #n, the respective node apparatus can be removed from the group (e.g. the array) of available node apparatuses.

TABLE 10

Exemplary Location Information Determination

| Object Number | Data Segm. | Index #1 | Index #2 | Index #3 | Index #4 | Index #5 | Index #6 | Available Nodes Array | Selected Node |
|---|---|---|---|---|---|---|---|---|---|
| N | 0 | 2919 | 5341 | 2922 | 3805 | 0895 | 8085 | {1, 2, 3, 4, 5, 6} | #6 |
| N | 1 | 0735 | 4894 | 3728 | 2854 | 8726 | — | {1, 2, 3, 4, 5} | #5 |
| N | 2 | 9453 | 2455 | 4864 | 1964 | — | — | {1, 2, 3, 4} | #1 |
| N | 3 | 8436 | 1647 | 4738 | — | — | — | {2, 3, 4} | #2 |

Exemplarily, in the above algorithm of Table 10, the input values of object number N with data segment numbers 2 and 3 exemplarily both select index #1 but the index selects node apparatuses #1 and #2 without re-calculations because node apparatus #1 had exemplarily been removed from the group of available node apparatuses. Accordingly, the algorithm can be applied more efficiently by avoiding re-calculations.

Exemplarily, in the above Table 10, the distribution map for data segments of an object of object number N is determined as (6,5,1,2).

VII.3.3 Optimization of Deterministic Distribution Algorithms in Exemplary Embodiments Such optimized algorithm calculation procedure can be efficiently performed by means of array truncation. Then, whenever a node apparatus is selected for certain input values, the selected node apparatus may be exchanged with the last node apparatus in the array and the array may be truncated by one, please see below Table 11. This allows even more efficient processing.

calculation. This ensures that the array modification is always of O(1) and the algorithm can be ensured to be efficiently executed for each selection and for each calculation, and the algorithm may be made even more efficient.

VII.3.4 Node Addition or Removal in the Cluster

In all of the above exemplary described deterministic algorithm examples, adding or removing node apparatuses can be executed efficiently, since the same algorithm may be applied, just for less node apparatuses or indexes if one or more node apparatuses shall be removed, or for more node apparatuses or indexes if one or more node apparatuses shall be added.

Then, based on the new calculations when adding or removing node apparatuses, the data segments or small data objects may be moved accordingly.

Studies and detailed analysis have shown that the algorithms under section VII.3.2 and VII.3.3 have better performances with regards to the distribution map calculations since no re-calculations are necessary, while the algorithm under section VII.3.1 may have improved performance with regard to the desired requirements of less data movement operations in case of node addition/removal in the cluster, and the algorithms may be chosen based on the requirements of whether data movement performance at node removal/addition or distribution map calculation performance are to be prioritized.

VII.4 Modified Deterministic Distribution Algorithms in Exemplary Embodiments According to some exemplary preferred aspects, based on the deterministic algorithm e.g. according to one of the above examples or based on a known algorithm such as e.g. CRUSH, one or more distribution maps and/or mapping information, which may be indicative of a mapping of one or more input values, preferably corresponding to, being indicative of and/or being determined based on at least one of an object identifier and a data segment identifier, onto a

TABLE 11

Exemplary Location Information Determination

| Object Number | Data Segm. | Index #1 | Index #2 | Index #3 | Index #4 | Index #5 | Index #6 | Available Nodes Array | Selected Node |
|---|---|---|---|---|---|---|---|---|---|
| N | 0 | 2919 | 5341 | 7482 | 3805 | 0895 | 2922 | {1, 2, 3, 4, 5, 6} | #3 |
| N | 1 | 0735 | 4894 | 3728 | 2854 | 1748 | — | {1, 2, 6, 4, 5} | #2 |
| N | 2 | 9453 | 2455 | 4864 | 1964 | — | — | {1, 5, 3, 4} | #1 |
| N | 3 | 8436 | 1647 | 4738 | — | — | — | {4, 5, 3} | #4 |

Exemplarily, in the above Table 11, the distribution map for data segments of an object of object number N is determined as (3,2,1,4).

It can be seen that the place of the selected node apparatus is exemplarily exchanged with the last node apparatus in the array and the array is truncated by one last place for the next respective node apparatus or a respective associated distribution map, may preferably be pre-calculated (e.g. at boot time of the cluster or node apparatuses) and/or pre-stored in a memory, cache memory and/or non-volatile memory and/or a storage device on at least one of the node apparatuses or preferably all node apparatuses.

This has the advantage that such calculations based on the deterministic algorithm would not be needed to be re-calculated at times of input/output access or at times of adding/removing of node apparatuses, but could be efficiently obtained from the memory, cache memory and/or non-volatile memory and/or a storage device when needed.

In view of section VII.3.4, if data movement performance at node removal/addition in the cluster (e.g. requiring only ow amounts of data to be moved at node removal/addition) and high efficiency in I/O processing are required or desired, such pre-calculations and pre-storage of mapping information or distribution maps combined with the algorithm of section VII.3.1 may give the most preferable exemplary embodiment.

VIII. Object Creation Process in Exemplary Embodiments

Figure 11A:
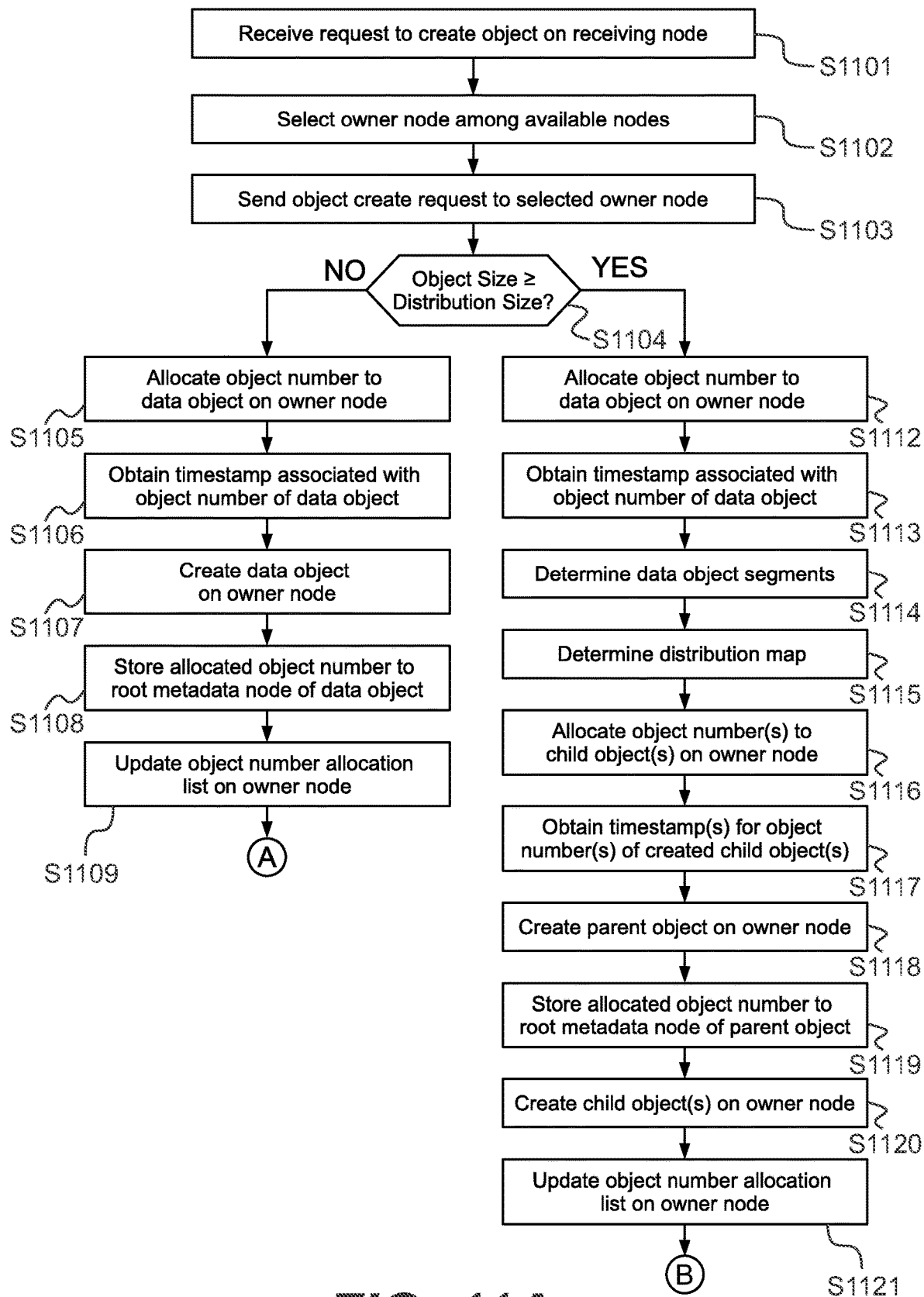
FIGS. 11A to 11B exemplarily illustrate a flow chart of object creation processing according to some exemplary embodiments.
Figure 11B:
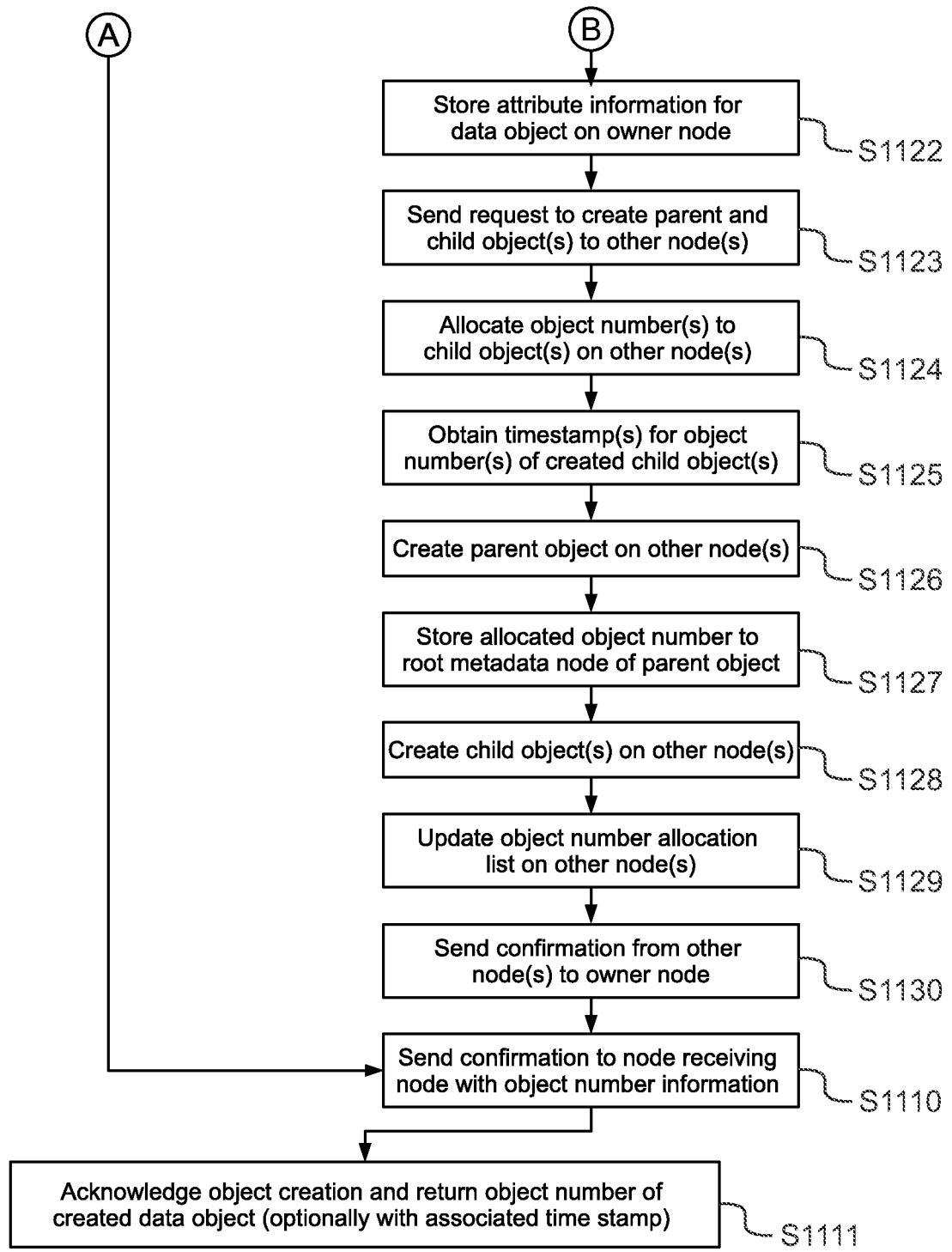

FIGS. 11A to 11B exemplarily illustrate a flow chart of object creation processing according to some exemplary embodiments.

In step S1101, a receiving node apparatus in the cluster system may receive an object creation request (e.g. based on a request received from a connected client at the interface/protocol layer) requesting to create a data object in the cluster system. Typically, any node apparatus of the cluster system may receive such requests and may handle the request.

The receiving node could continue to create the object according to the object creation request locally, however this may lead to a situation that some nodes would receive such object creation request more frequently than others, thereby leading to an unbalanced distribution of objects in the cluster system. Therefore, the process in FIG. 11A exemplarily continues with the optional step S1102 of selecting an owner node apparatus among available node apparatuses, wherein the selected owner node apparatus will exemplarily be responsible for the object creation.

Each node may autonomously select owner nodes without synchronization with other node apparatuses in exemplary embodiments. For example, each node apparatus may run an autonomous round robin algorithm for selecting the owner node when receiving an object creation request.

In principle, a balanced object creation in the cluster system can be advantageously achieved if each node autonomously selects owner nodes according to an autonomous process that randomly selects owner nodes when receiving object creation requests according to a uniform random distribution. Of course, in further exemplary embodiments, the node apparatuses may also run synchronized algorithms to select owner nodes.

The selection process of an owner node apparatus may be executed on the scale-out layer.

Upon selecting an owner node apparatus in step S1102, the receiving node apparatus sends an object creation request to create the object to the selected owner node apparatus in step S1103.

Then, in a step S1104, it is determined whether the instructed object to be created has a size above or below a pre-determined threshold, referred to as "distribution size", to determine whether to create a small object or a large object.

Specifically, if step S2204 returns NO in that the object size is not larger than the distribution size, the process continues with a process to create a small data object on the owner node apparatus, and if the step S2204 returns YES in that the object size is larger than the distribution size, the process continues with a process to create a large data object on the owner node apparatus.

In the following, the process to create a small data object after step S1104 returning NO is exemplarily described first. The process continues with step S1105 to allocate an object number to the data object on the owner node apparatus.

For example, the owner node apparatus may refer to an object number list stored on the owner node apparatus indicating free (non-used) object numbers associated with the owner node apparatus. The owner node apparatus may select a free object number from the object number list stored on the owner node apparatus and allocate the selected object number to the data object to be created.

As previously mentioned, such object number is associated with the owner node apparatus in that a deterministic algorithm using the respective object number would indicate that the owner node apparatus is responsible for managing a data object having the respective object number (e.g. in that a distribution map determined on the basis of the deterministic algorithm using the object number as input value indicates that the owner node apparatus is a main node apparatus).

The object number allocation may be executed on the scale-out layer or the metadata layer.

Furthermore, upon allocating the object number to the data object to be created in step S1105, the owner node apparatus obtains a time stamp associated with the allocated object number in step S1106. This may serve in a process of object number validation to ensure that object numbers may be re-allocated or re-used after an object previously using the same object number has been deleted.

For example, a handle (object ID) included in access requests directed to a data object may include an object reference indicative of the object number and the associated time stamp. Then, if a previously deleted object number was associated with the same object number but has been deleted in the meantime and the object number is re-allocated to a new object, the new object will have the same object number but a different associated time stamp, so that handles (object IDs) included in access requests directed to the data object differ at least in the associated time stamps.

It is to be noted that timers of node apparatuses used for obtaining the time stamps do not need to be synchronized in the cluster system since the same node (and the same timer) will be responsible for allocating same object numbers and thereby guarantee different time stamps.

However, it needs to be guaranteed that the timer of a certain node apparatus does change (or at least does not jump back in time) when rebooting the certain node apparatus, to guarantee that object number validation based on time stamps as discussed above can be reliably executed.

If data objects are re-distributed to another owner node apparatus based on changed distribution maps, time stamps can be newly given by the new owner node apparatus.

Then, in step S1107, the small data object is created on the selected owner node apparatus and the allocated object number is stored to the root metadata node of the data object in step S1108.

Also, the object number list stored on the owner node apparatus is updated in step S1109 to reflect that the respective object number is now in use.

The data creation may be executed on the metadata layer, including the data protection and storage device layers to write the data associated with the created data object to storage devices on the owner node apparatus.

Upon creation of the small data object, the process continues with step S1110 of sending a confirmation of the object creation from the owner node apparatus to the receiving node apparatus together with object ID information or object number information (e.g. indicating the object number, the time stamp, and/or a handle identifying the data object).

In step S1111, the receiving node apparatus issues a response (e.g. to the interface/protocol layer, or to the requesting client) to acknowledge and confirm the instructed object creation and return the handle (exemplarily including the object number, or the object number and the associated time stamp, if time stamps are exemplarily used for object number validation purposes).

In the following, the process to create a large data object after step S1104 returning YES is exemplarily described. The process continues with step S1112 to allocate an object number to the data object on the owner node apparatus.

Again, the owner node apparatus may refer to an object number list stored on the owner node apparatus indicating free (non-used) object numbers associated with the owner node apparatus. The owner node apparatus may select a free object number from the object number list stored on the owner node apparatus and allocate the selected object number to the data object to be created.

Furthermore, upon allocating the object number to the data object to be created in step S1112, the owner node apparatus optionally obtains a time stamp associated with the allocated object number in step S1113. This may again serve in a process of object number validation to ensure that object numbers may be re-allocated or re-used after an object previously using the same object number has been deleted.

Then, in step S1114, based on the size of the large data object (being larger than the distribution size), data segments of the large data object of the distribution size are determined. For example, if the size of the large data object is N times the distribution size (or more precisely larger than N−1 times the distribution size and smaller or equal to N times the distribution size) then the data of the large data object to be created is divided into N data segments of the distribution size, and the N data segments are determined.

Furthermore, determined based on the deterministic algorithm or pre-stored based on the deterministic algorithm, a distribution map associated with the allocated object number is determined in step S1115.

Based on the determined distribution map and the determined data segments, it may be determined which data segments need to be stored on which node apparatuses. However, at least the first data segment is stored on the owner node apparatus and optionally also one or more data segments depending on the number of data segments and the distribution map. Especially if the number of data segments of the large object to be created is larger than the number of node apparatuses in the cluster system, one or more further data segments are stored on storage devices of the owner node apparatus.

Upon determining which data segments shall be stored on the owner node apparatus, since each data segment thereof is to be associated with a respective child object on the owner node apparatus, the process continues with a step S1116 to allocate object number(s) to the one or more child objects to be stored on the owner node apparatus.

Again, the owner node apparatus may refer to an object number list stored on the owner node apparatus indicating free (non-used) object numbers associated with the owner node apparatus. The owner node apparatus may select a free object number from the object number list stored on the owner node apparatus and allocate the selected object number to each child object to be created on the owner node apparatus.

Furthermore, upon allocating the object number(s) to the child object(s), the owner node apparatus optionally obtains respective time stamp(s) associated with the allocated object number(s) for child object(s) in step S1117. This may again serve in a process of object number validation to ensure that object numbers may be re-allocated or re-used after an object previously using the same object number has been deleted.

Then, in step S1118, the parent data object of the large data object is created on the selected owner node apparatus and the allocated object number of the large data object is stored to the root metadata node of the parent object in step S1119, and in step S1120, one or more child object(s) of the large data object is/are created on the selected owner node apparatus and the allocated object numbers thereof may be stored to the root metadata node of the respective child object(s).

Also, the object number list stored on the owner node apparatus is updated in step S1121 to reflect that the respective object numbers of the parent object and one or more child objects are now in use on the owner node apparatus.

Furthermore, optionally, attribute information associated with the large data object may be stored for the data object on the owner node apparatus (e.g. as a part of the parent object, or being another attribute object being pointed to by the parent object) in step S1122. Accordingly, the owner node apparatus of a data object (including small and large data objects) may additionally store attribute information associated with the data object. Accordingly, even if the large data object is distributed across multiple node apparatuses, the attribute information can easily, reliably and efficiently be obtained by access on the owner node apparatus thereof.

Still, since at least one other data segment needs to be stored to another node apparatus according to the distribution map determined in step S1115, the owner node apparatus sends object creation request to create respective child objects to one or more other node apparatuses according to the distribution map in step S1123.

Upon receiving the object creation request to create respective child object(s) on the other node apparatus(es), the child objects may be created very similarly to small data objects. For example, the other node apparatus(es) may continue to allocate object number(s) to the one or more child objects to be stored on the other node apparatus(es) in step S1124.

Again, each of the other node apparatus(es) may refer to their own respective object number list stored on the other node apparatus(es) indicating free (non-used) object numbers associated with the other node apparatus(es). The other node apparatus(es) may select free object number(s) from the object number list(s) stored on the other node apparatus(es) and allocate the selected object number(s) to each child object to be created on the respective other node apparatus.

Furthermore, upon allocating the object number(s) to the child object(s), the other node apparatus(es) optionally obtains respective time stamp(s) associated with the allocated object number(s) for child object(s) in step S1125. This may again serve in a process of object number validation to ensure that object numbers may be re-allocated or re-used after an object previously using the same object number has been deleted.

Then, in step S1126, the parent data object of the large data object is created on each of the other node apparatus(es)

and the allocated object number of the large data object is stored to the root metadata node of the parent object in step S1127, and in step S1128, one or more child object(s) of the large data object is/are created on each of the other node apparatus(es) and the allocated object numbers thereof may be stored to the root metadata node of the respective child object(s).

Also, the object number list(s) stored on the other node apparatus(es) is updated in step S1129 to reflect that the respective object numbers of the one or more child objects are now in use on the other node apparatus(es). The object number of the parent object may also be indicated to be in use, however this is optional since the other node will not need to allocate the object number of the parent object which is actually associated with the owner node apparatus.

In step S1130, each of the other node apparatus(es) sends a confirmation response to the owner node apparatus to confirm creation of the respective child object(s) so that the owner node apparatus can verify that all child objects for all data segments of the large data object to be created are stored on the intended node apparatuses according to the corresponding distribution map. Then, the large data object is fully created, and data segments thereof are distributed across the owner node apparatus and the other node apparatus(es).

Upon creation of the large data object, the process continues with step S1110 of sending a confirmation of the object creation from the owner node apparatus to the receiving node apparatus together with object ID information or object number information (e.g. indicating the object number, the time stamp, and/or a handle identifying the data object).

In step S1111, the receiving node apparatus issues a response (e.g. to the interface/protocol layer, or to the requesting client) to acknowledge and confirm the instructed object creation and return the handle (exemplarily including the object number, or the object number and the associated time stamp, if time stamps are exemplarily used for object number validation purposes).

IX. Data Object Re-Distribution in Exemplary Embodiments

Figure 12:
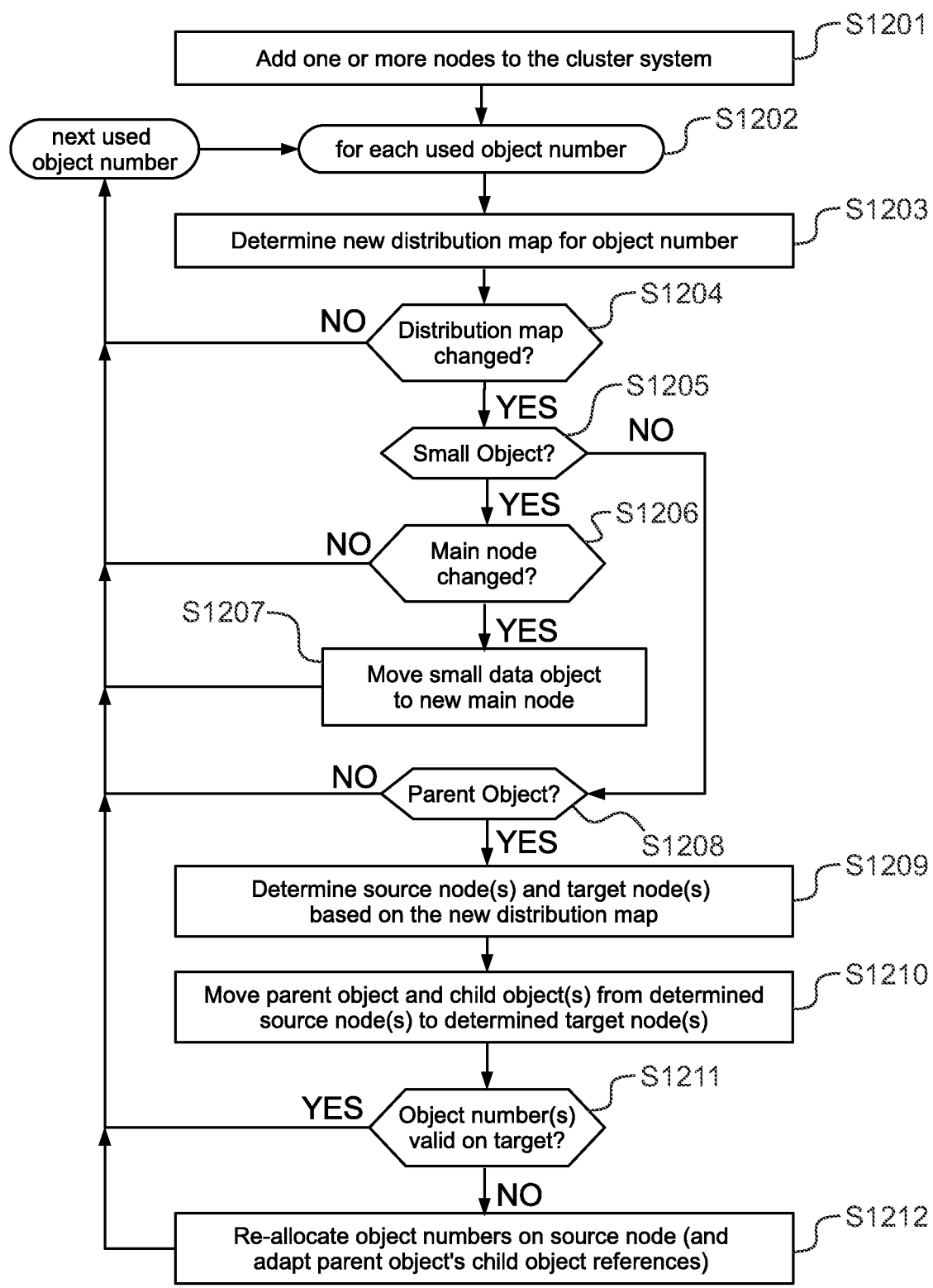
FIG. 12 exemplarily illustrates a flow chart of rebalancing processing upon adding one or more node apparatuses according to some exemplary embodiments.

FIG. 12 exemplarily illustrates a flow chart of rebalancing processing upon adding one or more node apparatuses according to some exemplary embodiments.

Exemplarily, in a cluster system there is added one or more node apparatuses to the cluster system in step S1201.

Then, in some exemplary embodiments, e.g. in addition to distributing newly created objects based on the newly increased number of node apparatuses, in some exemplary embodiments also some already created data objects can be re-distributed to rebalance the cluster system.

A similar process for re-distribution may also be realized in case of removal of one or more node apparatuses from the cluster. However, it is assumed that adding node apparatuses is a more frequent process since users may wish to extend storage capacities by adding further node apparatuses.

The process is exemplarily executed for each object number (or at least each used object number); step S1202.

In step S1203, for a certain (used) object number, the distribution map is determined based on the deterministic algorithm on the basis of the object number being used as input value and based on the new total number of node apparatuses, and it is determined by comparison of the new distribution map determined in step S1203 and the previously used distribution map for that particular object number, whether the distribution map has changed for that particular object number in step S1204.

If step S1204 returns NO (i.e. the distribution map has remained unchanged), the process continues with a next (used) object number and repeats the process from step S1202.

On the other hand, if the step S1204 returns YES (i.e. the distribution map has remained unchanged), it is checked in step S1205 whether the particular object number is allocated to a small data object.

If step S1205 returns YES, it is checked, e.g. based on a comparison of the previously used distribution map and the new distribution map, whether the main node apparatus responsible for that particular object number has changed in step S1206.

If step S1206 returns NO (i.e. the main node apparatus for that particular object number has remained unchanged, or, in other words, the first node apparatus of the distribution map has not changed), the process continues with a next (used) object number and repeats the process from step S1202.

The reason that the small data object does not need to be moved is that the data object only includes the first and only data segment stored on the main node apparatus, and, since the main node apparatus has not changed, the data object does not need to be moved. Only one or more later segments would need to be re-distributed but such segments do not exist in the small data object.

However, if step S1206 returns YES (i.e. the main node apparatus for that particular object number has changed), the process continues with step S1207 of moving the small data object to a new main node according to the new distribution map determined in step S1203. Since the new main node is responsible for the particular object number, the object number of the small data object can be kept and does not need to be re-allocated.

On the other hand, for large data objects and a changed distribution map (step S1205 returns NO, the step S1208 checks whether the object number is associated with a parent object of the large data object. If not (i.e. for child objects), the process continues with a next (used) object number and repeats the process from step S1202, since child objects will be handled together with parent objects.

If step S1208 returns YES, based on the new distribution map compared to the previously used distribution map, step S1209 determines one or plural source node apparatuses and one or plural target apparatuses and, in step S1210, the parent objects and child objects of the large data object on source node apparatus(es) are moved to target node apparatus(es) to reflect the changes of the distribution map.

Upon data movement, step S1211 checks whether the object numbers of the moved child objects are valid on the new location at the target apparatus(es). If not, the object numbers of child objects on the target node apparatus(es) are re-allocated and the parent object's child object references are adapted accordingly to enable finding locations of child objects after the movement thereof.

Then, and also if step S1211 gives YES, the process continues with a next (used) object number and repeats the process from step S1202 until all (used) object numbers have been assessed.

X. Data Movement for Load Balancing Purposes in Exemplary Embodiments

Figure 13:
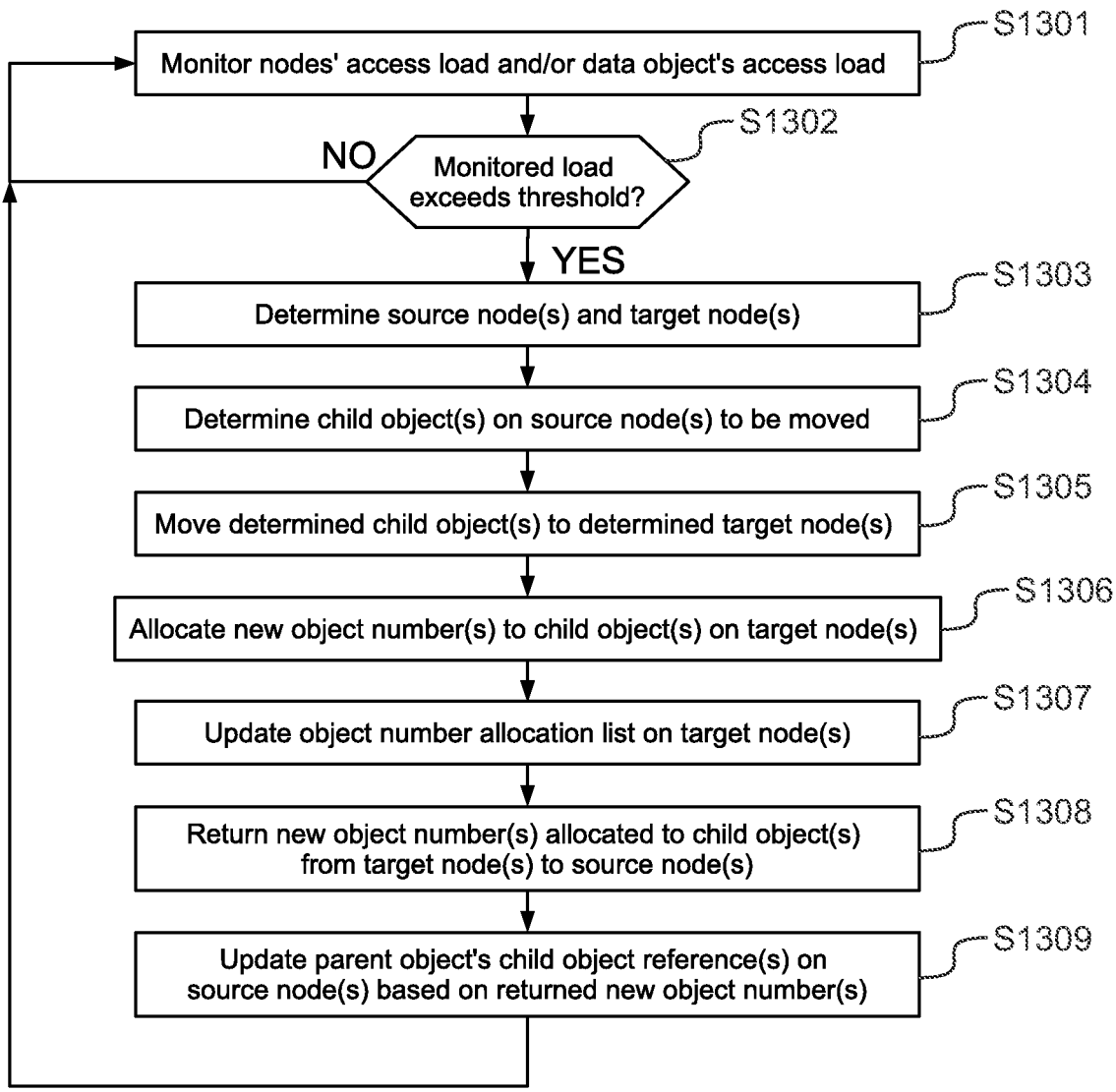
FIG. 13 exemplarily illustrates a flow chart of data object movement processing according to some exemplary embodiments.

FIG. 13 exemplarily illustrates a flow chart of data object movement processing according to some exemplary embodiments.

As mentioned above, while child objects (data segments) of large data objects of a size larger than the distribution size are initially distributed, together with a respective parent object or parts thereof, across the node apparatuses according to a deterministic algorithm (similar to a stateless approach) to determine an designated location thereof in the cluster system, exemplary embodiments are realized according to a hybrid approach which nevertheless efficiently and reliably allows to (exceptionally) redistribute data for load balancing purposes by data movement of child objects between node apparatuses.

FIG. 13 exemplarily illustrates a flow chart of data object movement processing according to some exemplary embodiments.

The access load is monitored per node apparatus and/or per data object, per parent object and/or per child object on the node apparatuses of the cluster system in step S1301, and in step S1302 it is determined whether the monitored load exceeds a threshold. Such threshold may be pre-determined or be dynamically determined, e.g. on a basis of an average load in the cluster system.

For example, if a number of I/O access requests per unit time in connection with objects on a certain node apparatus, in connection with a certain data object on a certain node apparatus, in connection with a certain parent object on a certain node apparatus, and/or in connection with a certain child object on a certain node apparatus exceeds a threshold, it is determined that the monitored load exceeds a threshold in step S1302.

If step S1302 returns NO, the process continues to monitor the load to the cluster system, to node apparatuses in the cluster system, to data object in the cluster system and/or to data objects on certain node apparatuses in the cluster system in step S1302.

On the other hand, if step S1302 returns YES, a data movement process will be executed. Such data movement process may be controlled by the node apparatus on which the access load is determined to exceed the threshold or the node apparatus on which it is determined that the access load to a data object on the node apparatus exceeds a threshold.

In step S1303, the data movement process determines one or more source node apparatuses in the cluster system and one or more target node apparatuses in the cluster system. For example, a target node apparatus may be determined as the node apparatus on which the access load is determined to exceed the threshold or the node apparatus on which it is determined that the access load to a data object on the node apparatus exceeds a threshold. A source node apparatus may be determined as a node apparatus which handles I/O access requests at a rate below the average load in the cluster system, or as a node apparatus which handles I/O access requests at a lowest rate in the cluster system.

Then, in step S1304, among child objects stored on the determined source node apparatus(es), one or more child objects to be moved to the determined target node apparatus(es) are determined. Such determination may be executed on a random basis, or on a basis of comparison of load access rates (I/O access requests per unit time) to data of the respective child objects stored on the determined target node apparatus(es), and/or randomly or on a basis of comparison of load access rates (I/O access requests per unit time) to data of the respective child objects of one or more selected parent objects stored on the determined target node apparatus(es) selected based on load access rates (I/O access requests per unit time) using metadata of the respective parent objects stored on the determined target node apparatus(es).

Once the one or more child objects to be moved to the one or more target node apparatuses are determined (selected) in step S1304, the child objects are moved to the one or more target node apparatuses in step S1305. This may include copying the data (blocks of data) of the determined child objects to the target node apparatuses and store the data to storage devices of the target node apparatus(es) and creating the according child object metadata nodes on the target node apparatus(es).

This includes allocating new object number(s) to the moved child object(s) on the target node apparatus(es) in step S1306, e.g. based again on selecting one or more non-used object numbers from the object number list stored on the respective target node apparatus so as to guarantee that the new location of the child object (on the target node apparatus) may be determined based on the deterministic algorithm on the basis of the newly allocated object number. The object number allocation lists on the one or more target node apparatus(es) are then updated to reflect that the newly allocated object number(s) is/are in use on the respective target node apparatus; step S1307.

In step S1308, each target node apparatus returns a confirmation message to the respective source node apparatus to confirm creation of the moved child object on the respective target node apparatus and to inform the source node apparatus about the newly allocated object number of the respective moved child object(s). The reason is that the parent object on the source node apparatus does not need to be moved but it is sufficient to update the parent object's reference (object pointer) to the moved child object(s) to reflect the new location on the target node apparatus in step S1309.

Then, if the source node apparatus receives a request to access the data segment of the moved child object from a receiving node that determined the data segment (child object) location on the basis of the deterministic algorithm, the source node apparatus references the parent object on the source node apparatus to determine the location of the child object and determines the new object number from the respective parent object's reference (object pointer) to the moved child object. On the basis of the new object number and the deterministic algorithm, the source node can determine the new location on the target node apparatus and forward the access request for the respective moved child object to the respective target node apparatus.

Accordingly, it is efficiently possible to move hot spot data, if required, and still access the moved child objects at a slightly increased number of inter-node hops, but due to the deterministic algorithm all of the non-moved child objects can still be accessed very efficiently at a low number of inter-node hops comparable to the stateless approach which, however, does not allow to move hot spot data.

As a consequence, the hybrid approach according to exemplary embodiments combines advantaged of stateless and stateful approaches discussed above.

XI. Processing I/O Access Requests in Exemplary Embodiments

XI.1 Processing Read Access Requests in Exemplary Embodiments

Figure 14A:
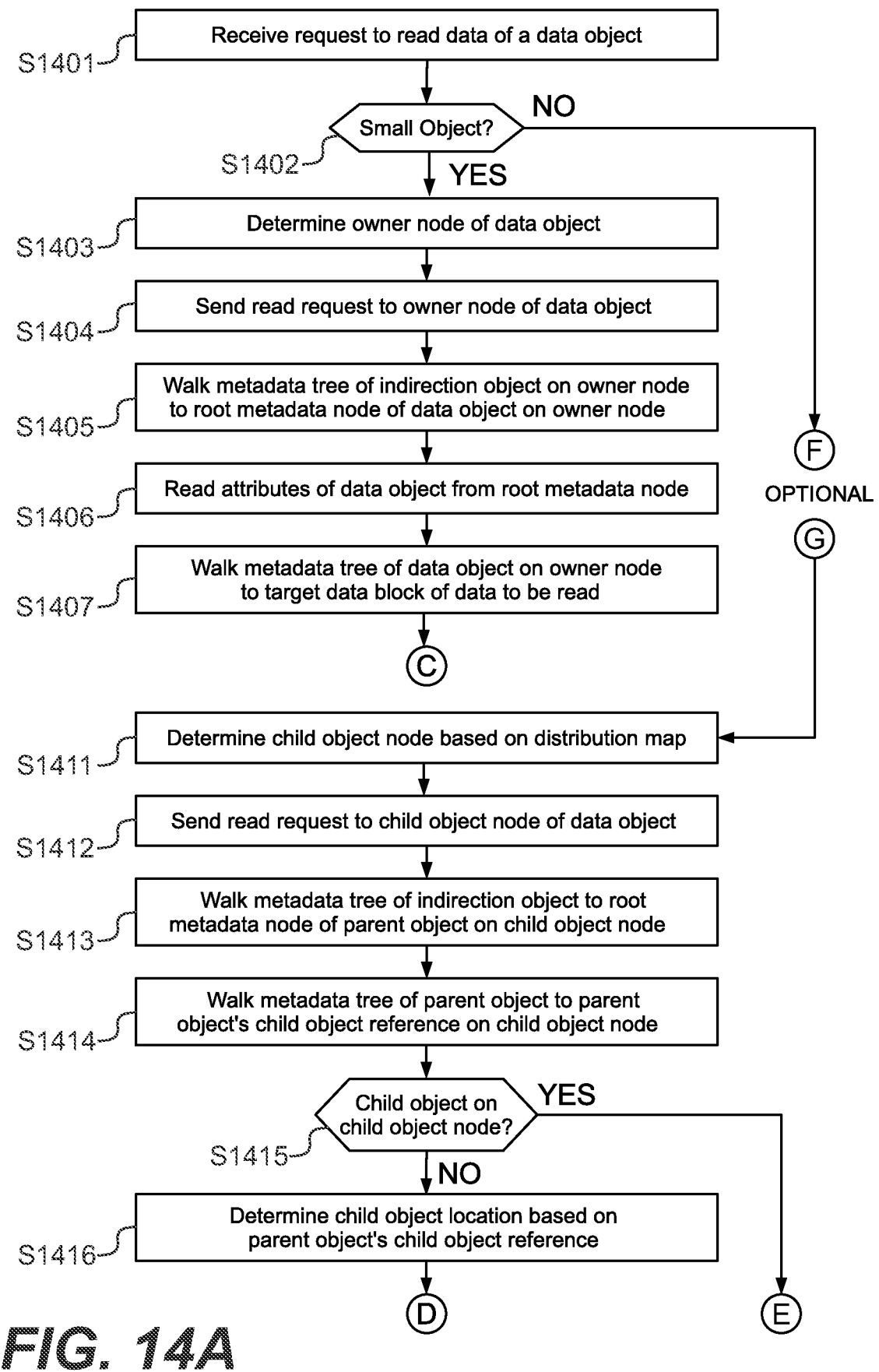
FIGS. 14A to 14C exemplarily illustrate flow charts of read request processing according to some exemplary embodiments.
Figure 14B:
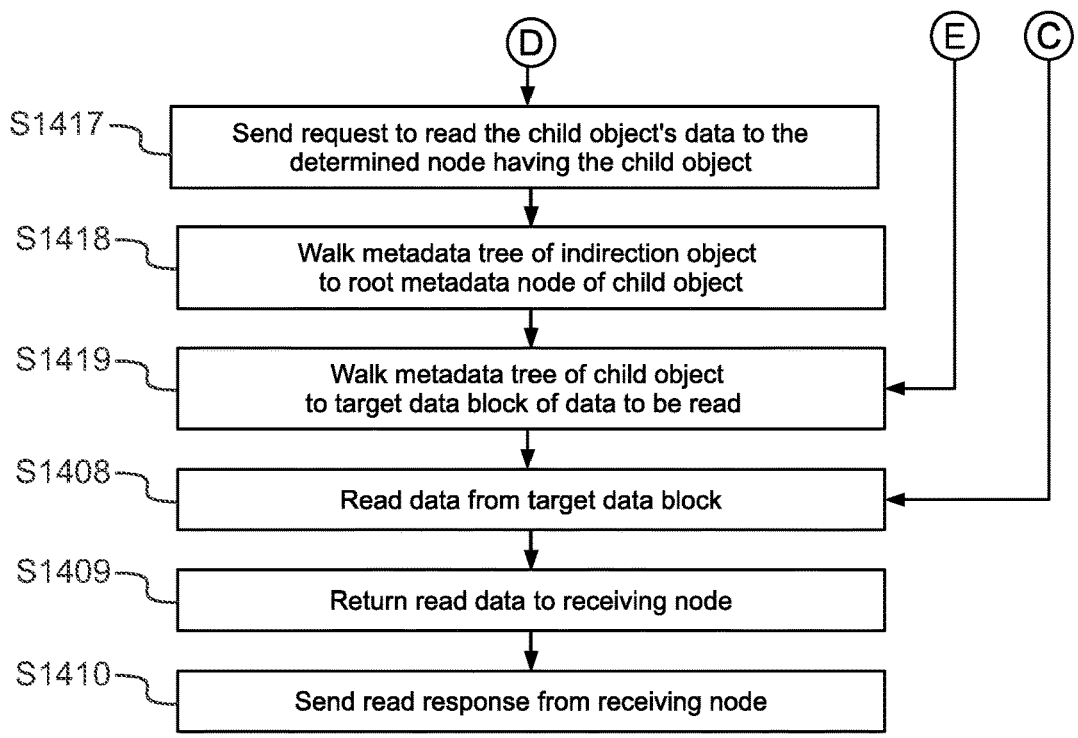
Figure 14C:
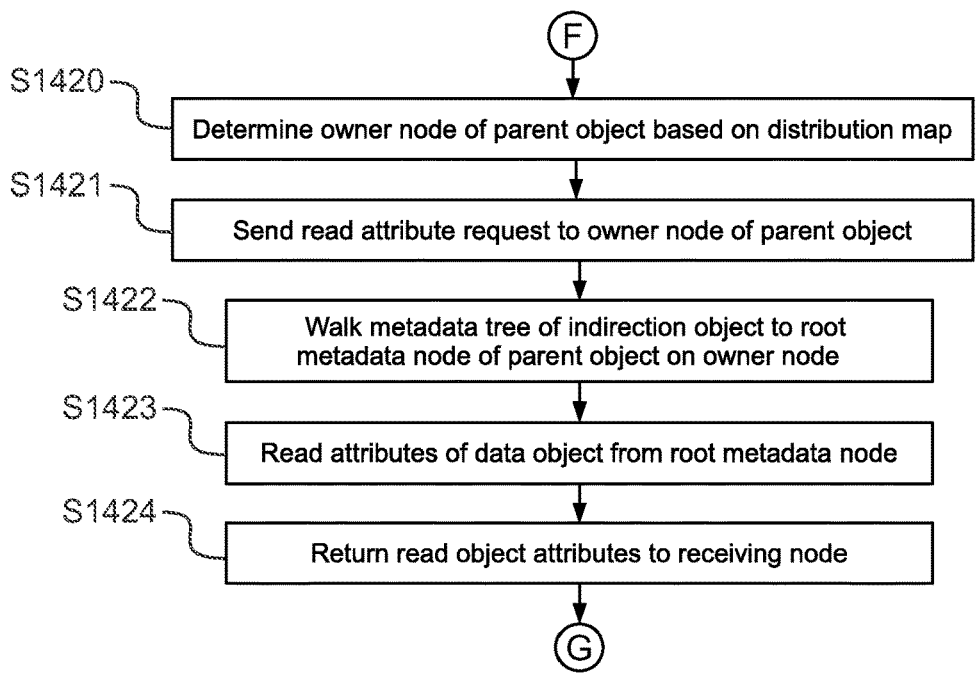

FIGS. 14A to 14C exemplarily illustrate flow charts of read request processing according to some exemplary embodiments.

In step S1401, a receiving node apparatus in the cluster system receives a read request to read data of a data object. Such request may be received at the scale-out layer from the interface/protocol layer on the basis of an object read request, file read request or block read request received from a client at the interface/protocol layer of the receiving node apparatus.

In step S1402, it is determined whether the data object to be accessed is a small data object.

If step S1402 returns YES, the receiving node apparatus (e.g. the scale-out layer thereof) determines the owner node apparatus of the data object in step S1403. Accordingly, based on a handle (or object number information, which may indicate or include an object number of the data object, and which may further optionally include or indicate an associated time stamp for object number verification purposes), the receiving node apparatus can determine the location of the small data object to be accessed by using the deterministic algorithm.

The owner node apparatus may be the main node apparatus indicated by the deterministic algorithm on the basis of the input value being the object number (object identifier) or an input value derived from the object number (object identifier). Also, the owner node apparatus may be the node apparatus indicated to store a first data segment for a data object having the respective object number based on the distribution map, which may be determined by the deterministic algorithm on the basis of the input value being the object number (object identifier) or an input value derived from the object number (object identifier).

Upon determining the owner node apparatus of the data object to be accessed, the receiving node apparatus sends the read request (or a corresponding read request) to read the requested data of the data object to the determined owner node apparatus in step S1404.

Upon receiving the request at the determined owner node apparatus, the object number of the data object to be accessed is used to walk a branch of the metadata tree structure of the indirection object on the owner node apparatus from the root metadata node of the indirection to the root metadata node of the data object to be accessed in step S1405, e.g. by reading the metadata root node of the indirection object and obtaining information of the pointer in the metadata root node of the indirection object relating to that object number to identify the next direct or indirect metadata node in the next tree level. Such pointed metadata node of the next tree level of the indirection object is then read to obtain a next pointer relating to that object number to identify the next direct or indirect metadata node in the next tree level. Such process is repeated until reading a direct metadata node of the indirection object of the branch relating to that object number to obtain a direct pointer of the indirection object pointing to the root metadata node of the data object to be accessed.

Upon reading the root metadata node of the data object to be accessed, the process may optionally obtain or read (and/or update) attribute information for the data object stored in or pointed to by the root metadata node of the data object to be accessed in step S1406.

Furthermore, an offset (as preferably indicated in the received read request) of the data to be read in the data object to be accessed is used to walk a branch of the metadata tree structure of the data object on the owner node apparatus from the root metadata node of the data to the direct metadata node of the data object to be accessed in step S1407, e.g. by reading the metadata root node of the data object and obtaining information of the pointer in the metadata root node of the data object relating to that offset to identify the next direct or indirect metadata node in the next tree level. Such pointed metadata node of the next tree level of the data object is then read to obtain a next pointer relating to that offset to identify the next direct or indirect metadata node in the next tree level. Such process is repeated until reading a direct metadata node of the data object of the branch relating to that offset to obtain a direct pointer of the data object pointing to the target data block(s) including the data to be read.

In the above, required metadata nodes may be read from storage devices of the node apparatus or may be obtained from cache memory, if available.

Upon identifying the target data block(s) including the data to be read, the process continues to read the target data from the target data block(s) from storage devices of the node apparatus in step S1408 and the read data is returned to the receiving node apparatus in step S1409.

Finally, in step S1410, the receiving node apparatus issues a read response including the data to be read, and such read response may be sent to the interface/protocol layer of the receiving node apparatus, and a respective object read response, file read response or block read response may be issued to the requesting client from the receiving node apparatus to the requesting client.

On the other hand, if step 1402 returns NO, i.e. if the read request is issued to data of one or more data segments of a large data object, the process continues with step S1411 (optionally further including steps S1420 to S1424 of FIG. 14C). The process will be exemplarily described as a handling of read request of one data segment of the large data object, but the process can analogously be additionally performed for additional data segments if multiple data segments shall be read (from the same child object storing node apparatus and/or from other child object storing node apparatuses).

Based on the data segment identifier (e.g. based on an offset of the target data segment in the large data object) the receiving node apparatus may use the distribution map, determined in accordance with the object number of the large data object, to determine the (designated) location of the target data segment (or the corresponding child object). Specifically, a node apparatus being designated to store the child object corresponding to the target data segment (child object node apparatus) is determined based on the associated distribution map determined based on the deterministic algorithm.

For example, if the read request is directed to the 3-th data segment of a large data object being associated with the object number relating to a distribution map (1,2,3), the $3^{rd}$ node apparatus in the cluster system may be determined as the child object node apparatus designated to store the respective child object of the target data segment.

Upon determining the child object node apparatus in step S1411, the receiving node apparatus sends the read request (or a corresponding read request) to read the requested data of the target data segment of the large data object to the determined child object node apparatus in step S1412.

Upon receiving the request at the determined child object node apparatus, the object number of the large data object to be accessed is used to walk a branch of the metadata tree structure of the indirection object on the child object node apparatus from the root metadata node of the indirection to the root metadata node of the parent object of the large data object to be accessed in step S1413, e.g. by reading the metadata root node of the indirection object and obtaining information of the pointer in the metadata root node of the indirection object relating to that object number to identify the next direct or indirect metadata node in the next tree level. Such pointed metadata node of the next tree level of the indirection object is then read to obtain a next pointer relating to that object number to identify the next direct or indirect metadata node in the next tree level. Such process is repeated until reading a direct metadata node of the indirection object of the branch relating to that object number to obtain a direct pointer of the indirection object pointing to the root metadata node of the parent object of the large data object to be accessed.

Based on a data segment identifier (e.g. an object offset, or a data segment number) included or indicated in the read request, such data segment identifier of the target data segment to be read in the data object to be accessed is used to walk a branch of the metadata tree structure of the parent object on the child object node apparatus from the root metadata node of the parent object to the direct metadata node of the parent object pointing to the child object to be accessed in step S1414, e.g. by reading the metadata root node of the parent object and obtaining information of the pointer in the metadata root node of the parent object relating to that data segment identifier to identify the next direct or indirect metadata node in the next tree level. Such pointed metadata node of the next tree level of the parent object is then read to obtain a next pointer relating to that data segment identifier to identify the next direct or indirect metadata node in the next tree level. Such process is repeated until reading a direct metadata node of the parent object of the branch relating to that data segment identifier to obtain a direct pointer of the parent object pointing to location information indicating the location of the target data segment or the child object thereof.

In exemplary embodiments, this may include location information indicating an object number of the respective child object relating to the target data segment. Then, the location of the child object can be determined based on the object number thereof and the deterministic algorithm.

In step S1415, it is checked whether the child object relating to the target data segment is stored on the same child object node apparatus.

If step S1415 returns NO, the new location of the child object (e.g. after movement thereof) is determined in step S1416 based on the deterministic algorithm and the information obtained from the parent object's child object reference (e.g. indicating an object number of the child object).

This may include a general step of determining a location of the child object based on the deterministic algorithm and the information obtained from the parent object's child object reference (e.g. indicating an object number of the child object), and determining whether the determined location is the current node apparatus (child node apparatus) or another node apparatus.

If the child object is in the meantime stored on another node apparatus determined in step S1416, the child object node apparatus sends the read request (or a corresponding read request) to read the requested data of the target data segment of the large data object to the determined other node apparatus in step S1417.

Upon receiving the request at the determined other node apparatus, the object number of the child object to be accessed is used to walk a branch of the metadata tree structure of the indirection object on the other node apparatus from the root metadata node of the indirection to the root metadata node of the child object of the child object to be accessed in step S1418, e.g. by reading the metadata root node of the indirection object and obtaining information of the pointer in the metadata root node of the indirection object relating to that object number to identify the next direct or indirect metadata node in the next tree level. Such pointed metadata node of the next tree level of the indirection object is then read to obtain a next pointer relating to that object number to identify the next direct or indirect metadata node in the next tree level. Such process is repeated until reading a direct metadata node of the indirection object of the branch relating to that object number to obtain a direct pointer of the indirection object pointing to the root metadata node of the child object of the large data object to be accessed.

On the other hand, if the child object is determined to be stored on the same child node apparatus, the process may continue with step S1418 on the child node apparatus after step S1415. Still further if the parent object node directly points to the child object, the step S1418 may be skipped on the child object node apparatus.

In any case, the process continues with step S1419, either on the other node apparatus or the child node apparatus and specifically on the determined node apparatus having the child object.

A data offset (as preferably indicated in the received read request) of the child object to be read in the data object to be accessed is used to walk a branch of the metadata tree structure of the child object on the node apparatus from the root metadata node of the child object to the direct metadata node of the child object to be accessed in step S1419, e.g. by reading the metadata root node of the child object and obtaining information of the pointer in the metadata root node of the child object relating to that offset to identify the next direct or indirect metadata node in the next tree level. Such pointed metadata node of the next tree level of the child object is then read to obtain a next pointer relating to that offset to identify the next direct or indirect metadata node in the next tree level. Such process is repeated until reading a direct metadata node of the child object of the branch relating to that offset to obtain a direct pointer of the data object pointing to the target data block(s) including the data to be read.

In the above, required metadata nodes may be read from storage devices of the node apparatus or may be obtained from cache memory, if available.

Upon identifying the target data block(s) including the data to be read, the process continues to read the target data from the target data block(s) from storage devices of the node apparatus in step S1408 and the read data is returned to the receiving node apparatus (either from the child node apparatus, or from the other node apparatus directly or indirectly through the child node apparatus) in step S1409.

Finally, in step S1410, the receiving node apparatus issues a read response including the data to be read, and such read response may be sent to the interface/protocol layer of the receiving node apparatus, and a respective object read response, file read response or block read response may be issued to the requesting client from the receiving node apparatus to the requesting client.

As previously mentioned, the process may optionally further include the steps S1420 to S1424 when attributes of the large data object may need to be read and/or updated.

Then, the process may additionally determine the owner node apparatus of the large data object in step S1420 based on the distribution map. The owner node apparatus of the large data object may be the node apparatus storing the first data segment of the large data object according to the distribution map.

In step S1421, the receiving node apparatus sends an attribute read (and/or update) request to the determined owner node apparatus, which walks the indirection object on the owner node apparatus to the parent object's root metadata node in step S1422 (similar to step S1413 above) to read (and/or update) the attribute information of the large data object pointed to by or stored in the parent object on the owner node apparatus in step S1423. The read attribute information (and/or a confirmation of the updating thereof) is send back to the receiving node apparatus in step S1424.

XI.2 Processing Write Access Requests in Exemplary Embodiments

XI.2.1 Processing Write Access Requests in Exemplary Embodiments

Figure 15:
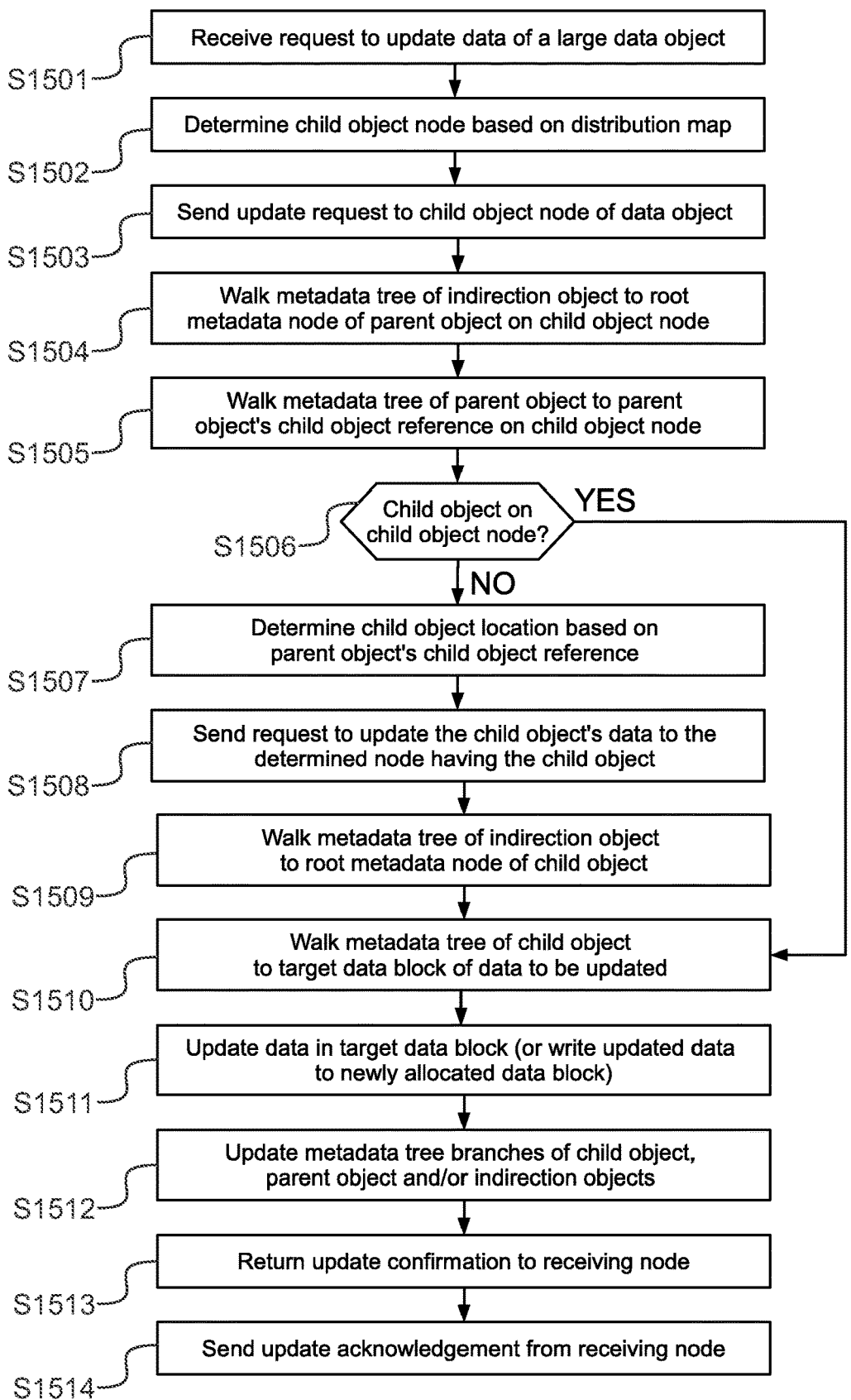
FIG. 15 exemplarily illustrates a flow chart of update write request processing according to some exemplary embodiments.

FIG. 15 exemplarily illustrates a flow chart of update write request processing according to some exemplary embodiments.

Exemplarily, this relates to modifying data in a data block of a child object of a large data object, or writing a new data block of a child object of a large data object into a new location on storage devices to replace data in another data block (write log method). Modifying data of small data objects may be executed basically in a same way (basically analogously to steps S1501, S1502, S1503, and S1509 to S1514, for the small data object instead of the child data object).

In step S1501, the receiving node apparatus receives the request to update (modify) data of a data segment of a large data object, and the receiving node apparatus determines the designated location of the respective child object, i.e. the designated child object node apparatus designated to store the child object, based on the distribution map associated with an object number of the large data object, e.g. based on a handle or object number information indicated in the received request in step S1502.

Here, the distribution map may be determined according to the deterministic algorithm.

Then, the receiving node apparatus sends the request (or a corresponding request) to update (modify) data of the target data segment of the large data object to the determined/identified child object node apparatus in step S1503.

Upon receiving the request at the determined child object node apparatus, the object number of the large data object to be accessed is used to walk a branch of the metadata tree structure of the indirection object on the child object node apparatus from the root metadata node of the indirection to the root metadata node of the parent object of the large data object to be accessed in step S1504, e.g. by reading the metadata root node of the indirection object and obtaining information of the pointer in the metadata root node of the indirection object relating to that object number to identify the next direct or indirect metadata node in the next tree level. Such pointed metadata node of the next tree level of the indirection object is then read to obtain a next pointer relating to that object number to identify the next direct or indirect metadata node in the next tree level. Such process is repeated until reading a direct metadata node of the indirection object of the branch relating to that object number to obtain a direct pointer of the indirection object pointing to the root metadata node of the parent object of the large data object to be accessed.

Based on a data segment identifier (e.g. an object offset, or a data segment number) included or indicated in the write request, such data segment identifier of the target data segment to be updated in the data object to be accessed is used to walk a branch of the metadata tree structure of the parent object on the child object node apparatus from the root metadata node of the parent object to the direct metadata node of the parent object pointing to the child object to be accessed in step S1505, e.g. by reading the metadata root node of the parent object and obtaining information of the pointer in the metadata root node of the parent object relating to that data segment identifier to identify the next direct or indirect metadata node in the next tree level. Such pointed metadata node of the next tree level of the parent object is then read to obtain a next pointer relating to that data segment identifier to identify the next direct or indirect metadata node in the next tree level. Such process is repeated until reading a direct metadata node of the parent object of the branch relating to that data segment identifier to obtain a direct pointer of the parent object pointing to location information indicating the location of the target data segment or the child object thereof.

In exemplary embodiments, this may include location information indicating an object number of the respective child object relating to the target data segment. Then, the location of the child object can be determined based on the object number thereof and the deterministic algorithm.

In step S1506, it is checked whether the child object relating to the target data segment is stored on the same child object node apparatus.

If step S1506 returns NO, the new location of the child object (e.g. after movement thereof) is determined in step S1507 based on the deterministic algorithm and the information obtained from the parent object's child object reference (e.g. indicating an object number of the child object).

This may include a general step of determining a location of the child object based on the deterministic algorithm and the information obtained from the parent object's child object reference (e.g. indicating an object number of the child object), and determining whether the determined location is the current node apparatus (child node apparatus) or another node apparatus.

If the child object is in the meantime stored on another node apparatus determined in step S1506, the child object node apparatus sends the read request (or a corresponding read request) to read the requested data of the target data segment of the large data object to the determined other node apparatus in step S1508.

Upon receiving the request at the determined other node apparatus, the object number of the child object to be accessed is used to walk a branch of the metadata tree structure of the indirection object on the other node apparatus from the root metadata node of the indirection to the root metadata node of the child object of the child object to be accessed in step S1509, e.g. by reading the metadata root node of the indirection object and obtaining information of the pointer in the metadata root node of the indirection object relating to that object number to identify the next direct or indirect metadata node in the next tree level. Such pointed metadata node of the next tree level of the indirection object is then read to obtain a next pointer relating to that object number to identify the next direct or indirect metadata node in the next tree level. Such process is repeated until reading a direct metadata node of the indirection object of the branch relating to that object number to obtain a direct pointer of the indirection object pointing to the root metadata node of the child object of the large data object to be accessed.

On the other hand, if the child object is determined to be stored on the same child node apparatus, the process may continue with step S1509 on the child node apparatus after step S1506. Still further if the parent object node directly points to the child object, the step S1509 may be skipped on the child object node apparatus.

In any case, the process continues with step S1510, either on the other node apparatus or the child node apparatus and specifically on the determined node apparatus having the child object.

A data offset (as preferably indicated in the received write request) of the child object to be updated in the data object to be accessed is used to walk a branch of the metadata tree structure of the child object on the node apparatus from the root metadata node of the child object to the direct metadata node of the child object to be accessed in step S1510, e.g. by reading the metadata root node of the child object and obtaining information of the pointer in the metadata root node of the child object relating to that offset to identify the next direct or indirect metadata node in the next tree level. Such pointed metadata node of the next tree level of the child object is then read to obtain a next pointer relating to that offset to identify the next direct or indirect metadata node in the next tree level. Such process is repeated until reading a direct metadata node of the child object of the branch relating to that offset to obtain a direct pointer of the data object pointing to the target data block(s) including the data to be read.

In the above, required metadata nodes may be read from storage devices of the node apparatus or may be obtained from cache memory, if available.

Upon identifying the target data block(s) including the data to be updated/modified, the process continues to update the target data of the target data block(s) in storage devices of the node apparatus in step S1511 (or alternatively the modified data is written to newly allocated data blocks to be then referred to by an updated direct metadata node of the child object), and the metadata tree structure of the child object on the node apparatus is updated accordingly in step S1512. Then, the write acknowledgement (update confirmation) is returned to the receiving node apparatus (either from the child node apparatus, or from the other node apparatus directly or indirectly through the child node apparatus) in step S1513.

Finally, in step S1514, the receiving node apparatus issues a write response including the write acknowledgement, and such write response may be sent to the interface/protocol layer of the receiving node apparatus, and a respective object write response, file write response or block write response may be issued to the requesting client from the receiving node apparatus to the requesting client.

Also, the process may optionally further include the steps similar to S1420 to S1424 when attributes of the large data object may need to be updated.

Then, the process may additionally determine the owner node apparatus of the large data object based on the distribution map. The owner node apparatus of the large data object may be the node apparatus storing the first data segment of the large data object according to the distribution map.

The receiving node apparatus may send an attribute update request to the determined owner node apparatus, which walks the indirection object on the owner node apparatus to the parent object's root metadata node to update the attribute information of the large data object pointed to by, or stored in, the parent object on the owner node apparatus. The confirmation of the updating of the attribute information may then be sent back to the receiving node apparatus.

XI.2.2 Processing Append Write Access Requests in Exemplary Embodiments

Figure 16A:
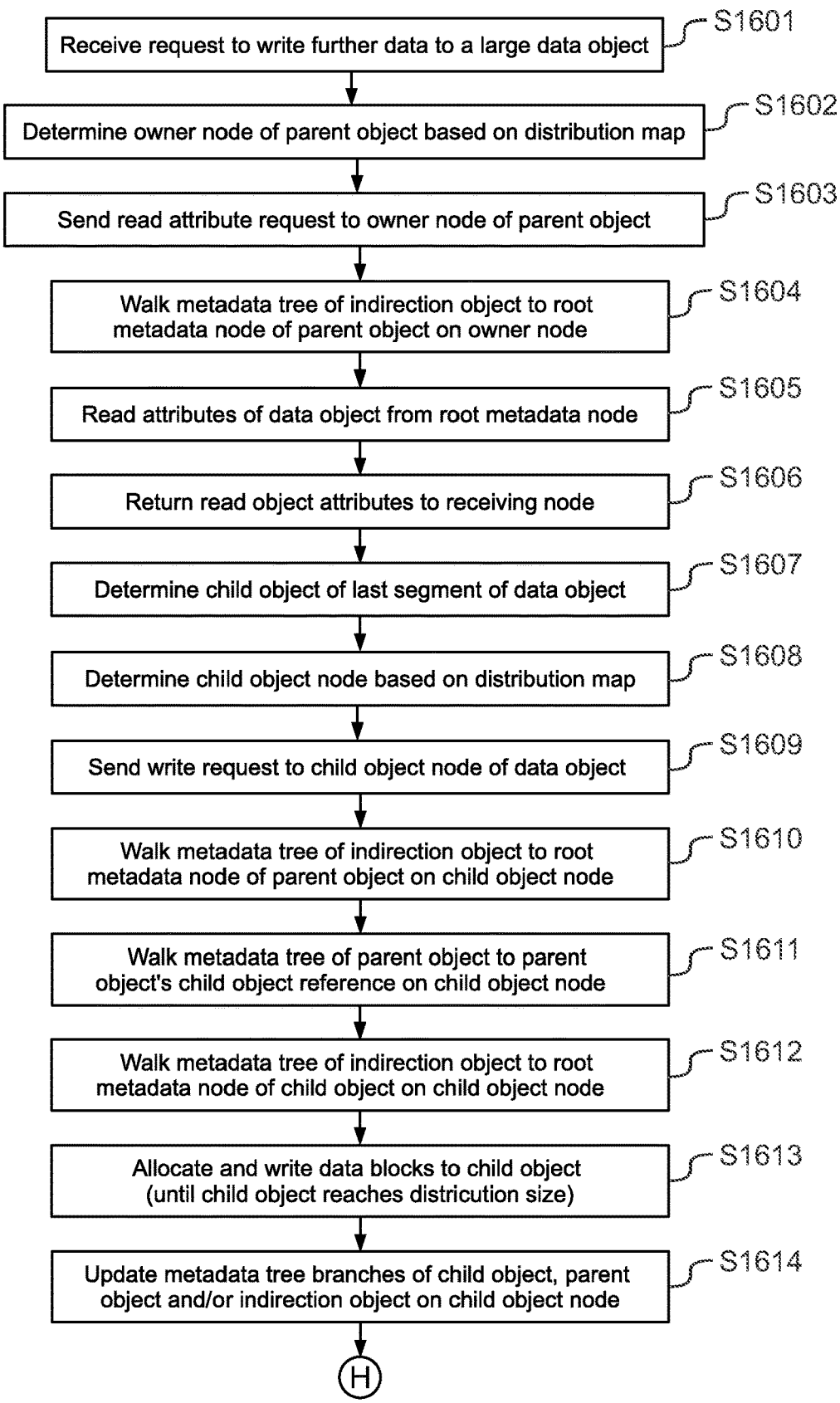
FIGS. 16A to 16B exemplarily illustrate flow charts of append write request processing according to some exemplary embodiments.
Figure 16B:
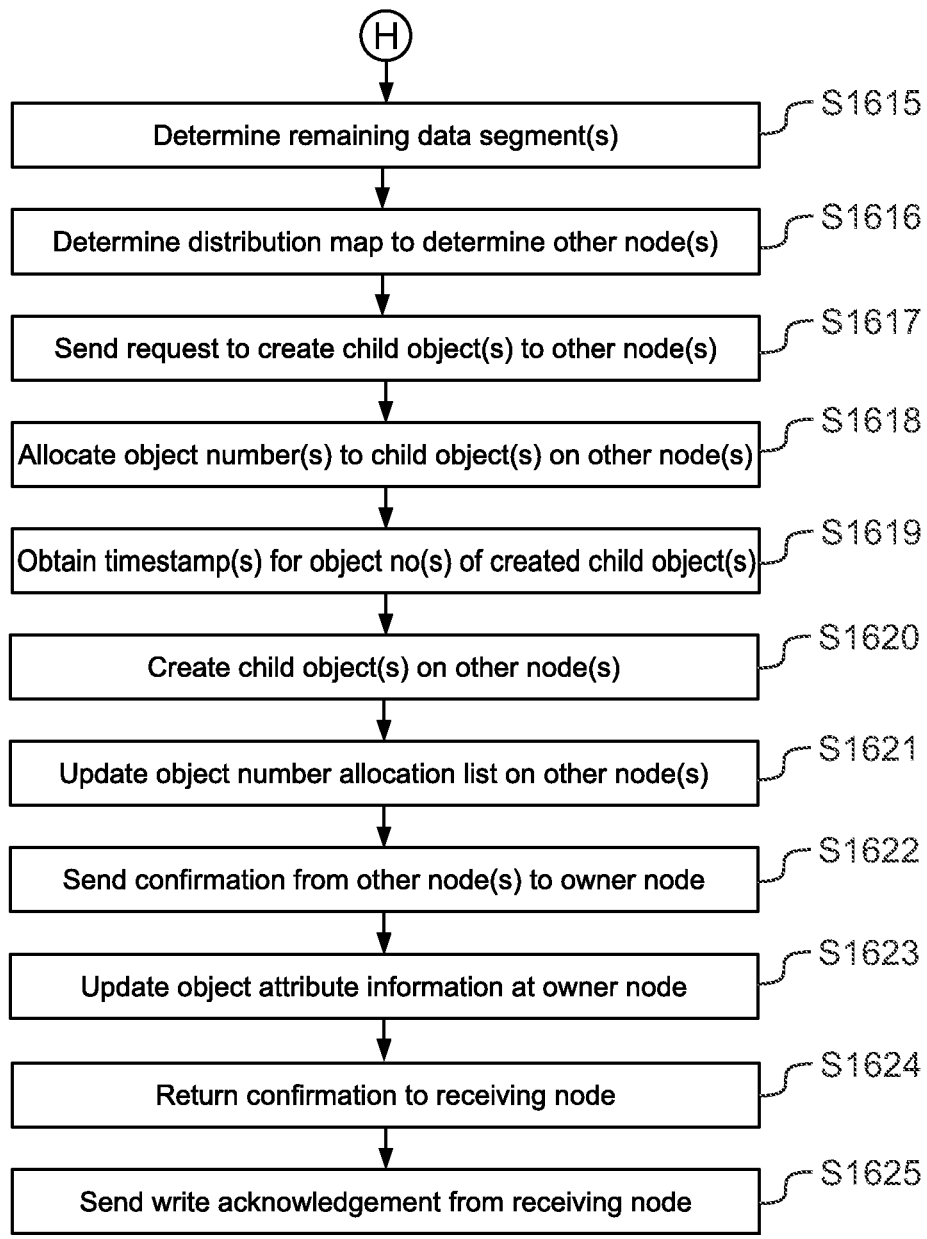

FIGS. 16A to 16B exemplarily illustrate flow charts of append write request processing according to some exemplary embodiments.

In step S1601, the receiving node apparatus receives the request to write (append) further (additional) data to a large data object (increasing the size of the large data object).

Then, the receiving node apparatus determines the owner node apparatus of the large data object (i.e. a node apparatus designated to store a first segment of the data object) based on the distribution map associated with an object number of the large data object, e.g. based on a handle or object number information indicated in the received request in step S1602. Here, the distribution map may be determined according to the deterministic algorithm.

Then, the receiving node apparatus may send an attribute read request to the determined owner node apparatus in step S1603, and the owner node apparatus, upon receiving the attribute read request, walks the indirection object on the owner node apparatus to the parent object's root metadata node in step S1604 to read the attribute information of the large data object pointed to by or stored in the parent object on the owner node apparatus. The attribute information (or only information on a length or size of the large data object, or a number of then last data segment of the large data segment) is then be sent back to the receiving node apparatus in step S1606.

Based on the received attribute information, the receiving node apparatus determines a last data segment of the large data object and/or a child object thereof in step S1607, and in step S1608 the receiving node apparatus determines the child node apparatus of the determined child object relating to the determined last data segment (i.e. a node apparatus designated to store a last segment of the data object) based on the distribution map. Here, the distribution map may be determined according to the deterministic algorithm.

Then, the receiving node apparatus sends the request (or a corresponding request) to write data to the child object of the last data segment of the large data object to the determined/identified child object node apparatus in step S1609.

Upon receiving the request at the determined child object node apparatus, the object number of the large data object to be accessed is used to walk a branch of the metadata tree structure of the indirection object on the child object node apparatus from the root metadata node of the indirection to the root metadata node of the parent object of the large data object to be accessed in step S1610, e.g. by reading the metadata root node of the indirection object and obtaining information of the pointer in the metadata root node of the indirection object relating to that object number to identify the next direct or indirect metadata node in the next tree level. Such pointed metadata node of the next tree level of the indirection object is then read to obtain a next pointer relating to that object number to identify the next direct or indirect metadata node in the next tree level. Such process is repeated until reading a direct metadata node of the indirection object of the branch relating to that object number to obtain a direct pointer of the indirection object pointing to the root metadata node of the parent object of the large data object to be accessed.

Based on a data segment identifier (e.g. an object offset, or a data segment number) included or indicated in the write request, such data segment identifier of the target data segment to be updated in the data object to be accessed is used to walk a branch of the metadata tree structure of the parent object on the child object node apparatus from the root metadata node of the parent object to the direct metadata node of the parent object pointing to the child object to be accessed in step S1611, e.g. by reading the metadata root node of the parent object and obtaining information of the pointer in the metadata root node of the parent object relating to that data segment identifier to identify the next direct or indirect metadata node in the next tree level. Such pointed metadata node of the next tree level of the parent object is then read to obtain a next pointer relating to that data segment identifier to identify the next direct or indirect metadata node in the next tree level. Such process is repeated until reading a direct metadata node of the parent object of the branch relating to that data segment identifier to obtain a direct pointer of the parent object pointing to location information indicating the location of the target data segment or the child object thereof.

In exemplary embodiments, this may include location information indicating an object number of the respective child object relating to the target data segment. Then, the location of the child object can be determined based on the object number thereof and the deterministic algorithm.

Also here, it may be checked whether the child object relating to the target data segment is stored on the same child object node apparatus. If not, the new location of the child object (e.g. after movement thereof) may be determined based on the deterministic algorithm and the information obtained from the parent object's child object reference (e.g. indicating an object number of the child object). This may include a general step of determining a location of the child object based on the deterministic algorithm and the information obtained from the parent object's child object reference (e.g. indicating an object number of the child object), and determining whether the determined location is the current node apparatus (child node apparatus) or another node apparatus. If the child object is in the meantime stored on another node apparatus, the child object node apparatus sends the write request (or a corresponding read request) to write append the last data segment of the large data object to the determined other node apparatus, and the following process would be continued on the other node apparatus.

Typically on the child object node apparatus (or another node apparatus storing the child object after movement thereof), the object number of the child object to be accessed is used to walk a branch of the metadata tree structure of the indirection object from the root metadata node of the indirection to the root metadata node of the child object to be accessed in step S1612, e.g. by reading the metadata root node of the indirection object and obtaining information of the pointer in the metadata root node of the indirection object relating to that object number to identify the next direct or indirect metadata node in the next tree level. Such pointed metadata node of the next tree level of the indirection object is then read to obtain a next pointer relating to that object number to identify the next direct or indirect metadata nodes in the next tree level. Such process is repeated until reading one or more direct metadata node of the indirection object of the branch relating to that object number to obtain a direct pointer of the indirection object pointing to the root metadata node of the child object of the large data object to be accessed.

Then, upon finding the root metadata node of the child object, the length (size) of the child object is determined based on metadata in the root metadata node of the child object, to determine the available non-written (empty) data blocks in case the child object size of the last data segment is smaller than the distribution size and additional data can still be written to the child object. Accordingly, the process allocates new data blocks for the child object and writes data to the child object in step S1613 until the size of the child object is equal to the distribution size or all data is written.

The metadata tree structure of the child object and also optionally of the indirection object is updated accordingly in step S1614, e.g. by modifying and/or writing new metadata nodes in the child object and/or the indirection object.

Assuming that the data could not be fully written to the child object before the child object reached the distribution size as a maximum size of child objects, one or more additional data segments of the large data object may need to be written. Otherwise the method could continue with step S1622/S1623.

However, if additional data needs to be written, the remaining data to be written to the large data object is divided into one or more data segments of the distribution size to determine the remaining data segments to be written in step S1615. Based on the distribution map (or determining the distribution map) for the large data object, the locations (node apparatuses) for writing the respective additional data segment(s) are determined in step S1616. This determines the one or more other node apparatuses on which new data segments may need to be written and new child objects may therefore be created. This may additionally include creation of parent objects, if not yet created on these other node apparatuses.

If parent objects are already created on the determined other node apparatus(es), the method continues to send respective requests to create respective child objects on the determined other node apparatus(es) in step S1617. Such requests may be sent from the child object node apparatus storing the previous last data segment of the large data object after writing to the last data segment and reaching the distribution size, or it may be requested directly by the receiving node apparatus or by the owner node apparatus.

On the other node apparatus(es), upon receiving the request to create the respective child object(s), the child objects are created as requested. For example, the other node apparatus(es) may continue to allocate object number(s) to the one or more child objects to be stored on the other node apparatus(es) in step S1618.

Again, each of the other node apparatus(es) may refer to their own respective object number list stored on the other node apparatus(es) indicating free (non-used) object numbers associated with the other node apparatus(es). The other node apparatus(es) may select free object number(s) from the object number list(s) stored on the other node apparatus(es) and allocate the selected object number(s) to each child object to be created on the respective other node apparatus.

Furthermore, upon allocating the object number(s) to the child object(s), the other node apparatus(es) optionally obtains respective time stamp(s) associated with the allocated object number(s) for child object(s) in step S1619. This may again serve in a process of object number validation to ensure that object numbers may be re-allocated or re-used after an object previously using the same object number has been deleted.

In step S1620, one or more new child object(s) of the large data object is/are created on each of the other node apparatus(es) and the allocated object numbers thereof may be stored to the root metadata node of the respective child object(s).

Also, the object number list(s) stored on the other node apparatus(es) is updated in step S1621 to reflect that the respective object numbers of the one or more child objects are now in use on the other node apparatus(es). The object number of the parent object may also be indicated to be in use, however this is optional since the other node will not need to allocate the object number of the parent object which is actually associated with the owner node apparatus.

In step S1622, each of the other node apparatus(es) sends a confirmation response to the owner node apparatus and/or the receiving node apparatus to confirm creation of the respective child object(s) so that the owner node apparatus and/or the receiving node apparatus can verify that all child objects for all newly written data segments of the large data object to be created are stored on the intended node apparatuses according to the corresponding distribution map. Then, the additional data is fully written to the large data object, and also the newly written data segments thereof are distributed across the node apparatus(es).

On the owner node apparatus, object attribute information of the large data object is updated (similar to the attribute update processing discussed above), at least to indicate the increased new length/size of the large data object after write (append) data thereto, in step S1623.

Then, the process continues with step S1624 of sending a confirmation of the data write from the owner node apparatus (and/or from the other node apparatuses) to the receiving node apparatus.

In step S1625, the receiving node apparatus issues a write response (e.g. to the interface/protocol layer, or to the requesting client) to acknowledge and confirm the instructed data write.

As will be appreciated by one of skill in the art, the present invention and aspects and exemplary embodiments, as described hereinabove and in connection with the accompanying figures, may be embodied as a method (e.g., a computer-implemented process, a business process, or any other process), apparatus (including a device, machine, system, computer program product, and/or any other apparatus), or a combination of the foregoing.

Accordingly, exemplary embodiments of the present invention may take the form of an entirely hardware embodiment, an entirely software embodiment (including firmware, resident software, micro-code, etc.), or an embodiment combining software and hardware aspects that may generally be referred to herein as a "system" Furthermore, embodiments of the present invention may take the form of a computer program product on a computer-readable medium having computer-executable program code embodied in the medium.

It should be noted that arrows may be used in drawings to represent communication, transfer, or other activity involving two or more entities. Double-ended arrows generally indicate that activity may occur in both directions (e.g., a command/request in one direction with a corresponding reply back in the other direction, or peer-to-peer communications initiated by either entity), although in some situations, activity may not necessarily occur in both directions.

Single-ended arrows generally indicate activity exclusively or predominantly in one direction, although it should be noted that, in certain situations, such directional activity actually may involve activities in both directions (e.g., a message from a sender to a receiver and an acknowledgement back from the receiver to the sender, or establishment of a connection prior to a transfer and termination of the connection following the transfer). Thus, the type of arrow used in a particular drawing to represent a particular activity is exemplary and should not be seen as limiting.

Embodiments of the present invention are described hereinabove with reference to flowchart illustrations and/or block diagrams of methods and apparatuses, and with reference to a number of sample views of a graphical user interface generated by the methods and/or apparatuses. It will be understood that each block of the flowchart illustrations and/or block diagrams, and/or combinations of blocks in the flowchart illustrations and/or block diagrams, as well as the graphical user interface, can be implemented by computer-executable program code.

The computer-executable program code may be provided to a processor of a general purpose computer, special purpose computer, or other programmable data processing apparatus to produce a particular machine, such that the program code, which executes via the processor of the computer or other programmable data processing apparatus, generate means for implementing the functions/acts/outputs specified in the flowchart, block diagram block or blocks, figures, and/or written description.

These computer-executable program code may also be stored in a computer-readable memory that can direct a computer or other programmable data processing apparatus to function in a particular manner, such that the program code stored in the computer readable memory produce an article of manufacture including instruction means which implement the function/act/output specified in the flowchart, block diagram block(s), figures, and/or written description.

The computer-executable program code may also be loaded onto a computer or other programmable data processing apparatus to cause a series of operational steps to be performed on the computer or other programmable apparatus to produce a computer-implemented process such that the program code which executes on the computer or other programmable apparatus provides steps for implementing the functions/acts/outputs specified in the flowchart, block diagram block(s), figures, and/or written description. Alternatively, computer program implemented steps or acts may be combined with operator or human implemented steps or acts in order to carry out an embodiment of the invention.

It should be noted that terms such as "server" and "processor" may be used herein to describe devices that may be used in certain embodiments of the present invention and should not be construed to limit the present invention to any particular device type unless the context otherwise requires. Thus, a device may include, without limitation, a bridge, router, bridge-router (brouter), switch, node, server, computer, appliance, or other type of device. Such devices typically include one or more network interfaces for communicating over a communication network and a processor (e.g., a microprocessor with memory and other peripherals and/or application-specific hardware) configured accordingly to perform device functions.

Communication networks generally may include public and/or private networks; may include local-area, wide-area, metropolitan-area, storage, and/or other types of networks; and may employ communication technologies including, but in no way limited to, analog technologies, digital technologies, optical technologies, wireless technologies (e.g., Bluetooth), networking technologies, and internetworking technologies.

It should also be noted that devices may use communication protocols and messages (e.g., messages generated, transmitted, received, stored, and/or processed by the device), and such messages may be conveyed by a communication network or medium.

Unless the context otherwise requires, the present invention should not be construed as being limited to any particular communication message type, communication message format, or communication protocol. Thus, a communication message generally may include, without limitation, a frame, packet, datagram, user datagram, cell, or other type of communication message.

Unless the context requires otherwise, references to specific communication protocols are exemplary, and it should be understood that alternative embodiments may, as appropriate, employ variations of such communication protocols (e.g., modifications or extensions of the protocol that may be made from time-to-time) or other protocols either known or developed in the future.

It should also be noted that logic flows may be described herein to demonstrate various aspects of the invention, and should not be construed to limit the present invention to any particular logic flow or logic implementation. The described logic may be partitioned into different logic blocks (e.g., programs, modules, functions, or subroutines) without changing the overall results or otherwise departing from the true scope of the invention.

Often times, logic elements may be added, modified, omitted, performed in a different order, or implemented using different logic constructs (e.g., logic gates, looping primitives, conditional logic, and other logic constructs) without changing the overall results or otherwise departing from the true scope of the invention.

The present invention may be embodied in many different forms, including, but in no way limited to, computer program logic for use with a processor (e.g., a microprocessor, microcontroller, digital signal processor, or general purpose computer), programmable logic for use with a programmable logic device (e.g., a Field Programmable Gate Array (FPGA) or other PLD), discrete components, integrated circuitry (e.g., an Application Specific Integrated Circuit (ASIC)), or any other means including any combination thereof. Computer program logic implementing some or all of the described functionality is typically implemented as a set of computer program instructions that is converted into a computer executable form, stored as such in a computer readable medium, and executed by a microprocessor under the control of an operating system. Hardware-based logic implementing some or all of the described functionality may be implemented using one or more appropriately configured FPGAs.

Computer program logic implementing all or part of the functionality previously described herein may be embodied in various forms, including, but in no way limited to, a source code form, a computer executable form, and various intermediate forms (e.g., forms generated by an assembler, compiler, linker, or locator).

Source code may include a series of computer program instructions implemented in any of various programming languages (e.g., an object code, an assembly language, or a high-level language such as Fortran, C, C++, JAVA, or HTML) for use with various operating systems or operating environments. The source code may define and use various data structures and communication messages. The source code may be in a computer executable form (e.g., via an interpreter), or the source code maybe converted (e.g., via a translator, assembler, or compiler) into a computer executable form.

Computer-executable program code for carrying out operations of embodiments of the present invention may be written in an object oriented, scripted or unscripted programming language such as Java, Perl, Smalltalk, C++, or the like. However, the computer program code for carrying out operations of embodiments of the present invention may also be written in conventional procedural programming languages, such as the "C" programming language or similar programming languages.

Computer program logic implementing all or part of the functionality previously described herein may be executed at different times on a single processor (e.g., concurrently) or may be executed at the same or different times on multiple processors and may run under a single operating system process/thread or under different operating system processes/threads.

Thus, the term "computer process" refers generally to the execution of a set of computer program instructions regardless of whether different computer processes are executed on the same or different processors and regardless of whether different computer processes run under the same operating system process/thread or different operating system processes/threads.

The computer program may be fixed in any form (e.g., source code form, computer executable form, or an intermediate form) either permanently or transitorily in a tangible storage medium, such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), a PC card (e.g., PCMCIA card), or other memory device.

The computer program may be fixed in any form in a signal that is transmittable to a computer using any of various communication technologies, including, but in no way limited to, analog technologies, digital technologies, optical technologies, wireless technologies (e.g., Bluetooth), networking technologies, and internetworking technologies.

The computer program may be distributed in any form as a removable storage medium with accompanying printed or electronic documentation (e.g., shrink wrapped software), preloaded with a computer system (e.g., on system ROM or fixed disk), or distributed from a server or electronic bulletin board over the communication system (e.g., the Internet or World Wide Web).

Hardware logic (including programmable logic for use with a programmable logic device) implementing all or part of the functionality previously described herein may be designed using traditional manual methods, or may be designed, captured, simulated, or documented electronically using various tools, such as Computer Aided Design (CAD), a hardware description language (e.g., VHDL or AHDL), or a PLD programming language (e.g., PALASM, ABEL, or CUPL).

Any suitable computer readable medium may be utilized. The computer readable medium may be, for example but not limited to, an electronic, magnetic, optical, electromagnetic, infrared, or semiconductor system, apparatus, device, or medium.

More specific examples of the computer readable medium include, but are not limited to, an electrical connection having one or more wires or other tangible storage medium such as a portable computer diskette, a hard disk, a random access memory (RAM), a read-only memory (ROM), an erasable programmable read-only memory (EPROM or Flash memory), a compact disc read-only memory (CD-ROM), or other optical or magnetic storage device.

Programmable logic may be fixed either permanently or transitorily in a tangible storage medium, such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), or other memory device.

The programmable logic may be fixed in a signal that is transmittable to a computer using any of various communication technologies, including, but in no way limited to, analog technologies, digital technologies, optical technologies, wireless technologies (e.g., Bluetooth), networking technologies, and internetworking technologies.

The programmable logic may be distributed as a removable storage medium with accompanying printed or electronic documentation (e.g., shrink wrapped software), preloaded with a computer system (e.g., on system ROM or fixed disk), or distributed from a server or electronic bulletin board over the communication system (e.g., the Internet or World Wide Web). Of course, some embodiments of the invention may be implemented as a combination of both software (e.g., a computer program product) and hardware. Still other embodiments of the invention are implemented as entirely hardware, or entirely software.

While certain exemplary embodiments have been described and shown in the accompanying drawings, it is to be understood that such embodiments are merely illustrative of and are not restrictive on the broad invention, and that the embodiments of invention are not limited to the specific constructions and arrangements shown and described, since various other changes, combinations, omissions, modifications and substitutions, in addition to those set forth in the above paragraphs, are possible.

Those skilled in the art will appreciate that various adaptations, modifications, and/or combination of the just described embodiments can be configured without departing from the scope and spirit of the invention. Therefore, it is to be understood that, within the scope of the appended claims, the invention may be practiced other than as specifically described herein. For example, unless expressly stated otherwise, the steps of processes described herein may be performed in orders different from those described herein and one or more steps may be combined, split, or performed simultaneously.

The invention claimed is:

1. A non-transitory computer readable storage medium storing thereon a computer program including instructions to cause a computer to execute a method for managing a data storage system, comprising:
    storing a data object distributed across a group of node apparatuses of the data storage system in units of data blocks; and
    managing I/O access to the data object based on metadata structures including a metadata structure being associated with a parent object of the data object and plural metadata structures being respectively associated with one of a plurality of child objects of the data object,
    wherein, for each child object, the metadata structure of the respective child object is stored to one of the node apparatuses of the group of node apparatuses for managing locations of data blocks of the data object and includes a root metadata node and one or more direct metadata nodes, and
    wherein the metadata structure of the parent object is distributed across the plural node apparatuses of the group of node apparatuses for managing locations of child objects of the data object and includes, on each node apparatus of the group of node apparatuses, a root metadata node and one or more direct metadata nodes, and
    wherein the method further comprises:
    moving, for I/O access load balancing, one or more child objects from a source node apparatus to a target node apparatus and updating an object reference of the parent object on the source node apparatus, or on another node apparatus, to reflect a new location of the one or more moved child objects;
    dividing the data of the data object into a plurality of data segments, each data segment having a size smaller than or equal to a pre-determined distribution size;
    storing the data segments in a distributed manner across the plural node apparatuses of the group of node apparatuses; and
    creating a respective child object for each stored data segment and/or creating a respective parent object on each node apparatus on which a child object is created.

2. The non-transitory computer readable storage medium according to claim 1, wherein
    the parent object on a certain node apparatus includes object-references indicating locations of one or more child objects of the data object,
    the parent object in the data storage system includes a respective object-references for each child object of the data object, and/or
    each child object is referenced by an object reference of the parent object on at least one of the node apparatuses.

3. The non-transitory computer readable storage medium according to claim 1, wherein,
    upon creation of the data object, the parent object on a certain node apparatus includes object-references indicating locations of the one or more child objects of the data object created on the same certain node apparatus, and/or,
    upon creation of the data object, each child object on a certain node apparatus is referenced by an object reference of the parent object on the same certain node apparatuses.

4. The non-transitory computer readable storage medium according to claim 1, wherein
    storing the data segments in a distributed manner across the plural node apparatuses of the group of node apparatuses is executed based on a deterministic distribution algorithm and/or based on a distribution map being generated based on a deterministic distribution algorithm.

5. The non-transitory computer readable storage medium according to claim 4, wherein
    an input value of the deterministic distribution algorithm depends on at least one of:
    an object identifier of the data object; and
    an offset of a data segment in the data object.

6. The non-transitory computer readable storage medium according to claim 5, wherein
    object identifiers are grouped into plurality of disjoint groups of object identifiers and each group of object identifiers includes the same number of object identifiers,
    wherein the number of object identifiers per group is equal to a number of pointers per metadata node in a metadata structure, or the number of object identifiers per group is equal to a number of pointers per metadata node in a metadata structure to the power of an integer of two or more.

7. The non-transitory computer readable storage medium according to claim 6, wherein
    an input value of the deterministic distribution algorithm is determined based on an object identifier of the data object, and object identifiers of a same group of object identifiers result in the same input value and/or object identifiers different groups of object identifiers result in different input values.

8. The non-transitory computer readable storage medium according to claim 1, wherein the method further comprises:
    receiving an I/O access request to access a target data segment of the data object on a receiving node apparatus;

determining a child object node apparatus being the designated location of a child object associated with the target data segment based on a deterministic algorithm;

sending an I/O access request to access the target data segment from the receiving node apparatus to the determined child object node apparatus;

obtaining an object reference to the child object associated with the target data segment from the parent object on the determined child object node apparatus; and accessing the child object associated with the target data segment based on the object reference obtained from the parent object on the determined child object node apparatus.

9. The non-transitory computer readable storage medium according to claim 8, wherein the method further comprises:

accessing the child object associated with the target data segment on the determined child object node apparatus; or determining that the child object associated with the target data segment has been moved to another node apparatus based on the object reference obtained from the parent object on the determined child object node apparatus, and accessing the child object associated with the target data segment on the other node apparatus.

10. The non-transitory computer readable storage medium according to claim 1, wherein the metadata structure of the parent object is distributed across the plural node apparatuses of the group of node apparatuses in that the complete metadata of the parent object is stored on each of the plural node apparatuses of the group of node apparatuses, or the metadata structure of the parent object is distributed across the plural node apparatuses of the group of node apparatuses in that each of the plural node apparatuses of the group of node apparatuses stores a respective part of the metadata structure of the parent object.

11. The non-transitory computer readable storage medium according to claim 1, wherein for each child object, the metadata structure of the respective child object further includes one or more indirect metadata nodes.

12. The non-transitory computer readable storage medium according to claim 11, wherein the metadata structure for the parent object further includes one or more indirect metadata nodes.

13. The non-transitory computer readable storage medium according to claim 1, wherein the metadata structure for the parent object further includes one or more indirect metadata nodes.

14. A data storage system, comprising:

a plurality of node apparatuses communicably connected to each other, each node apparatus comprising at least one processor and at least one memory;

the data storage system being configured to store a data object distributed across a group of node apparatuses of the data storage system in units of data blocks; and the data storage system being configured to manage I/O access to the data object based on metadata structures including a metadata structure being associated with a parent object of the data object and plural metadata structures being respectively associated with one of a plurality of child objects of the data object, wherein, for each child object, the metadata structure of the respective child object is stored to one of the node apparatuses of the group of node apparatuses for managing locations of data blocks of the data object and includes a root metadata node and one or more direct metadata nodes, wherein the metadata structure of the parent object is distributed across the plural node apparatuses of the group of node apparatuses for managing locations of child objects of the data object and includes, on each node apparatus of the group of node apparatuses, a root metadata node and one or more direct metadata nodes, and wherein the data storage systems is further configured to:

move, for I/O access load balancing, one or more child objects from a source node apparatus to a target node apparatus and updating an object reference of the parent object on the source node apparatus, or on another node apparatus, to reflect a new location of the one or more moved child objects;

divide the data of the data object into a plurality of data segments, each data segment having a size smaller than or equal to a pre-determined distribution size;

store the data segments in a distributed manner across the plural node apparatuses of the group of node apparatuses; and create a respective child object for each stored data segment and/or create a respective parent object on each node apparatus on which a child object is created.

15. A node apparatus for use in a data storage system according to claim 14, comprising:

an interface for establishing a communication connection to one or more other node apparatuses of the data storage system;

one or more storage devices for storing data; and a storage controller for controlling a data storage distribution in the data storage system, including:

storing a data object distributed across a group of node apparatuses of the data storage system in units of data blocks; and managing I/O access to the data object based on metadata structures including a metadata structure being associated with a parent object of the data object and plural metadata structures being respectively associated with one of a plurality of child objects of the data object, wherein, for each child object, the metadata structure of the respective child object is stored to one of the node apparatuses of the group of node apparatuses for managing locations of data blocks of the data object and includes a root metadata node and one or more direct metadata nodes, and wherein the metadata structure of the parent object is distributed across the plural node apparatuses of the group of node apparatuses for managing locations of child objects of the data object and includes, on each node apparatus of the group of node apparatuses, a root metadata node and one or more direct metadata nodes.

16. A method for managing a data storage system, comprising:

storing a data object distributed across a group of node apparatuses of the data storage system in units of data blocks; and managing I/O access to the data object based on metadata structures including a metadata structure being associated with a parent object of the data object and plural metadata structures being respectively associated with one of a plurality of child objects of the data object, wherein, for each child object, the metadata structure of the respective child object is stored to one of the node apparatuses of the group of node apparatuses for managing locations of data blocks of the data object and includes a root metadata node and one or more direct metadata nodes, wherein the metadata structure of the parent object is distributed across the plural node apparatuses of the group of node apparatuses for managing locations of child objects of the data object and includes, on each node apparatus of the group of node apparatuses, a root metadata node and one or more direct metadata nodes, and wherein the method further comprises:
- moving, for I/O access load balancing, one or more child objects from a source node apparatus to a target node apparatus and updating an object reference of the parent object on the source node apparatus, or on another node apparatus, to reflect a new location of the one or more moved child objects;
- dividing the data of the data object into a plurality of data segments, each data segment having a size smaller than or equal to a pre-determined distribution size;
- storing the data segments in a distributed manner across the plural node apparatuses of the group of node apparatuses; and
- creating a respective child object for each stored data segment and/or creating a respective parent object on each node apparatus on which a child object is created.

* * * * *